United States Patent
Lin et al.

(10) Patent No.: US 9,141,388 B2
(45) Date of Patent: *Sep. 22, 2015

(54) HIGH-PERFORMANCE CACHE SYSTEM AND METHOD

(75) Inventors: Kenneth Chenghao Lin, Shanghai (CN); Haoqi Ren, Shanghai (CN)

(73) Assignee: SHANGHAI XIN HAO MICRO ELECTRONICS CO., LTD., Shanghai (CN)

( * ) Notice: Subject to any disclaimer, the term of this patent is extended or adjusted under 35 U.S.C. 154(b) by 582 days.

This patent is subject to a terminal disclaimer.

(21) Appl. No.: 13/549,394

(22) Filed: Jul. 13, 2012

(65) Prior Publication Data

US 2013/0185545 A1 Jul. 18, 2013

Related U.S. Application Data

(63) Continuation-in-part of application No. 13/056,974, filed on Jan. 31, 2011, now Pat. No. 8,527,707.

(30) Foreign Application Priority Data

Dec. 25, 2009 (CN) .......................... 2009 1 0247204

(51) Int. Cl.
*G06F 12/08* (2006.01)
*G06F 9/38* (2006.01)
*G06F 9/30* (2006.01)
*G06F 9/32* (2006.01)

(52) U.S. Cl.
CPC ........ *G06F 9/30043* (2013.01); *G06F 9/30054* (2013.01); *G06F 9/322* (2013.01); *G06F 9/38* (2013.01); *G06F 9/3804* (2013.01); *G06F 9/3806* (2013.01); *G06F 12/0862* (2013.01); *G06F 2212/6028* (2013.01)

(58) Field of Classification Search
None
See application file for complete search history.

(56) References Cited

U.S. PATENT DOCUMENTS

| | | | | | |
|---|---|---|---|---|---|
| 5,265,213 | A | * | 11/1993 | Weiser et al. | 712/240 |
| 5,974,260 | A | * | 10/1999 | Gotou | 712/32 |
| 2010/0191943 | A1 | * | 7/2010 | Bukris | 712/238 |
| 2013/0080750 | A1 | * | 3/2013 | Ito et al. | 712/240 |
| 2014/0089647 | A1 | * | 3/2014 | Kountanis et al. | 712/240 |

* cited by examiner

*Primary Examiner* — Kevin Verbrugge
(74) *Attorney, Agent, or Firm* — Anova Law Group, PLLC

(57) ABSTRACT

A digital system includes a processor core and a cache control unit. The processor core can be coupled to a first memory containing data and a second memory with a faster speed than the first memory, and is configured to execute a segment of instructions having at least one instruction accessing the data from the second memory using a base register. The cache control unit is configured to be coupled to the first memory, the second memory, and the processor core to fill the data from the first memory to the second memory before the processor core executes the instruction accessing the data, and is further configured to examine the segment of instructions to extract instruction information containing at least data access instruction information and last register updating instruction information and to create a track corresponding to the segment of instructions based on the extracted instruction information.

60 Claims, 33 Drawing Sheets

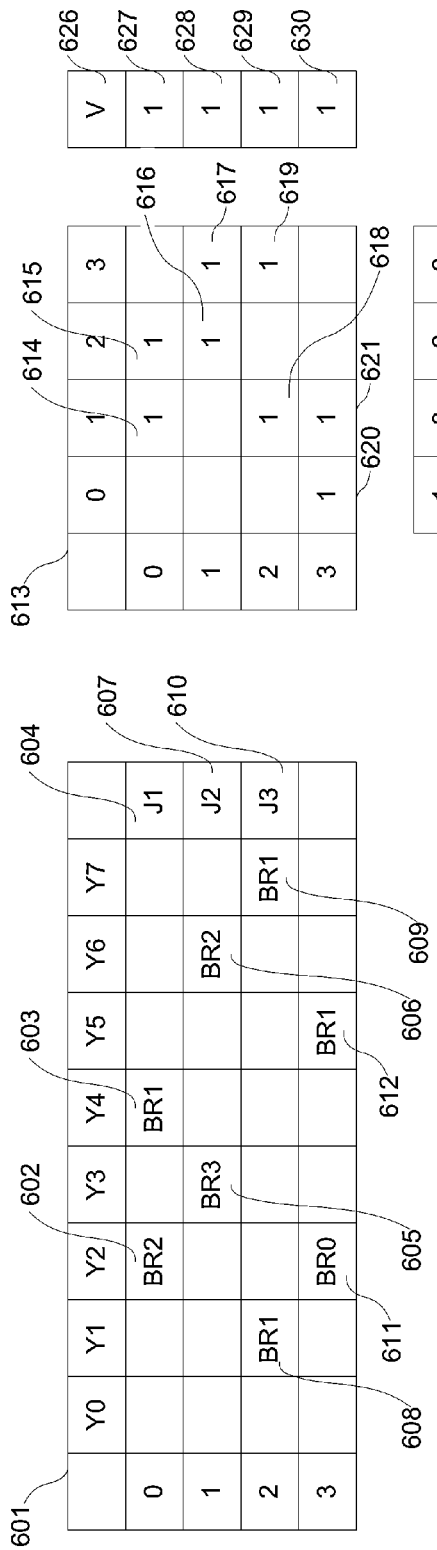
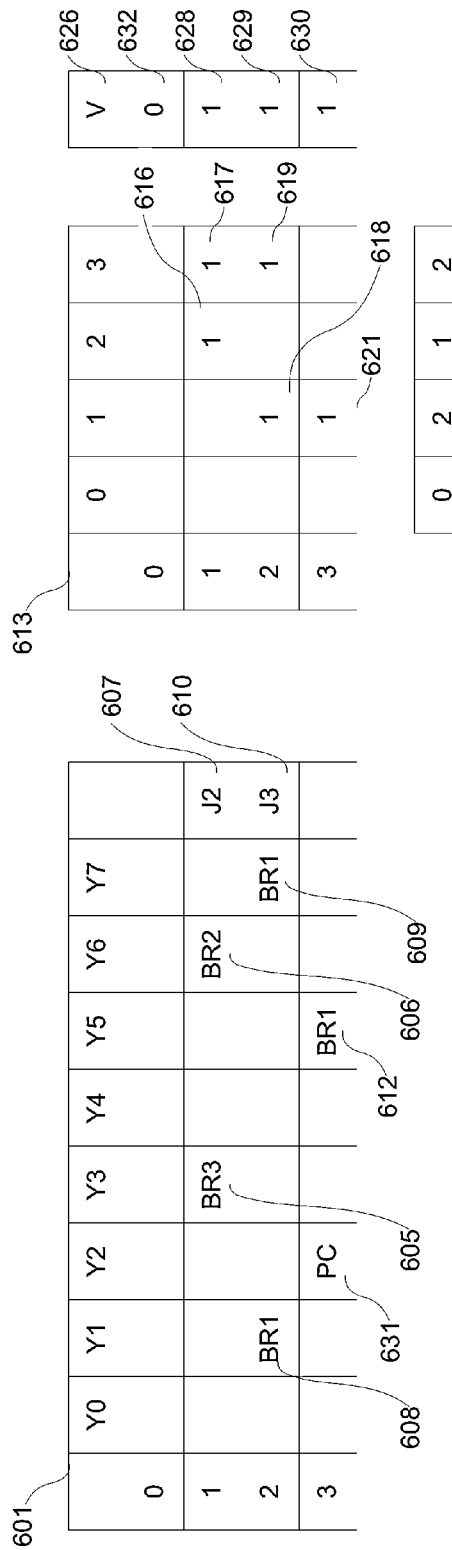
FIG. 28A
FIG. 28B

HIGH-PERFORMANCE CACHE SYSTEM AND METHOD

CROSS-REFERENCES TO RELATED APPLICATIONS

This application is a continuation-in-part (CIP) application of U.S. patent application Ser. No. 13/056,974, filed on Jan. 31, 2011, which is a national stage patent application of PCT application No. PCT/CN2010/080114, filed on Dec. 22, 2010, which claims the priority of Chinese patent application No. 200910247204.4, filed on Dec. 25, 2009, the entire contents of all of which are incorporated herein by reference.

FIELD OF THE INVENTION

The present invention generally relates to integrated circuit technologies and, more particularly, to the methods and systems for high-performance computing.

BACKGROUND

In general, cache is used to duplicate a certain part of main memory, so that the duplicated part in the cache can be accessed by a processor core or central processing unit (CPU) core in a short amount of time and thus to ensure continued pipeline operation of the processor core.

Currently, cache addressing is based on the following ways. First, an index part of an address is used to read out a tag from a tag memory. At the same time, the index and an offset part of the address are used to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For multi-way set associative cache, the above operation is performed in parallel on each set to detect which way has a cache hit. Contents read out from the set with the cache hit are valid. If all sets experience cache misses, contents read out from any set are invalid. After a cache miss, cache control logic fills the cache with contents from lower level storage medium.

Cache miss can be divided into three types: compulsory miss, conflict miss, and capacity miss. Under existing cache structures, except a small amount of pre-fetched contents, compulsory miss is inevitable. But, the current pre-fetching operation carries a not-so-small penalty. Further, while multi-way set associative cache may help reduce conflict misses, the number of way set associative cannot exceed a certain number due to power and speed limitations (e.g., the set-associative cache structure requires that contents and tags from all cache sets addressed by the same index are read out and compared at the same time). Further, with the goal for cache memories to match the speed of the CPU core, it is difficult to increase cache capacity. Thus, multiple layers of cache are created, with a lower layer cache having a larger capacity but a slower speed than a higher layer cache.

Thus, current modern cache systems normally comprise multiple layers of cache in a multi-way set associative configuration. New cache structures such as victim cache, trace cache, and pre-fetching (putting the next cache block into a cache buffer while fetching a cache block or under a pre-fetch instruction) have been used to address certain shortcomings. However, with the widening gap between the speed of the processor and the speed of the memory, the existing cache architectures, especially with the various cache miss possibilities, are still a bottleneck in increasing the performance of modern processors or computing systems. In addition, current cache systems often do not consider data cache together with the instruction cache.

The disclosed methods and systems are directed to solve one or more problems set forth above and other problems.

BRIEF SUMMARY OF THE DISCLOSURE

One aspect of the present disclosure includes a digital system. The digital system includes a processor core and a cache control unit. The processor core is capable of being coupled to a first memory containing data and a second memory with a faster speed than the first memory, and is configured to execute a segment of instructions having at least one instruction accessing the data from the second memory using a base register. The cache control unit is configured to be coupled to the first memory, the second memory, and the processor core to fill the data from the first memory to the second memory before the processor core executes the instruction accessing the data. Further, the cache control unit is further configured to examine the segment of instructions to extract instruction information containing at least data access instruction information and last register updating instruction information and to create a track corresponding to the segment of instructions based on the extracted instruction information. The cache control unit is also configured to fill the data from the first memory to the second memory based on the track corresponding to the segment of instructions after execution of an instruction last updating the base register used by the at least one instruction accessing the data.

Another aspect of the present disclosure includes a method for facilitating operation of a processor core coupled to a first memory containing data and a second memory with a faster speed than the first memory. The processor core is configured to execute a segment of instructions having at least one instruction accessing the data from the second memory using a base register. The method includes examining the segment of instructions to extract instruction information containing at least data access instruction information and last register updating instruction information. The method also includes creating a track corresponding to the segment of instructions based on the extracted instruction information. Further, the method includes filling the data from the first memory to the second memory based on the track corresponding to the segment of instructions after execution of an instruction last updating the base register used by the at least one instruction accessing the data and before the processor core executes the instruction accessing the data.

Other aspects of the present disclosure can be understood by those skilled in the art in light of the description, the claims, and the drawings of the present disclosure.

BRIEF DESCRIPTION OF THE DRAWINGS

FIGS. 28A-28B illustrate an exemplary track table and correlation table consistent with the disclosed embodiments.

DETAILED DESCRIPTION

Reference will now be made in detail to exemplary embodiments of the invention, which are illustrated in the accompanying drawings.

Figure 1:
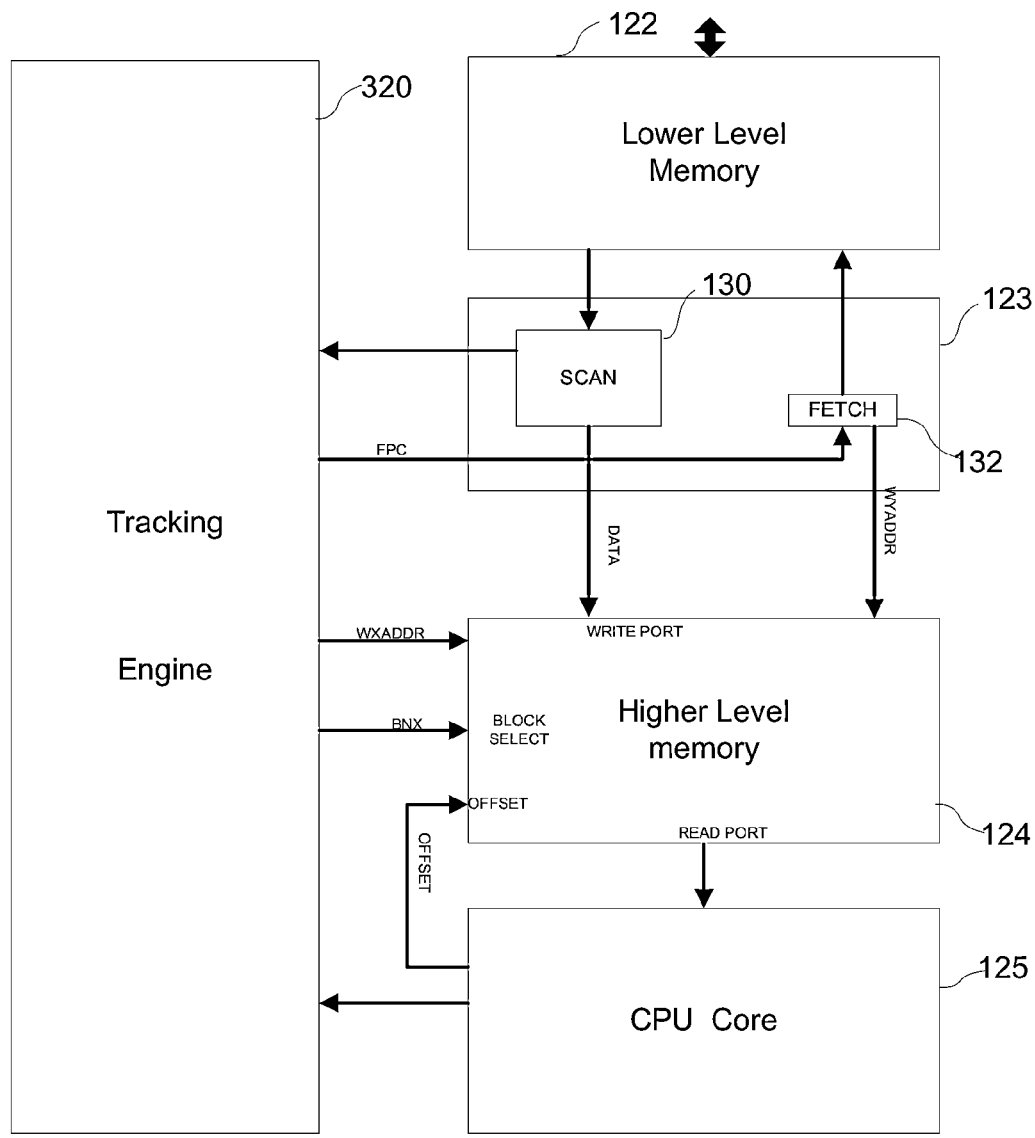
FIG. 1 illustrates an exemplary computing environment incorporating certain aspects of the present invention.

FIG. 1 shows an exemplary computing environment incorporating certain aspects of the present invention. As shown in FIG. 1, computing environment 1000 may includes a CPU core 125, a higher level memory 124, a fill/generator 123, a lower level memory 122, and a tracking engine 320. It is understood that the disclosed components or devices are for illustrative purposes and not limiting, certain components or devices may be omitted and other components or devices may be included. Further, only reading operation may be described in details with the understanding that writing operation is similar to reading operation.

Higher level memory 124 and lower level memory 122 may include any appropriate memory devices, such as SRAM, DRAM, and flash memory. As used herein, the level of a memory refers to the closeness of the memory in coupling with a processor core. The closer to the processor core, the higher the level. Further, a memory with a higher level is generally faster in speed while smaller in size than a memory with a lower level. Without limiting, higher level memory 124 may act as a cache for the system or a level one cache, if other caches exist, and may be separated into a plurality memory segments called blocks (e.g., memory blocks) for storing data (i.e., both instructions and data) to be accessed by CPU core 125.

CPU core 125 may include any appropriate processor capable of operating in a pipeline mode and with cache systems. CPU core 125 may use separate caches for instructions and data, and may also include certain instructions for cache operations. For CPU core 125 to execute an instruction, CPU core 125 first needs to read the instruction and/or data from memory. Tracking engine 320 and fill/generator 123 are configured to allow CPU core 125 to read the instruction from higher level memory 124 with significantly less cache misses by filling higher level memory 124 with instructions to be executed by CPU core 125, and such filling is also performed independently from history of execution of instructions by CPU core 125. As used herein, the term "fill" means to move data/instruction from a lower level memory to a higher level memory, and the term "memory access" means that CPU core 125 reads from or writes to the closest memory (i.e., higher level memory 124 or level-one cache).

Tracking engine 320 along with other components, such as fill/generator 123 may be implemented in integrated circuitry as part of a processor chip or as a separate chip, or may be implemented as programs running in a processor chip, or a combination of hardware and software.

In certain embodiments, tracking engine 320 may generate a proper address for fetching the instruction or an instruction block containing the instruction, based on information from fill/generator 123 and CPU core 125. Tracking engine 320 may also provide the proper address to fill/generator 123 such that fill/generator 123 fetches the instruction or the instruction block, using the proper address, from lower level memory 122 and stores the instruction or the instruction block in higher level memory 124. Further, tracking engine 320 may also generate a block number for higher level memory 124. The block number and an address offset provided by CPU core 125 may then be used to address higher level memory 124 by the CPU core 125 to read the instruction without a cache miss.

More particularly, fill/generator 123 includes a generator 130 and a fill engine 132. Fill engine 132 may fetch the instruction or the instruction block with the proper address. Generator 130 may examine every instruction fetched from lower level memory 122 and extract certain information of the instruction, such as instruction type, instruction address, and branch target information of a branch instruction. The instruction and extracted information including branch target information is provided to tracking engine 320. A branch instruction or a branch point, as used herein, refers to any appropriate type of instruction which may cause the CPU core 125 to change an execution flow (e.g., executing an instruction out of sequence).

Based on the instruction and branch target information, tracking engine 320 may determine addressing information such as instruction type, branch source address, and branch target address information. For example, an instruction type may include conditional branch instruction, unconditional branch instruction, and other instructions, etc. Under certain circumstances, unconditional branch may be a special case of conditional branch instruction, with the condition forced to true. The instruction type may thus include branch instruction and other instructions, etc. A branch source address may refer to the address of the branch instruction itself, and a branch target address may refer to the address being branched to if the branch is taken. Other information may also be included.

Figure 2A:
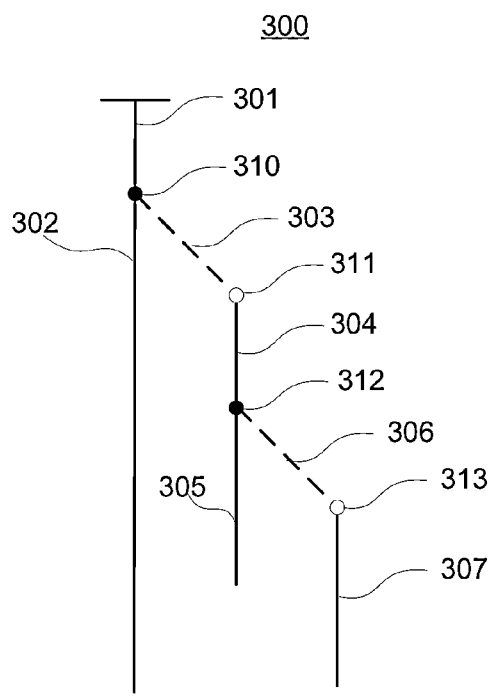
FIG. 2A illustrates an exemplary address tree consistent with the disclosed embodiments.

Further, tracking engine 320 may build an address tree or a track table based on the determined information to provide addressing information to be used to fill higher level memory 124. FIG. 2A shows an exemplary address tree 300 consistent with the disclosed embodiments.

As shown in FIG. 2A, address tree 300 may include tree nodes 310 and 312, tree trunk 301, 302, 304, 305 and 307, and tree branch 303 and 306. A tree trunk refers to a sequence of instructions with a fixed or variable length. A tree node may refer to a branch instruction where a branching may take place right after the branch instruction. If the branch does take place, a tree branch is formed between the tree node and the branch target address. For example, 301, 302, 304, 305, and 307 are normal instructions in sequence and form respective tree trunks; 310 and 312 are branch instructions when branching may take place and form respective tree nodes; and 311 and 313 are branch targets that form tree branches 303 and 306. Other structures, however, may also be used.

In operation, address tree 300 or any part of address tree 300 may be used as a locus or a track for an instruction sequence to be executed by CPU core 125. The first instruction of the instruction sequence is considered as the head of locus (HOL) or track head, and the instruction block containing this first instruction is fetched into higher level memory 124 to be used by CPU core 125. During execution, the current instruction may become the first instruction of the instruction sequence in execution, and thus the HOL moves along the locus. Also, one or more predicted HOL or PHOL may be generated to point to an instruction sequence that might be used by CPU core 125. For example, at a tree node (i.e., a branch instruction), two PHOLs may exist depending on whether a branch is taken. During execution, the PHOL may also moves based on branch points in the locus and normally ahead of HOL.

Address tree 300 may support different depths based on levels of branch nodes. For example, a one level address tree may only support one level of branch (e.g., a next branch); a two level address tree may support two levels of branches (e.g., a branch after the level one branch if the level one branch is not taken, or a branch after the level one branch on the branch target track if the level one branch is taken); and a multiple-level address tree may support multiple branch levels.

Figure 2B:
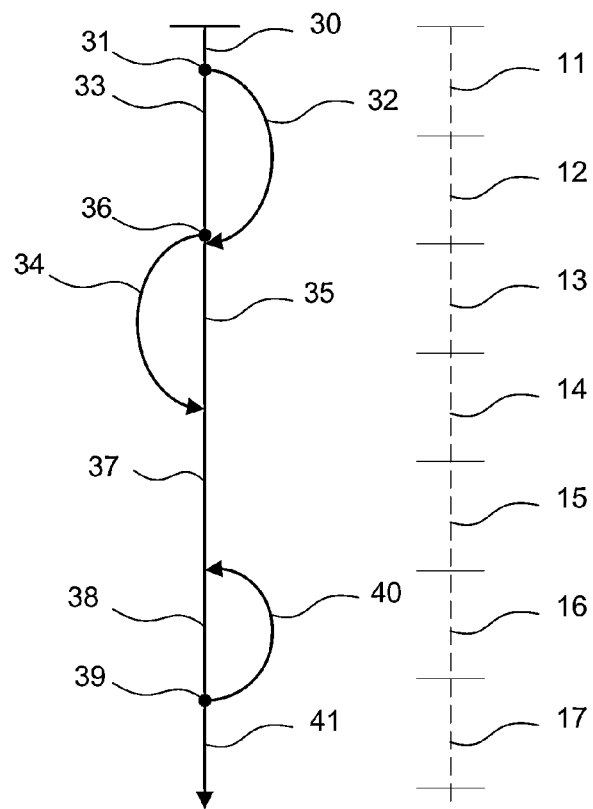
FIG. 2B illustrates an exemplary operation associated with an address tree consistent with the disclosed embodiments.

FIG. 2B shows an exemplary operation associated with an address tree consistent with the disclosed embodiments. As shown in FIG. 2B, solid lines represent program flows, curved lines represent branches, black dots represent branch instructions, and dotted lines represent actual instructions divided into various segments with a same or similar length (e.g., instruction blocks).

At the beginning, CPU core 125 executes program segment 30, until reaching a conditional branch instruction 31. If the condition of conditional branch instruction 31 is not satisfied, CPU core 125 executes program segment 33, until reaching an unconditional branch instruction 36, after which the program flow changes unconditionally to program segment 37 via branch 34. On the other hand, if the condition of conditional branch instruction 31 is satisfied, CPU core 125 executes program segment 35 via branch 32, and then continues executing program segment 37.

After executing program 37, CPU core 125 executes program segment 38 until reaching a conditional loop instruction 39. If the condition for conditional loop instruction 39 is satisfied, the program flow changes back to program segment 38 via branch 40, and again reaches conditional loop instruction 39. This loop repeats until the condition for conditional loop instruction 39 is no longer satisfied, after which CPU core 125 executes program segment 41.

The program instructions of the various program segments may be represented by instruction blocks 11, 12, 13, 14, 15, 16, and 17, and each instruction block may include a same number of instructions or different numbers of instructions, such as in a variable-length instruction set. For example, instruction block 11 may include instructions from program segment 30 and a part of program segment 33; instruction block 12 may include instructions from the other part of program segment 33; instruction block 13 may include instructions from a part of program segment 35; instruction block 14 may include instructions from the other part of program segment 35 and a part of program segment 37; instruction block 15 may include instructions from the other part of program segment 37; instruction block 16 may include instructions from a part of program segment 38; and instruction block 17 may include instructions from the other part of program 38 and a part of program segment 41. The size of each instruction block may be determined based on applications or available hardware resources and/or architectures.

For illustrative purposes, assuming each instruction block is filled into higher level memory 124 in sequence, i.e., a second instruction block is filled in higher level memory 124 after a first instruction block is filled, instead of being filled alternatively. Also, assuming the address tree 300 has a depth of one level. That is, only one level of branch is used to fill instruction blocks into higher level memory 124. Other configurations can be similarly used.

At beginning of the operation of CPU core 125, fill/generator 123 starts filling instruction block 11 into higher level memory 124, and scans each instruction being filled into higher level memory 124. In certain embodiments, two or more instructions may be scanned while one instruction is being executed, and thus scanned instructions may be in advance of executed instructions. For example, two instructions may be examined in one clock cycle while one instruction may be executed by CPU core 125 in one clock cycle, or eight instructions may be examined in one clock cycle while four instructions may be executed by CPU core 125 in one clock cycle, such as in a multiple-issue processor. Other configurations may also be used to scan instructions in advance of execution.

Further, after fill/generator 123 scans conditional branch instruction 31, fill/generator 123 may determine conditional branch instruction 31 is a branch instruction, and may extract a target address of the branch instruction 31, which is within program segment 35. Thus, tracking engine 320 controls fill/generator 123 to fill the instruction block corresponding to the target address, i.e., instruction block 13, into higher level memory 124.

That is, instruction block 13 is filled into higher level memory 124 in advance of execution of conditional branch instruction 31. Further, because the instruction following after conditional branch instruction 31 (in case the condition is not satisfied) is in instruction block 11 which is already filled into higher level memory 124, no further filling operation is needed.

Further, when conditional branch instruction 31 is executed, assuming the condition is not satisfied, instructions from instruction block 11 are executed. When the last instruction of instruction block 11 is being executed, the next instruction block 12 is filled into higher level memory 124 such that the next instruction following the last instruction from instruction block 11 can be executed without any cache miss.

While filling instruction block 12, each filled instruction is scanned. Fill/generator 123 may determine that the last instruction of instruction block 12 is an unconditional branch instruction (i.e., unconditional branch instruction 36). Thus, the instruction block corresponding to the target address of unconditional branch instruction 36 (i.e., instruction block 14) is filled into higher level memory 124.

Similarly, before the last instruction of instruction block 13 is completed in execution, tracking engine 320 knows the next instruction is in instruction block 14. Since instruction block 14 has been filled already, no filling is needed. Similarly, instruction blocks 15, 16, and 17 are filled into higher level memory 124 before any instructions from instruction blocks 15, 16, and 17 are executed by CPU core 125.

Further, when scanning conditional loop instruction 39 in instruction block 17, because both the target instruction block (i.e., instruction block 16) and the instruction block corresponding to the next instruction of conditional loop instruction 39 are already filled into higher level memory 124, no filling operation is needed. When the loop condition of instruction 39 is no longer satisfied, the loop ends and instructions in instruction block 17 are executed in sequence.

Figure 3A:
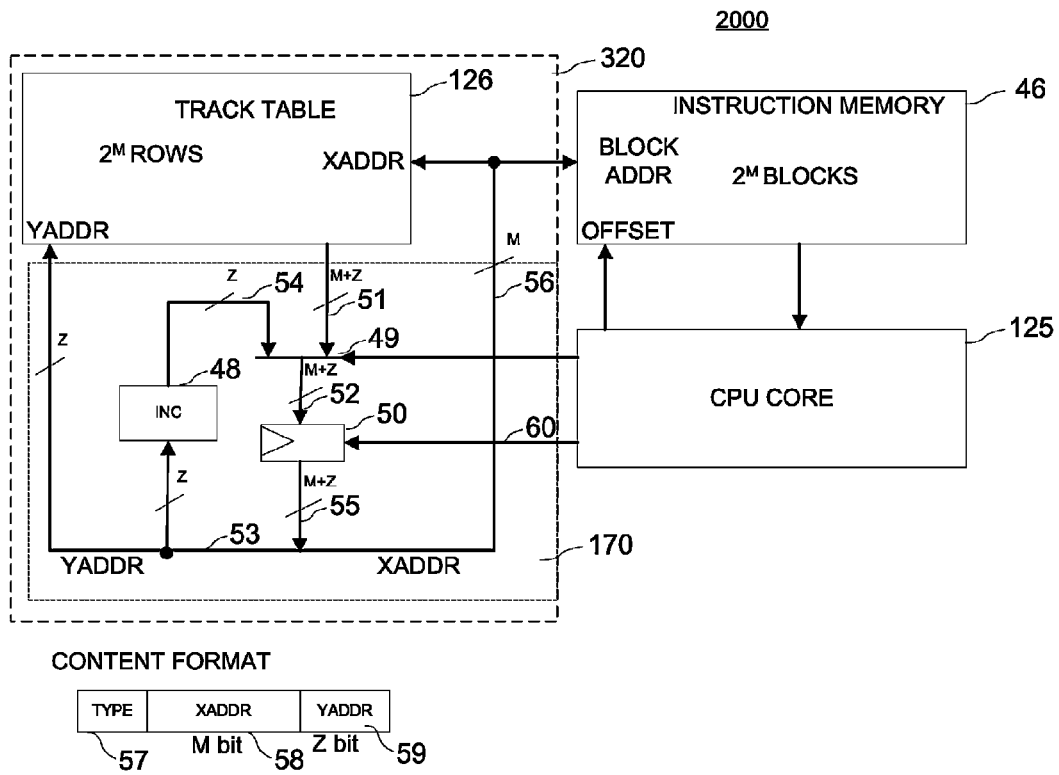
FIG. 3A illustrates an exemplary cache system consistent with the disclosed embodiments.

Therefore, tracking engine 320 and other components may conduct the above operation based on the concept of address tree to substantially reduce cache miss rate. Tracking engine 320 and other components (e.g., fill/generator 123) may also be referred to as a cache control unit interfacing with various components to substantially reduce the cache miss rate. FIG. 3A shows an exemplary cache system 2000 consistent with the disclosed embodiments.

As shown in FIG. 3A, tracking engine 320 may include a track table 126 and a tracker 170. Track table may contain tracks of instructions for execution by CPU core 125, and tracker 170 may provide various addresses based on track table 126. As used herein, a track refers to a representation of a series of instructions (e.g., an instruction block) to be executed. The representation may include any appropriate type of data, such as addresses, block numbers, or other numbers. Further, a new track may be created when a track includes a branch point with a branch target which changes program flow or with an instruction from a different instruction block, such as an instruction from a next instruction block, an exception program, and a different program thread, etc. The series of instructions may include a same number of instructions or different number of instruction, such as in a variable-length instruction set.

Track table 126 may include a plurality of tracks, and each track in track table 126 corresponds to a row in track table 126 with a row number or a block number, which may index the corresponding memory block. A track may include a plurality of track points, and a track point may correspond to a single instruction. Further, as a track corresponds to a single row in track table 126, a track point corresponds to a single entry (e.g., a storage unit) from the row in track table 126. The total track points in a track thus may equal to the total number of entries in one row of track table 126. Other configurations may also be used.

A track point (i.e., a single entry in the table entry) may include information about a branch instruction whose branch target may be on a separate track. Thus, content of a track point may include information about a type of the corresponding instruction and a target branch address, which may include a track number which addresses a target track, and an offset which addresses an entry within the target track. By checking the contents of a track point, a target track may be determined based on the track number and a particular entry within the target track may be determined by the offset. Thus, a track table is a table (or a list) in which an address of a branch track entry corresponds to a branch source address; and the entry content corresponds to a branch target address.

For example, as shown in FIG. 3A, CPU core 125 may use a (M+Z) bit instruction address to read instructions for operation, where M and Z are integers. The M-bit part of the address may be referred as an upper address, and the Z-bit part of the address may be referred as an offset address. Track table 126 may then include $2^M$ rows, with a total $2^M$ tracks, and the upper address of M bits may be used as an index to address a track in the track table 126. Each row may include $2^Z$ tracks entries, with a total $2^Z$ track points, and the offset address (Z bits) may be used as an offset to address the corresponding row to determine a particular track point (entry).

When a new track is to be created, the new track may be placed at an available row of track table 126. If the new track includes a branch track point (corresponding to a branch source instruction) then a branch track point may be created at an entry of the row. The positions of the row and entry of the branch point in track table 126 are determined by the branch source address. For example, the row may be determined based on the upper address of the branch source address, and the entry may be determined based on the offset of the branch source address.

Further, each entry or track point in the row may have a content format including a type field 57, an XADDR field 58, and a YADDR field 59. Other fields may also be included. Type field 57 may indicate the type of instruction corresponding to the track point. As previously explained, an instruction type may include conditional branch instruction, unconditional branch instruction, and other instructions. XADDR field 58 may include M bit address also called a first-dimension address or simply a first address. YADDR field 59 may include Z bit address also called a second-dimension address or simply a second address.

Further, the content of the new track point may correspond to the branch target instruction. In other words, the content of the branch track point stores the branch target address information. For example, the row number or block number of a particular row in track table 126 corresponding to the branch target instruction is stored as the first address 58 in the branch track point. Further, the offset address of the branch target within its own track is then stored as the second address 59 in the branch track point. This offset address can be calculated based on the branch source instruction address and the branch offset (distance). That is, the first address XADDR 58 stored in the branch track point (the branch source) is used as a row address and the second address YADDR 59 stored in the branch track point is used as a column address to address the branch target.

Instruction memory 46 may be a part of higher level memory 124 used for instruction access and may include any appropriate high performance memory. Instruction memory 46 may include $2^M$ memory blocks, and each memory block may include $2^Z$ bytes or words of storage. That is, instruction memory 46 may store all instructions addressed by M and Z (i.e., the instruction address) such that M bits can be used to address a particular memory block while Z bits can be used to address a particular byte or word within the particular memory block.

Tracker 170 may include various components or devices, such as registers, selectors, stacks and/or other storages, to determine a next track to be executed by CPU core 125. Tracker 170 may determine the next track based on the current track, track point information from track table 126, and/or whether a branch is taken by CPU core 125, etc.

For example, during operation, bus 55 carries the instruction address with (M+Z) bits. M bits are put onto bus 56 to track table 126 as the first address or XADDR (or X address), and Z bits are put onto bus 53 to track table 126 as the second address or YADDR (or Y address). Based on the first address and the second address, an entry in track table is identified and its content is outputted to bus 51. If the entry is corresponding to a branch instruction (a branch track point or branch source), the entry content outputted through 51 may provide the target address of the branch.

If the condition of the branch instruction is not satisfied, the branch is not taken, and the not-taken information from the CPU core 125 will control selector 49 to select input 54, which is the YADDR on bus 53 increased by one (1) byte or word by incrementer 48, as the new second address, and may output the new address on bus 52. Register 50 keeps the first address unchanged while the second address is kept on being incremented by incrementer 48 by one (1) until a next branch instruction in the current track table row is reached. The first address and the second address are then kept in register 50 and are also provided onto bus 55.

On the other hand, if the condition of the branch instruction is satisfied, the branch is taken, and the taken information from CPU core 125 may control the selector 49 to select the new target address stored in the content of the track entry of the branch point and provided on bus 51 as the output on bus 52. Register 50 keeps the changed first address, and the new address (M+Z) is also provided onto bus 55. Control signal to selector 49 from CPU core 125 is also called a "taken" signal, indicating whether a branch is taken, to control selector 49.

Thus, for instruction memory 46 addressing purposes, a block address 56 is provided by tracking engine 320 while CPU core 125 only supplies an offset. CPU core 125 feeds back branch instruction execution status (the "taken" signal) to enable tracker 170 to make operation decisions.

Before a new track is executed, the instruction block corresponding to the track is filled into instruction memory 46. This process is repeated such that all instructions can be executed by CPU core 125 without a cache miss. Further, two second-level pointers (PHOL) can be used to look beyond the first branch to exam two subsequent branch points after the first branch point, and tracker 170 and/or fill/generator 123 may perform the filling of instruction memory or cache 46 corresponding to the two target tracks of the two branch points, and thus further hide the cache-fill latency.

Figure 3B:
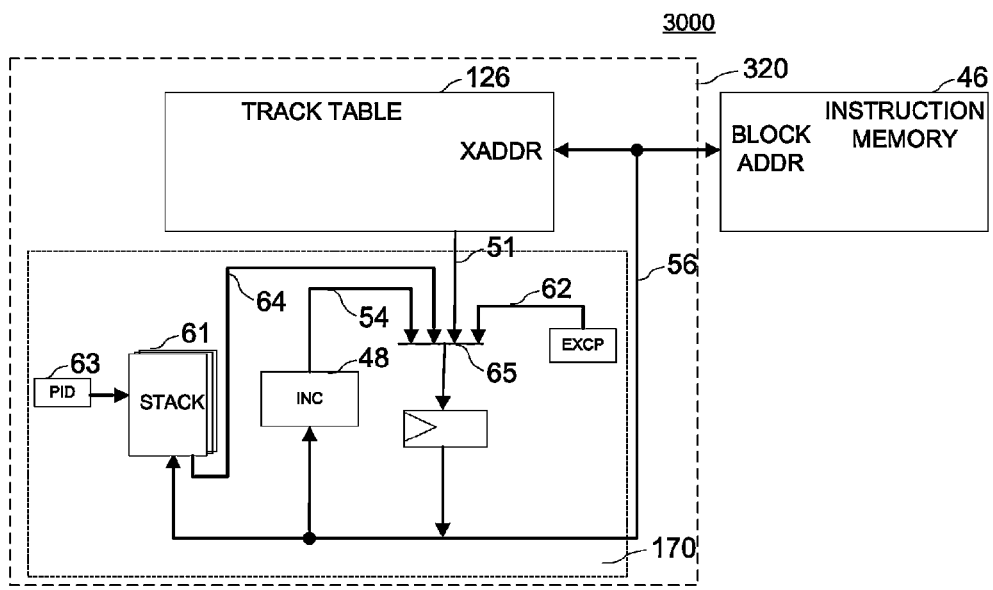
FIG. 3B illustrates another exemplary cache system consistent with the disclosed embodiments.

FIG. 3B shows another implementation 3000 consistent with the disclosed embodiments. Descriptions of similar components to those of FIG. 3A are omitted. As shown in FIG. 3B, an XADDR address or block address on bus 56 to address track table 126 and instruction memory 46 may come from various different sources. That is, tracker 170 may choose a track from a plurality of addressing sources. For example, a multiplexer 65 replaces selector 49 in FIG. 3A to select from four different sources: a target address of a current branch instruction from bus 51 (track table content); a normal address with unchanged first address and second address increased by one (1) from bus 54; an address from stack 61 on bus 64; and a track position corresponding to an exception hander EXCP from bus 62.

Multiplexer 65 may select a track (a current track or a new track) based on the current instruction and operation status. For example, if the second address in the new track is not a branch instruction, the first address is kept unchanged and incrementer 48 keeps increasing the second address by one (1) until reaching the next branch instruction. If the second address is or reaches a branch instruction, and the branch condition is not satisfied, the first address is also kept unchanged while the second address is increased similarly to reach the next branch instruction. On the other hand, if the branch condition is satisfied, or the branch is unconditional, the target address is used as the new first address to start a new track. Finally, if a last instruction is reached, a new track corresponding to the next instruction block is also started.

Special programs, such as exception handler, may also be filled into higher level memory 124 and corresponding tracks are created. Track point addresses of entries of the special programs may be stored in special registers (e.g., EXCP). When an event happens (e.g., an exception happens), the track point address 62 corresponding to a particular special program (e.g., an exception handler) can be selected by selector 65 to invoke the particular special program.

Further, stack 61 may include a plurality of stacks. Each stack may support stack operations such as push and pop instructions to save thread context or to save "CALL" routine states. When a program calls a routine (CALL), the address and/or other information of the track point corresponding to return address may be pushed into a stack, and when the called routine returns, the saved track point address and/or other information is popped out of the stack and force a change of track based on the track point (selector 65 selects 64). In certain embodiments, CPU core 125 may execute a "Jump and Link" type of instructions (i.e., a branch or call routine returns to a return address when the routine is completed). Similarly, a stack may be used to save the return address for this type of instruction. Further, CPU core 125 may execute a plurality of nested "CALL" or "Jump and Link" types of instructions. The stack may thus include a plurality of levels to save multiple return addresses at different stack levels. In addition, the plurality of stacks can support multi-thread programming. Track table 126 may include a plurality of tracks corresponding to different threads, and a thread identifier 63 may be used to indicate a current program thread. Further, thread identifier 63 points to a current stack to support the current thread. Other sources or arrangement may also be used.

That is, multi-thread programming can be supported by using a plurality of stacks, each one can be used separately by a thread or program identified by thread identifier 63.

Figure 4:
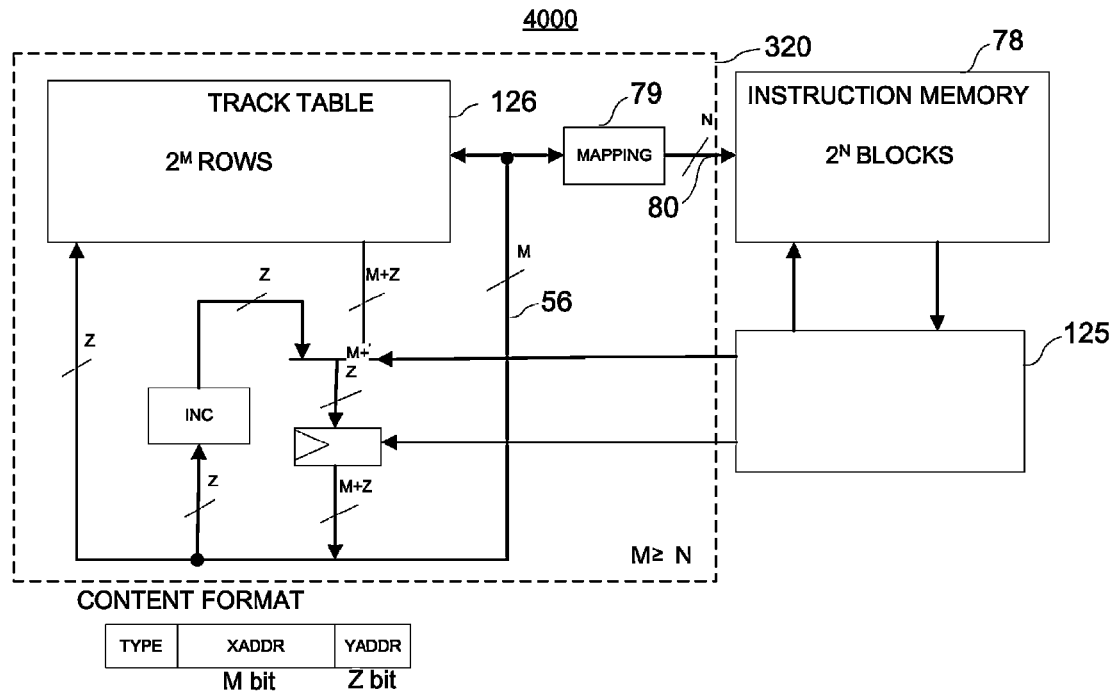
FIG. 4 illustrates another exemplary cache system consistent with the disclosed embodiments.

FIG. 4 shows another implementation 4000 consistent with the disclosed embodiments. Implementation 4000 is similar to implementation 2000 described in FIG. 3A. However, an instruction memory 78 is used instead of instruction memory 46. As shown in FIG. 4, instruction memory 78 may include $2^N$ memory blocks, where N is an integer and N≤M. That is, instruction memory 78 may contain less memory blocks than original instruction memory 46. The first address on bus 56 is thus only used to address track table 126.

Further, a mapping unit 79 may be provided to map the first address into a block number or block address 80 with N bits in length. That is, the address to the higher level memory is mapped to reduce the size of the higher level memory. Because it is less likely for CPU core 125 to use instruction addresses in the entire address space, the mapping based method can reduce the memory size of instruction memory 78 without having to provide memory blocks for all addressable addresses.

Figure 5:
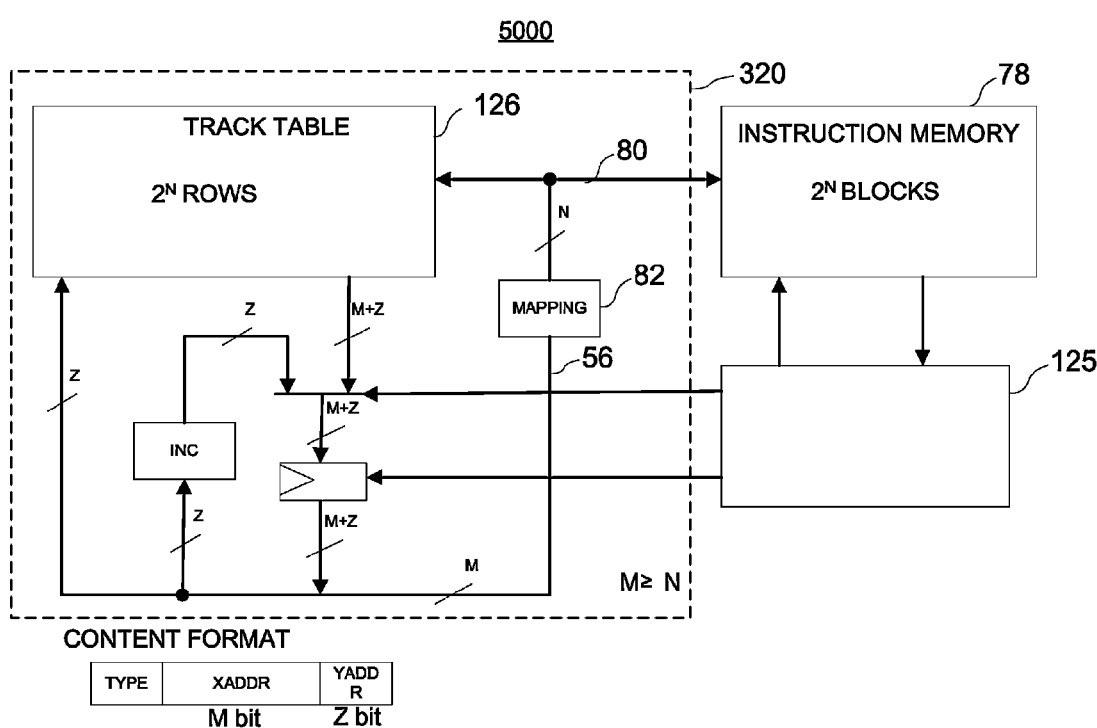
FIG. 5 illustrates another exemplary cache system consistent with the disclosed embodiments.

FIG. 5 shows another implementation 5000 consistent with the disclosed embodiments. Implementation 5000 is similar to implementation 4000 described in FIG. 4. However, track table 126 may only include $2^N$ rows. That is, the first address on bus 56 is mapped by mapping unit 82 to provide addresses for both track table 126 and instruction memory 78 to reduce the size requirement.

Further, rows in track table 126 may still use M bits for the first address and Z bits for the second address, while total numbers of rows in both track table 126 and instruction memory 78 may be less than the total addressable space addressed by CPU core 125 to reduce memory size for both track table 126 and instruction memory 78.

Figure 6:
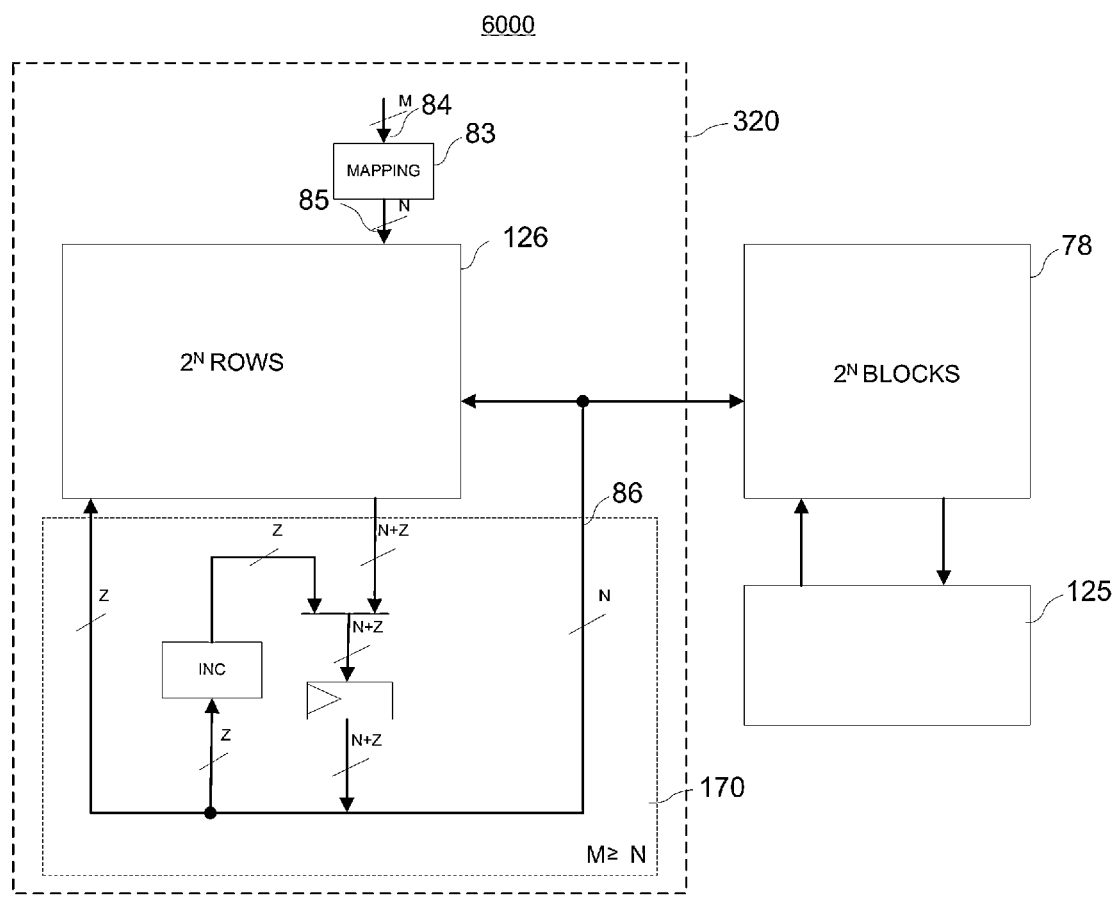
FIG. 6 illustrates another exemplary cache system consistent with the disclosed embodiments.

FIG. 6 shows another implementation 6000 consistent with the disclosed embodiments. Implementation 6000 is similar to implementation 5000 described in FIG. 5. However, as shown in FIG. 6, a mapping unit 83 may be arranged at the outside of both track table 126 and instruction memory 78 such that M-bit first address 84 is mapped into N-bit first address 85 before the first address is used by track table 126 and instruction memory 78. That is, the address to track table 126, instruction memory 78, and tracker 170 are all mapped to reduce the size.

Thus, rows in track table 126 may use N bits for the first address and Z bits for the second address, and total numbers of rows in both track table 126 and instruction memory 78 may be less than the total addressable space used by CPU core 125 to reduce memory size for both track table 126 and instruction memory 78. Further, a shorter first address may also increase performance of the entire system.

Figure 7A:
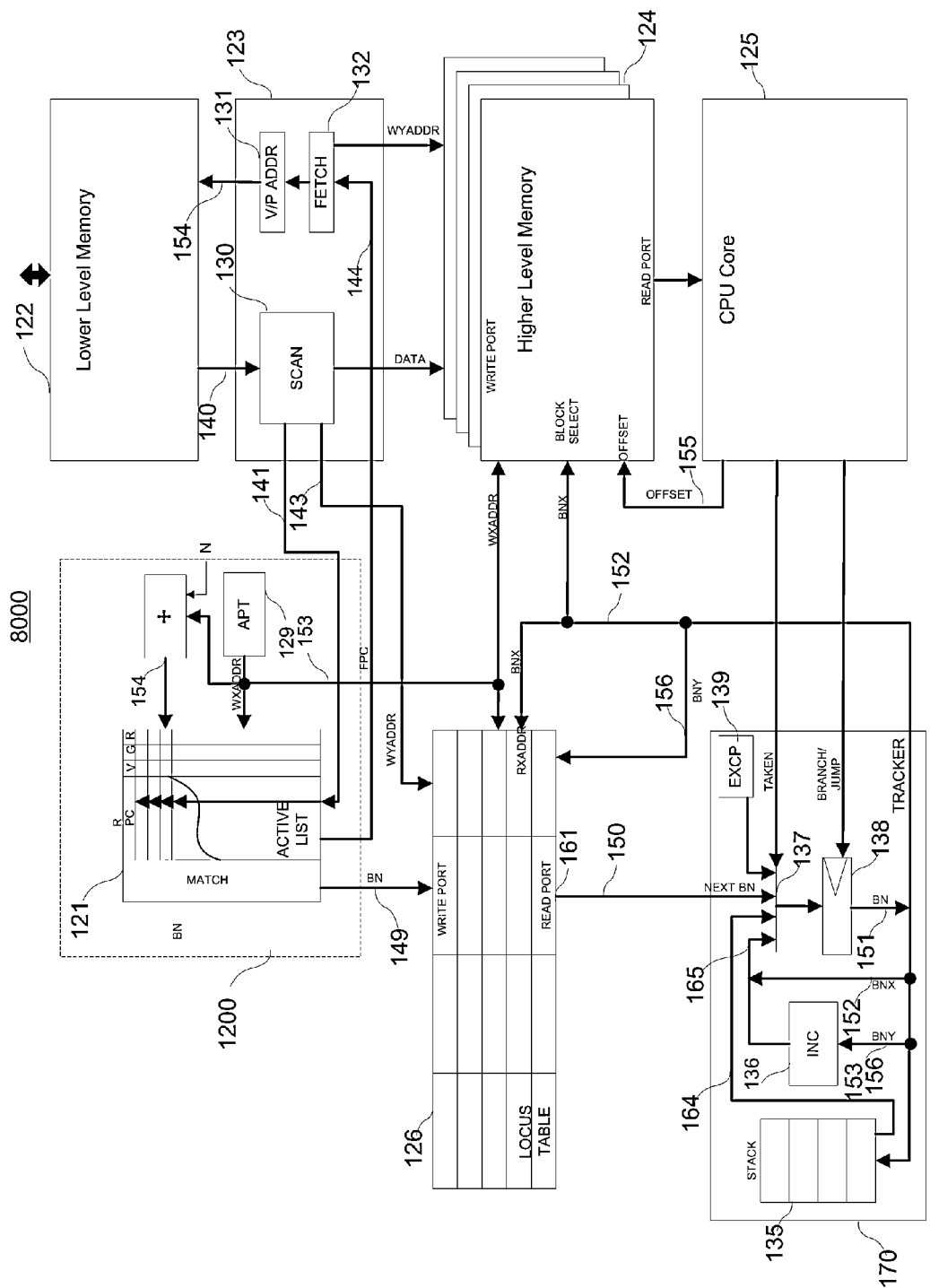
FIG. 7A illustrates another exemplary cache system consistent with the disclosed embodiments.

Although the above mapping methods may reduce the size of cache and track table, each instruction block may still correspond to a track. Additional structures may be used to keep established track from track table 126 without discarding the established track information. FIG. 7A shows an exemplary detailed implementation of cache system 8000 consistent with and/or improved upon one or more principles from above mapping methods.

As shown in FIG. 7A, cache system 8000 includes a lower level memory 122, a higher level memory 124, and a CPU core 125. Further, cache system 8000 includes a fill/generator 123, an allocator 1200, a track table 126, and a tracker 170. Allocator 1200, track table 126, and tracker 170 may be major part of tracking engine 320 (not shown). Also, as explained previously, tracking engine 320, fill/generator 123, and other related logics may be referred to as a cache control unit. It is understood that the various components are listed for illustrative purposes, other components may be included and certain components may be combined or omitted. The various components may be distributed over multiple systems, may be physical or virtual, and may be implemented in hardware (e.g., integrated circuitry), software, or a combination of hardware and software.

Further, fill/generator 123 may include a fill engine 132, a generator 130, and address translation unit 131, and tracker 170 may include a multiplexer 137, register 138, incrementer 136, and stack 135. Other components may also be included and certain components may be omitted. For illustrative purposes only, higher level memory 124 may be treated as a level-one (L1) cache, and lower level memory 122 may be treated as a level-two (L2) cache or a main memory, depending on particular applications and configurations. As explained previously, generator 130 extracts branch instruction (source) address (corresponding to the track table address for the branch instruction), branch type, and branch target address (corresponding to the track table content of the branch track point) to create track table 126.

Allocator 1200 may be used to store or allocate storage for track information to reduce size requirements of track table 126 and higher level memory 124. For example, allocator 1200 may include an active list 121. An active list may store information of an established track, and create a mapping between an address (or a part of the address) and a block number such that tracks can use any available rows in track table 126. For example, when creating a track, address information of the track is stored in the active list. Other arrangement may also be used.

Figure 8:
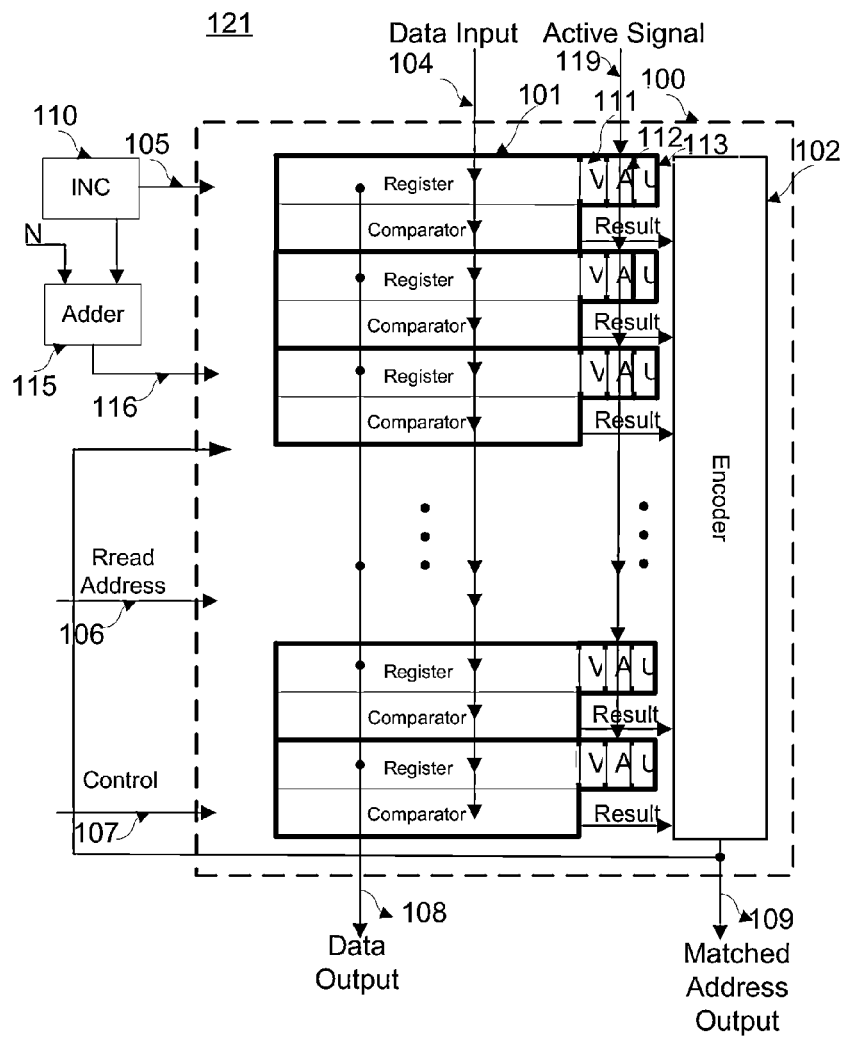
FIG. 8 illustrates an exemplary active list consistent with the disclosed embodiments.

As shown in FIG. 7A, active list 121 may be used to store the block addresses of the instruction blocks in higher level memory 124, each valid block address corresponding to a block number (BNX). The block number of a particular address may be obtained by a content matching between the address and the entries of active list 121. The matched content encodes a block number, which may then be used to index a row in the track table and a block in higher level memory 124. If there is no match, it means that a track corresponding to the address has not been established. The instruction block corresponding to the address is filled into higher level memory 124, a new track is created in track table 126 at a row indexed by address pointer 129 through bus 153, and the active list 121 entry indexed by pointer 129 through bus 153 is updated (written) with the associated block address. FIG. 8 shows an exemplary active list consistent with the disclosed embodiments.

As shown in FIG. 8, active list 121 may include a data/address bidirectional addressing unit 100. In one direction, data/address bidirectional addressing unit 100 may output a BNX number based on a block address input. Data/address bidirectional addressing unit 100 produces a corresponding BNX number by matching the inputted block (upper) address with the contents in data/address bidirectional addressing unit 100. In the other direction, data/address bidirectional addressing unit 100 may output a corresponding block address with a BNX number input. The inputted BNX number may index the entry in which the block address is stored. Further, data/address bidirectional addressing unit 100 may include a plurality of entries 101, each entry 101 includes a register, a comparator, a flag bit 111 (i.e., V bit), a flag bit 112 (i.e., A bit), and a flag bit 113 (i.e., U bit). Result from the comparator may be provided to encoder 102 to generate a matching entry number.

Control 107 may be used to control read/write state. V (valid) bit of each entry 101 may be initiated as '0', and A (Active) bit for each entry 101 may be written by an active signal on input line 119. A write pointer 105 may point to an entry in data/address bidirectional addressing unit 100, and the pointer is generated by a wrap-around increment unit 110 (129 in FIG. 7A). The maximum number generated by wrap-around increment unit 110 is the same as a total number of entries 101. After reaching the maximum number, the next number is generated from wrap-around increment unit 110 by increasing one to start from '0', and continues the increment until reaching the maximum number again.

During operation, when write pointer 105 points to a current entry 101, V bit and A bit of the current entry 101 may be checked. If both V bit and A bit are '0', the current entry is available for writing. After the write operation is completed, wrap-around increment unit 110 may increase the pointer by one (1) to point to next entry. However, if either of V bit and A bit is not '0', the current entry is not available for writing, wrap-around increment unit 110 may increase the pointer by one (1) to point to next entry, and the next entry is checked for availability for writing.

During matching, inputted block address data input 104 is compared with the content of the register of each entry 101. The contents in the registers may only contain the upper part of the address (corresponding to a memory block in memory 124). If there is a match, the encoder 102 encodes the matching result into an entry number and provides the entry number onto match address output 109. If there is no match, the inputted block address is written into the register 101 of the entry pointed by address pointer 105, the V bit of the same entry is also set to '1', and the entry number is provided onto match address output 109. This entry number outputted is later referred as BNX (i.e. block number because it index a memory block). The lower part of the input address (i.e., the offset within a memory block) is later referred as BNY. The BNX and BNY together are referred as BN which is later stored in a track table entry and is used to index track table 126, higher level memory 124, and active list 121. Although generally standing for 'block number', the term 'BN', as used herein, may refer to the entire address and thus includes both BNX and BNY, or may refer to only an upper part of the address and thus is equivalent to BNX, depending on a particular usage context as understood by those skilled in the art. Further, wrap-around increment unit 110 may increase the pointer BNY by one (1) to point to next entry.

For reading, read address 106 is provided to select an entry in entries 101, and the content of the register of the selected entry will be read out and provided onto data output 108, and the V bit of the selected entry 101 is set to '1'.

U bit of an entry 101 may be used to indicate usage status. When write pointer 105 points to an entry 101, the U bit of the pointed entry is set to '0'. When an entry 101 is read, the U bit of the read entry is set to '1'. Further, when wrap-around increment unit 110 generates a write pointer 105 pointing to a new entry, the U bit of the new entry is checked. If the U bit is '0', the new entry is available for replacement, and write pointer 105 stays on the new entry for possible data to be written. However, if the U bit is '1', write pointer 105 further points to a next entry.

Optionally, a window pointer 116 may be used to set a U bit of a pointed entry to '0', and window pointer 116 is N entries ahead of write pointer 105 (N is an integer). The value of window pointer 116 may be determined by adding value N to the write pointer 105 by adder 115. The N entries between write pointer 105 and window pointer 116 are considered as a window. Thus, clear pointer sets the U bit of an entry to "0". Later, any read of the entry sets the U bit to "1". When the write pointer 105 points to the entry, the U bit is checked. If the U bit is "0", which means this entry has not been used since the clear pointer 116 clears this entry, so the write pointer 105 stays at this entry to index this entry for the next writing. On the other hand if the U bit is a "1", which indicates this entry has been used recently, then the write pointer moves on to next entry. The replacing rate of the entries in 101 can be changed by changing the size of window (i.e. changing the value of N). This thus may be used as a usage-based replacement policy for replacing entries in active list 121.

Alternatively, the U bit may include more than one bits thus becomes the U bits. The U bits may be cleared by write pointer 105 or window (clear) pointer 116, and every read may increase the U bits by '1'. During writing operation, the U bits of a current entry are compared to a predetermined number. If the value of U bits is less than the predetermined value, the current entry is available to be replaced. If the value of U bits is greater than the predetermined value, write pointer 105 moves to next entry.

Returning to FIG. 7A, when CPU core 125 starts up, a reset signal (not shown) sets '0' to the valid bit of all entries of active list 121. When reset signal is released, a reset vector (reset startup instruction address) is placed on bus 141 to active list 121 for matching. Because there is no matching with the contents of the entries, active list 121 writes the upper part of the address (i.e. the reset vector) into the active list entry pointed by WXADDR 153 generated by pointer 129, sets the valid bit to '1' for the entry, and puts the reset vector on bus 144 to fill engine 132.

Fill engine 132 fetches the instructions addressed by reset vector from lower level memory 122 through bus 154. The fetched instructions are filled into higher level memory 124 to a memory block indexed by WXADDR 153 from pointer 129. Also, when the instructions are fetched from lower level memory 122 through bus 140, generator 130 may scan and analyze the instructions. Further, track information associated with the instruction is written to corresponding entries or track points in the row in track table 126 pointed by WXADDR 153.

After this filling operation is completed, pointer 129 moves to a next available entry in active list 121. Optionally, address translation unit 131 may translate between virtual memory address and physical memory address. Address translation unit 131 may also be placed outside lower level memory 122 to reduce fetching delays from lower level memory 122 to higher level memory 124.

Generator 130 scans every instruction in an instruction block filled into higher level memory 124. When generator 130 finds a branch instruction, it calculates a target address of the branch instruction. The target address may be represented by the address of the instruction block containing the branch instruction plus an offset of the branch instruction, and also plus a branch distance to the target instruction. The lower part of the target address is the branch target instruction's offset within the row (later referred as BNY). The upper part of the calculated target address is then matched with contents in active list 121. If there is no match, active list 121 may put this value on bus 144 to the fill engine 132 to perform the filling operation.

On the other hand, if there is a match, it means the instruction block which contains the branch target is already in higher level memory 124, and the matched row number (BNX) and the branch target instruction's offset within the row (BNY) (i.e. together named BN) is placed onto bus 149 to be written to a track table entry. This entry is indexed by WXADDR 153 (row address) and bus 143 from the generator 130 (column address) which corresponds to the offset of the branch instruction in its own instruction block. Thus, after all instructions from an instruction block are scanned and processed, entries indexed by the same WXADDR in active list 121, track table 126, and higher level memory 124 contain information corresponding the same instruction block.

More particularly, higher level memory 124 includes the entire instruction block to be fetched by CPU core 125; active list 121 includes block (upper) address of the instruction block to be matched with subsequent instructions; and track table 126 includes all branch points within the instruction block, including their positions within the instruction block, and the BN values of their target addresses. A BN value includes a row address BNX and a column address BNY.

Figure 9:
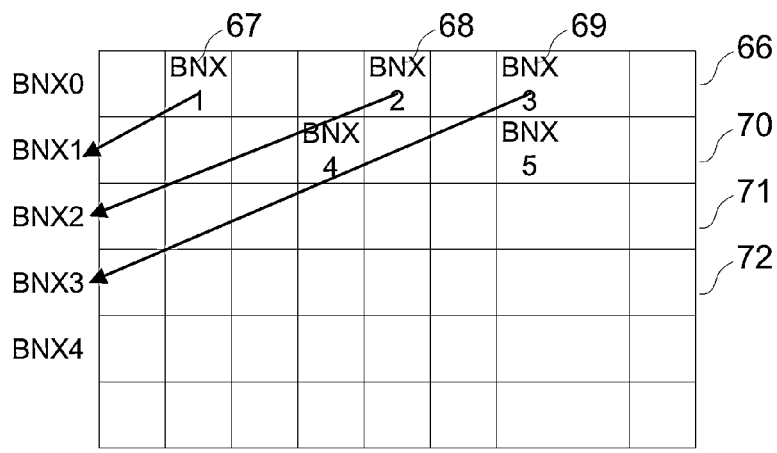
FIG. 9 illustrates an exemplary method to create new tracks consistent with the disclosed embodiments.

FIG. 9 shows an exemplary method to create new tracks using track table 126 consistent with the disclosed embodiments. As shown in FIG. 9, an existing track 66 (denoted as BNX0) may include three branch instructions or branch points 67, 68, and 69. When examining branch point 67, a new track 70 (next available row denoted as BNX1) is established to contain the target instruction of branch point 67, and the track number or the row number in track table 126 (i.e., BNX1) is recorded in branch point 67 as the first address. Similarly, when examining branch point 68, another new track 71 (denoted as BNX2) is created in track table 126 and the track number is recorded in branch point 68; when examining branch point 69, another new track 72 (denoted as BNX3) is created in track table 126 and the track number is recorded in branch point 69.

Therefore, new tracks corresponding to all branch points in a single track may be created. Further, track table 126 may be big enough to hold tracks for all block numbers and a new track number can be obtained by increase a largest used track number by one (1). Optionally, a track may correspond to various numbers of instructions based on a certain track granularity (a large granularity may allow a large number of instructions in an instruction block to be represented by a smaller number of entries in a single track or row).

Figure 7B:
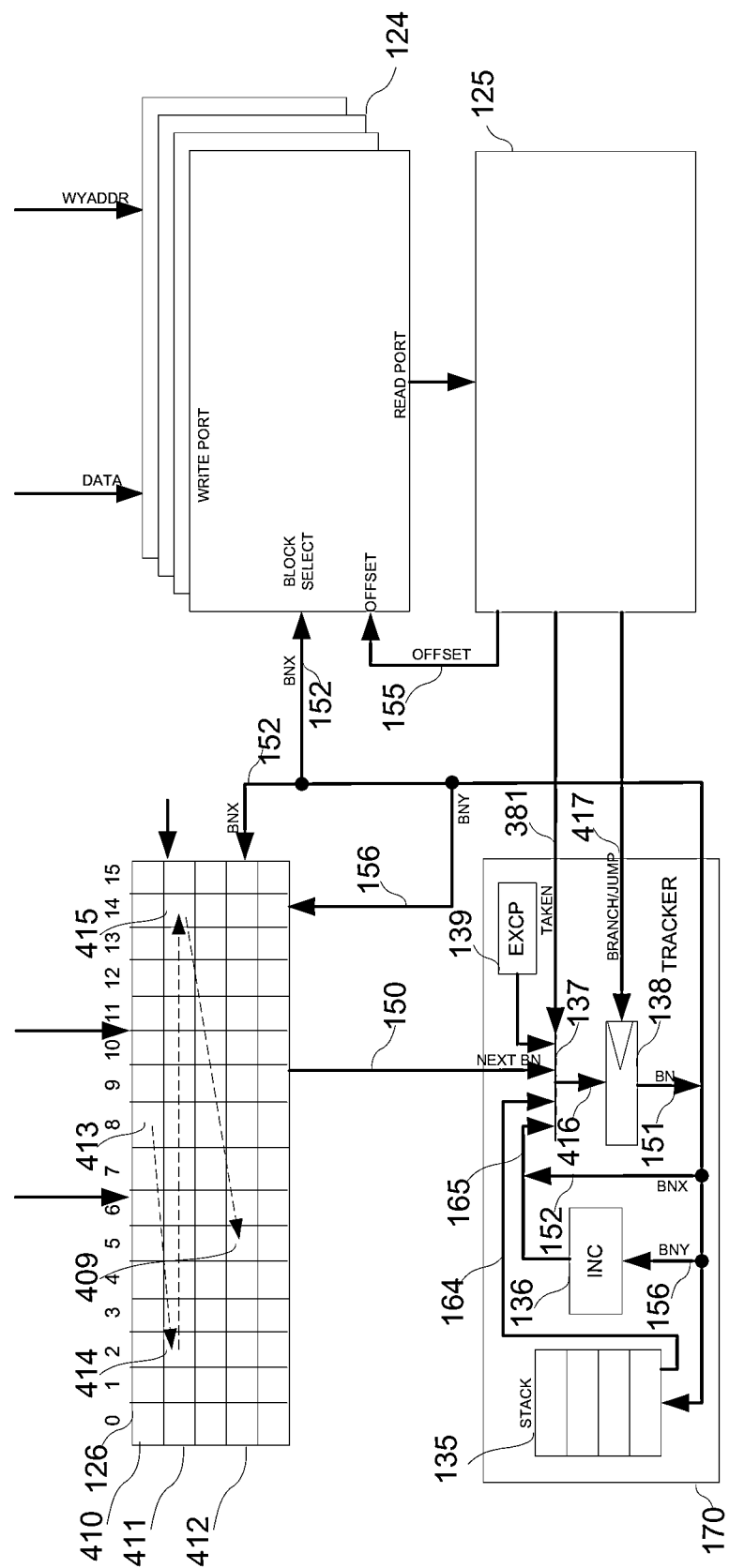
FIG. 7B illustrates a part of an exemplary cache system consistent with the disclosed embodiments.

Returning to FIG. 7A, continuing the operation, tracker 170 may output a BN 151 to be used to address track table 126 and higher level memory 124. That is, tracker 170 may be provided to coordinate operations of track table 126, higher level memory 124, and CPU core 125. FIG. 7B shows a part of cache system 8000 for illustrating such operations.

As shown in FIG. 7B, tracker 170 includes a stack 135, an incrementer 136, a multiplexer 137, a register 138, and an exception handler address register 139. During operation, tracker 170 controls a read pointer of track table 126. That is, tracker 170 outputs an address (i.e., BN 151) to be used to address track table 126 and higher level memory 124. BN 151 includes BNX 152 and BNY 156. BNX 152 may be used to address a row or a track from track table 126 and to address a memory block of higher level memory 124; while BNY 156 may be used to address an entry from a track or row in track table 126 pointed by BNX 152.

Tracker 170 may output BN 151 selected from different sources by multiplexer 137. For example, multiplexer 137 may include four input BN sources: a stored BN from stack 135 on bus 164, a new BN on bus 165 generated from current BNX 151 with an incremented BNY from incrementer 136 using current BNY 156, a BN from track table 126 on bus 150, and a BN from exception handler register 139. Other sources may also be included. As explained previously, the stored BN from stack 135 may be a BN corresponding to an instruction address used in the return of a function call, and the BN from exception handler register 139 corresponds to an exception handler address. All BNs inputted into multiplexer 137 include a BNX and a BNY.

Further, multiplexer 137 is controlled by signal 381 from CPU core 125 to select a particular BN on output 418. For example, when CPU core 125 incurs an exception, signal 381 controls multiplexer 137 to select the BN from exception handler register 139 as the output 418; when CPU core 125 performs a return of a function call, signal 381 controls multiplexer 137 to select the BN from stack 135 as the output 418; when CPU core 125 takes a branch (signal 381 becomes a taken indicator), signal 381 controls multiplexer 137 to select the BN from track table 126 as the output 418; and when CPU core 125 does not take a branch or during normal operation, signal 381 controls multiplexer 137 to select the BN 165, whose BNX 152 is unchanged but BNY is incremented by incrementer 136 as the output 418.

Bus or output 418 (i.e., the next BN) from multiplexer 137 may optionally be stored in register 138 and providing updated tracker output 151, controlled by signal 417 from CPU core 125. When signal 417 controls register 138 to keep the current BN 151 unchanged, the output 418 is not outputted from register 138. On the other hand, when signal 417 controls register 138 to update the current BN 151, the output 418 is then provided on bus 151 to become the current BN 151 as to update both BNX 152 and BNY 156.

Tracker 170 provides BN 151 including BNX 152 and BNY 156. BNX 152 is provided to address the instruction block, and CPU core 125 uses an offset of PC to fetch the instruction for execution. Also, BNX 152 and BNY 156 are provided to track table 126 such that track table 126 provides next BN on bus 150.

To illustrates interactions between track table 126 and tracker 170, track table 126 may include track (i.e., row) 410, 411, and 412, as shown in FIG. 7B. Each track may include 16 entries or track points from entry 0 to entry 15. Further, track point 413 (entry 8 of track 410) may be a branch point with a branch target track point 414 (entry 2 of track 411), and track point 415 (entry 14 of track 411) may be another branch point with a branch target track point 416 (entry 5 of track 412).

Assuming instruction block corresponding to track 410 was filled into higher level memory 124 and CPU core 125 starts executing instructions at the beginning of track 410. That is, the program counter (PC) of CPU core 125 starts from the address of the instruction corresponding to entry 0 of track 410.

At the same time, assuming that tracker 170 also sends out a read pointer 151 with the BNX and BNY pointed at entry 0 of track 410 in track table 126. Other entry of track 410 may also be used. The content of the entry may be checked to indicate the type of instruction information and address information, etc.

When starting with entry 0 of track 410, as previously explained, because entry 0 of track 410 is not a branch point, tracker 170 keep BNX 152 unchanged while increasing BNY by one via incrementer 136 to provide a next BN, which corresponds to the next entry of track 410 in track table 410. Tracker 170 continues increasing BNY to proceed with the next entry of track 410 until reaching a branch point, e.g., track point 413 (entry 8 of track 410). During this period, because BNX is unchanged, the instruction block address is thus unchanged, and CPU core 125 can continue fetching instructions from higher level memory 124 using the offset of PC.

After pointer 151 provided by tracker 170 reaches track point 413 (entry 8 of track 410), because track point 413 is a branch point, both source address (that is value of pointer 151) and target address are analyzed. If the instruction block containing the next instruction from the source address of the branch point and/or the instruction block containing the target address have not been filled into higher level memory 124, the instruction blocks are filled into higher level memory 124 for possible execution by CPU core 125.

In certain embodiments, because an entry in active list 121 is created when track table rows are created, the instruction block containing the next instruction from the source address and the instruction block containing the target address may have been filled into higher level memory 124 at the time tracker 170 reaches track point 413. That is, because next instruction is entry 9 of track 410 and the instruction block corresponding to track 410 has already been filled into higher level memory 124, no filling is needed for the next instruction to track point 413. Further, because track point 414 is already created in track table 126 and on active list 121, instruction block corresponding to track 411 containing the branch target (entry 2 of track 411) also has been filled into higher level memory 124.

Because the speed of CPU core 125 executing instructions is slower that the speed of tracker 170 moving through track points corresponding to the instructions, tracker 170 may wait or sync with CPU core 125 at the branch point. Further, track table 126 may provide the branch target as the next BN 150 (entry 2 of track 211) with BNX as 411 and BNY as 2, and signal 381 may provide an indication as to whether the branch is taken or not when the branch instruction of track point 413 is executed by CPU core 125.

If the branch is taken, as in this example, the next BN provided by track table on bus 150 is then used by tracker 170 as BN 151, with BNX pointing to track 411 and BNY pointing to entry 2 of track 411. BNX is also used as an address to the corresponding instruction block in higher level memory 124 such that CPU core 125 can start executing the instruction corresponding to entry 2 of track 411. If the branch is not taken, however, tracker 170 moves ahead as if the branch point is a simple non-branch point.

Similarly, starting from entry 2 of track 411, tracker 170 finds next branch point 415 (entry 14 of track 411) with a branch target of track point 416 (entry 5 of track 412). Operations are similar to branch point 413, as explained above. If branch is taken with respect to branch point 415 (entry 14 of track 411), CPU core 125 starts executing from track point 416. On the other hand, if the branch is not taken with respect to branch point 415, tracker 170 moves to entry 15 of track 411, which is the last entry of track 411.

When the entry is not a branch point but is a last instruction of the track, starting from the track point corresponding to the next instruction in the next track, tracker 170 may keep the value of BNX 152 unchanged while keep increasing BNY 156 by one (1) to create new BNYs until a new BNY points to a first branch point from the next track.

Thus, track table 126 is created ahead of actual execution of instructions by CPU core 125, so that instructions can be filled in higher level memory 124 without delay to avoid or reduce penalties caused by cache miss. Other mechanisms, such as increasing track table operation speed, increasing granularity of BNY, reducing the number of entries in track table, e.g., using an entry of track table to represent multiple instructions, can be used separately or combined in above described embodiments.

The cache miss rate may be further improved using multiple branch levels in track table 126. For example, when reading out entries in a table row of track table 126, a branch track point is found and the instruction block corresponding to the branch target instruction of the branch track point is filled into higher level memory 124. A new track (level one) is also created in track table 126. Further, the new track is also examined, and the first branch track point of the new track is also found and the instruction block corresponding to the branch target instruction of the first branch track point of the new track is also filled into higher level memory 124. Another new track (level two) is then created in track table 126. Thus, two levels of branch points are used to fill higher level memory 124, and the fill operation may be further hided from CPU core 125. The level two tracks can also be created with respect to all potential execution outcomes of the first level track. That is, the level two tracks are not only created regarding a first branch point of the new track corresponding to the branch target instruction of the current branch point, but also created regarding a first branch point of the new track corresponding to the next instruction following the current branch point.

Further, various tracks with one or more levels may be created based on a distance to the current program count (PC). The distance may be represented by a total number of instructions in advance to the current instruction being executed by CPU core 125. That is, the tracks may be created to fill the instruction blocks corresponding to at least the total number of instructions determined by the distance, no matter how many levels of tracks are created to keep the filled instructions ahead of the execution with a preconfigured advance. Or the distance may also be represented by a distance from the current branch point. That is, the tracks may be created to fill the instruction blocks corresponding to at least the total number of instructions following the branch point (in both taken and not-taken possibilities) determined by the distance, no matter how many levels of tracks are created to keep the filled instructions ahead of the execution to cover any filling latency. Other parameters may also be used.

In addition, in certain embodiments, a plurality of memory blocks (e.g., instruction blocks and data blocks) may be filled into higher level memory 124 at the same time. When filling the plurality of instruction or data blocks, each block may be divided into multiple segments, and each segment may be assigned a priority. Thus, a single block does not need to be filled at once. Rather, segments of different blocks may be filled in an interleaved scheme according to the priority of an individual segment, which may be set based on what is needed by CPU core 125.

For example, if an instruction block is 256 words (1024 bytes) long, the instruction block may be divided into four segments, each containing 64 words (256 bytes). Thus, for an instruction block starting at 0x1FC00000, four segments start at 0x1FC00000, 0x1FC00100, 0x1FC00200, and 0x1FC00300, respectively. If CPU core 125 needs an instruction in the second segment 0x1FC00100, the priority of this segment 0x1FC00100 is set to high. Thus, the filling sequence may be set to 0x1FC00100, 0x1FC00200, 0x1FC00300, and 0x1FC00000 while filling the instruction block. Further, if there is an additional or second instruction block starting at 0x90000000 to be filled at the same time as the instruction block starting at 0x1FC00000, the second instruction block is also divided into four segments starting at 0x90000000, 0x90000100, 0x90000200, and 0x90000300, respectively. If CPU core 125 needs an instruction in the fourth segment (0x90000300), the fourth segment may have a high priority and the entire filling sequence may be set to 0x1FC00100, 0x90000300, 0x1FC00200, 0x90000000, 0x1FC00300, 0x90000100, 0x1FC00000, and 0x90000200 in an interleaved way. Further, more blocks and segments may be interleaved to fill higher level memory 124, and other configurations may also be used. Although the above example is used to fill the instruction block, the data block can be filled similarly. Further, the instruction block and the data block can be filled together interleavedly.

Figure 10A:
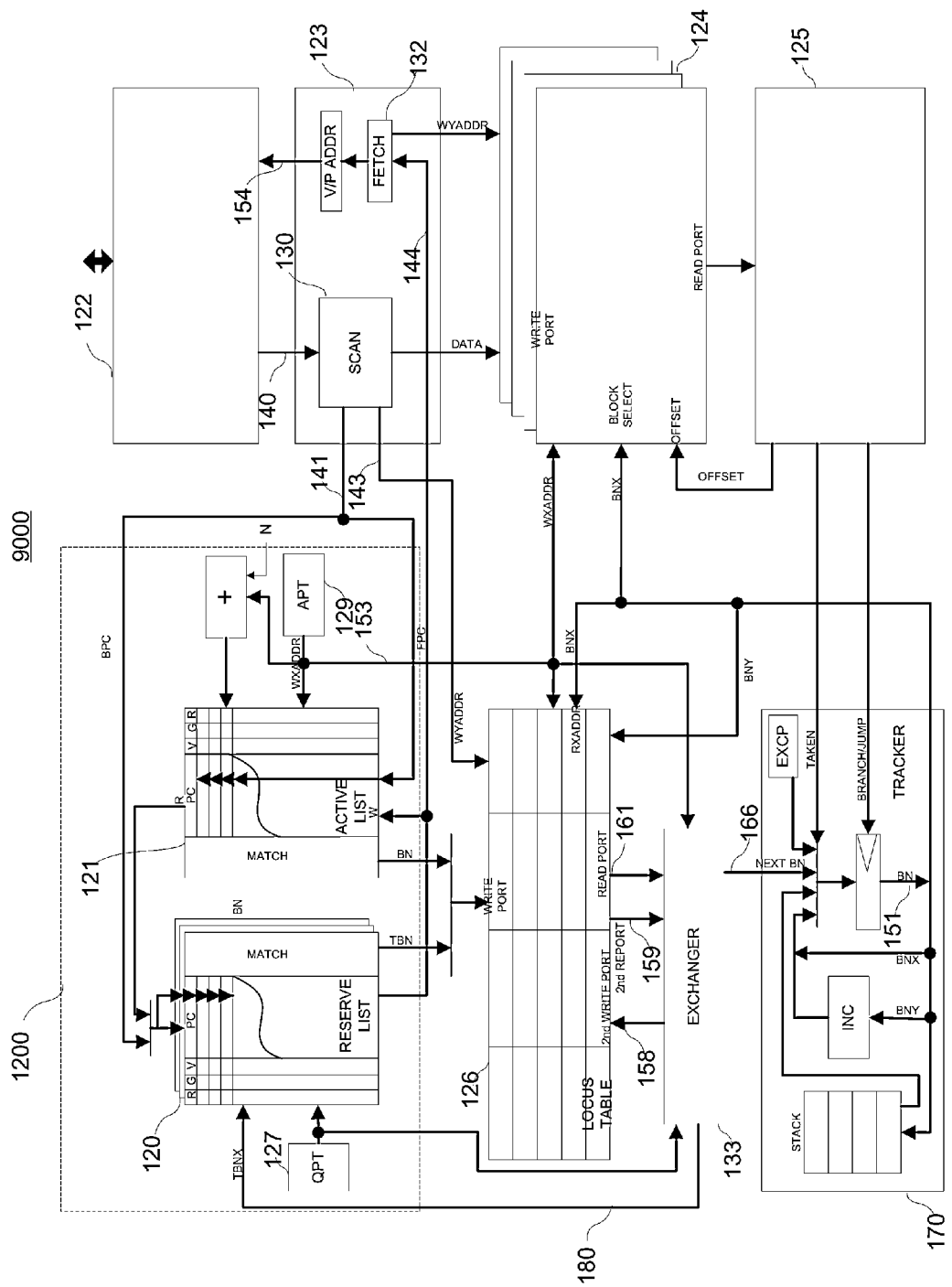
FIG. 10A illustrates another exemplary cache system consistent with the disclosed embodiments.

FIG. 10A shows another exemplary cache system 9000 consistent with the disclosed embodiments. Cache system 9000 is similar to cache system 8000 described in FIG. 7A. However, as shown in FIG. 10A, cache system 9000 includes an exchanger 133, and allocator 1200 in cache system 9000 includes a reserve list 120 in addition to active list 121.

A reserve list is similar to an active list and is used together with the active list to store track information of all branch instructions of a program such that the size of the active list and L1 cache can be reduced. More particularly, when a track corresponding to a branch point already exists, branch target of the track can be stored in the reserve list. When the execution flow is close to the branch point, the branch target track can then be established based on the stored information in the reserve list.

In certain embodiments, an active list stores established tracks (e.g., corresponding instruction blocks are filled into higher level memory 124), and a reserve list stores tracks to be established (e.g., corresponding instruction blocks have not been filled into higher level memory 124). That is, when a track is created, a track point may correspond to an entry in the active list (e.g., a BN) or an entry in the reserve list (a TBN). A 'TBN', as used herein, stands for "tentative block number" or "tentative BN" and refers to a block number in a different number space from that of a BN, such as a number space used in the reserve list versus a number space used in the active list. Thus, a TBN and a BN may be distinguished from each other. For example, a TBN and a BN may be distinguished by the most significant bit. When the track point (e.g., a branch point) includes a BN, the instruction block containing the branch target instruction is already filled into higher level memory 124. On the other hand, when the track point includes a TBN, the instruction block containing the branch target instruction is not yet filled into higher level memory 124. Thus, when a track includes several branch points, using TBN instead of BN may reduce the amount of memory fills and save L1 cache memory space because some of the branch target may never be reached.

Figure 12:
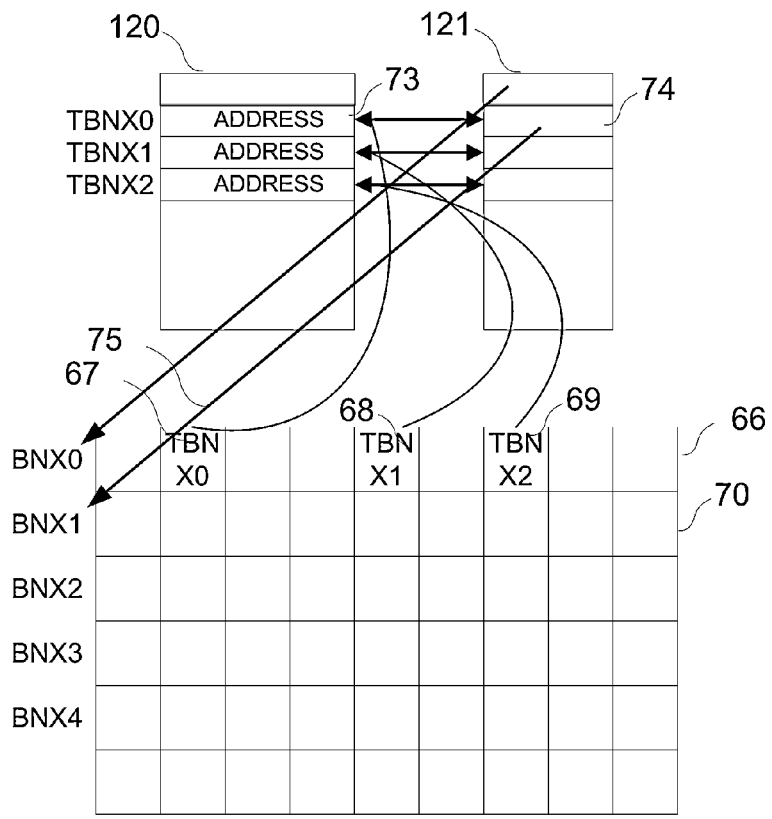
FIG. 12 illustrates an exemplary method to create new tracks consistent with the disclosed embodiments.

That is, a reserve list may be used to improve performance of the system and reduce storage capacity. FIG. 12 shows an exemplary method to create new tracks using track table 126, reserve list 120, and active list 121.

As shown in FIG. 12, existing track 66 (BNX0) may include three branch points 67, 68, and 69. For illustrative purpose, BNX numbers are used to denote tracks or rows in track table 126. When examining branch point 67, an address of the target instruction of branch point 67 is stored in reserve list 120 as entry 73 (denoted as TBNX0), and the entry number of entry 73 (i.e., TBNX0) is recorded in branch point 67 as the first address. When examining branch point 68 and branch point 69, the addresses of the target instruction of branch point 68 and branch point 69 are also stored in reserve list 120 (denoted as TBNX1 and TBNX2). Similarly, entry numbers of those two entries are recorded in branch points 68 and 69, respectively, as the first addresses.

Further, when branch instruction 67 is to be executed by CPU core 125, the target address in entry 73 of reserve list 120 is moved into active list 121 as entry 74. In certain embodiments, a total entry number of active list 121 is the same as a total entry number of track table 126 such that a one-to-one relationship can be established between entries in active list 121 and entries in track table 126. Thus, according to relationship 75, a new track 70 which contains the branch target of branch point 67 in track table 126 can be created based on the corresponding entry (BNX1) in active list 121. The TBNX0 number in branch instruction 67 is also replaced by BNX1 so next time this instruction is about to be executed, the BNX1 can directly index the target track and corresponding memory block without a reference to reserve list.

Therefore, a new track is to be created only when the corresponding branch instruction is about to be executed or being executed. That is, before branch point 67 is executed, target addresses of branch points 68 and 69 are stored in reserve list 120 but new tracks corresponding to branch points 68 and 69 are not created.

Returning to FIG. 10A, when CPU core 125 starts up, a reset signal (not shown) sets '0' to the valid bit of entries of active list 121. When reset signal is released, a reset vector (reset startup instruction address) is placed on bus 141. Because both reserve list 120 and active list 121 cannot find a match address in the entries of reserve list 120 and active list 121, reserve list 120 puts the address on bus 144 for fill engine 132 to fetch the instruction block (e.g., reset vector) from lower level memory 122 through bus 154.

Pointer 129 points to a current entry of active list 121 through bus 153, and pointer 129 also points to an instruction or memory block of higher level memory 124 to store the fetched instruction block.

Also, track information associated with the instructions in the instruction block are extracted by generator 130 and written to a corresponding entries in track table 126 pointed by pointer 129 through address bus 153. After this filling operation is completed, the valid bit of current entry of active list 121 is set as '1'. Then pointer 129 moves to a next available entry in active list 121.

Generator 130 scans every instruction in an instruction block filled into higher level memory 124. When generator 130 finds a branch instruction, it calculates a target address of the branch instruction. The target address may be represented by the address of the instruction block containing the branch instruction (the source block address) plus an offset of the branch instruction from the source block address (the source offset), and also plus a branch distance from the source instruction to the target instruction (typically named as a branch offset). The upper part of the calculated target address is then matched with contents in both reserve list 120 and active list 121.

If there is no match in both reserve list 120 and active list 121, the upper part of the target address is written into an available entry in reserve list 120 pointed by pointer 127, and the value of pointer 127 together with the lower part of target address (the target offset address) (together know as TBN) is written into an entry in track table 126 determined by bus 153 (branch source row address) and bus 143 (branch source offset address). Bus 143 may provide a column address corresponding to the offset of the branch instruction in the filled instruction block.

If there is a match in reserve list 120, the matched value of pointer 127 together with the target offset as a TBN is then written into the entry in track table 126 determined by bus 153 (row address) and bus 143 (offset). If there is a match in active list 121, the matched active list entry number together with the target offset as a BN is then written into the entry in track table 126 determined by bus 153 (row address) and bus 143 (offset). Instructions corresponding to target address in TBN is not yet filled to higher level memory 124 while instructions corresponding to target address in BN is already in higher level memory 124.

Repeating the above process until the entire instruction block is fetched into higher level memory 124. Thus, reserve list 120, active list 121, and track table 126 have information about the instruction block, and higher level memory 124 has the entire instruction block for use by CPU core 125. Active list 121 has starting (block) address of the instruction block for later instruction block match, and track table 126 includes all branch points in the instruction block and corresponding target TBNs or BNs.

When tracker 170 outputs a BN 151 to indicate an entry in track table 126, the content of the entry is read out through read port 161. If the content does not indicate a branch point, similar process to those described in FIG. 7A is used. However, if the content of the entry indicates a branch point, the branch target address (BN or TBN) is read out to exchanger 133.

Figure 13:
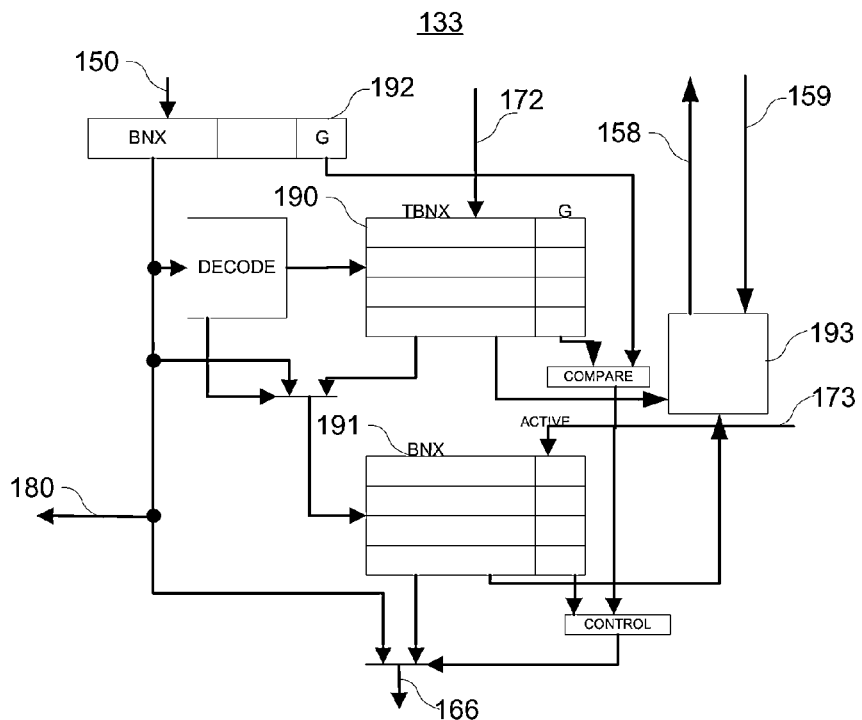
FIG. 13 illustrates an exemplary exchanger consistent with the disclosed embodiments.

Because the branch target address may correspond to an entry in reserve list 120 (i.e., a TBN) or an entry in active list 121 (i.e., a BN), exchanger 133 may be used to exchange between entries in reserve list 120 and active list 121. The exchanger 133 sends only BN on bus 166 to tracker 170. The exchanger 133 sends TBNX on bus 180 to reserve list 120 to initiate the process to fill the corresponding memory block from lower memory to higher memory 124 and a BN is outputted after the exchange. This pre-filling ensures the instructions are in higher memory 124 when CPU needs them. FIG. 13 shows an exemplary exchanger consistent with disclosed embodiments.

As shown in FIG. 13, exchanger 133 includes a TBNX table 190 and a BNX table 191. Entries in TBNX table 190 may correspond to entries in active list 121 and may be used to map entries moved to reserve list 120 from active list 121. Each entry in TBNX table 190 may include an entry number of the corresponding entry in reserve list 120 and a flag G bit.

Entries in BNX table 191 may correspond to entries in reserve list 120 and may be used to map entries moved to active list 121 from reserve list 120. Each entry in BNX table 191 may include an entry number of the corresponding entry in active list 121 (i.e., BN) and a valid bit.

Further, track information outputted on bus 150 from track table 126 may also include a G bit 92, which corresponding to the G bit in TBNX table 190, indicating whether the BNX is currently in active list 121 for direct outputting, or a mapping may be needed.

When an entry in active list 121 is moved to reserve list 120, a corresponding entry in TBNX table 190 is used to record entry number (BN) 172. Similarly, when an entry in reserve list 120 is moved to active list 121, a corresponding entry in BNX table 191 is used to record entry number of the entry and the valid bit is set to valid.

When track point information 150 includes entry number of reserve list 120, the entry number TBNX is used as an index to read out a BNX value and valid bit from BNX table 191. If the BNX value is valid (i.e., valid bit is set to valid), the BNX value is provided on output 166 and send to tracker. On the other hand, if the BNX value is not valid, the TBNX is used as an index to read content from reserve list 120 through bus 180 and initiate the process to fill the memory block corresponding to the TBNX from lower level memory 122 to higher level memory 124.

When track point information 150 includes entry number of active list 121 (i.e., BN), if the G bit in track point information 150 is the same as the G bit in corresponding entry in TBNX table 190, the BNX value is provided on output 166. On the other hand, if the G bit in track point information 150 is not the same as the G bit in corresponding entry in TBNX table 190, the entry number of reserve list 120 is read out from TBNX table 190 and is used as an index to read out a BNX value and valid bit from a corresponding entry in BNX table 191. If the BNX value is valid, the BNX value is provided on output 166. On the other hand, if the BNX value is not valid, the entry number of reserve list 120 is used as an index to read content from reserve list 120 through bus 180.

Thus, as long as TBNX table 190 and BNX table 191 have valid entries, an exchange module 193 keeps scanning track table 126, reading track point information from bus 159. If the track point information of a track point includes an entry number of active list 121 and the entry number corresponds to a valid entry in TBNX table 190, the entry number of reserve list 120 is outputted on bus 158, and the track point information is changed to include the entry number of reserve list 120. Similarly, if the track point information of a track point includes an entry number of reserve list 120 and the entry number corresponds to a valid entry in BNX table 191, the entry number of active list 121 is outputted on bus 158, and the track point information is changed to include the entry number of active list 121.

By scanning the entire track table, exchanges between entries in TBNX table 190 and BNX table 191 can be achieved. Such exchanges may be carried in various situations. For example, if the active list reaches its capacity, it may also mean higher level memory 124 reaches its capacity. Certain memory blocks in higher level memory 124 may be replaced, and so is the active list. The replaced entries in the active list may be moved to the reserve list, and the BNX reference used in the track table may need to be exchanged into the new TBNX reference. After the exchange process, previous entries in TBNX table 190 and BNX table 191 may be set to invalid.

Figure 10B:
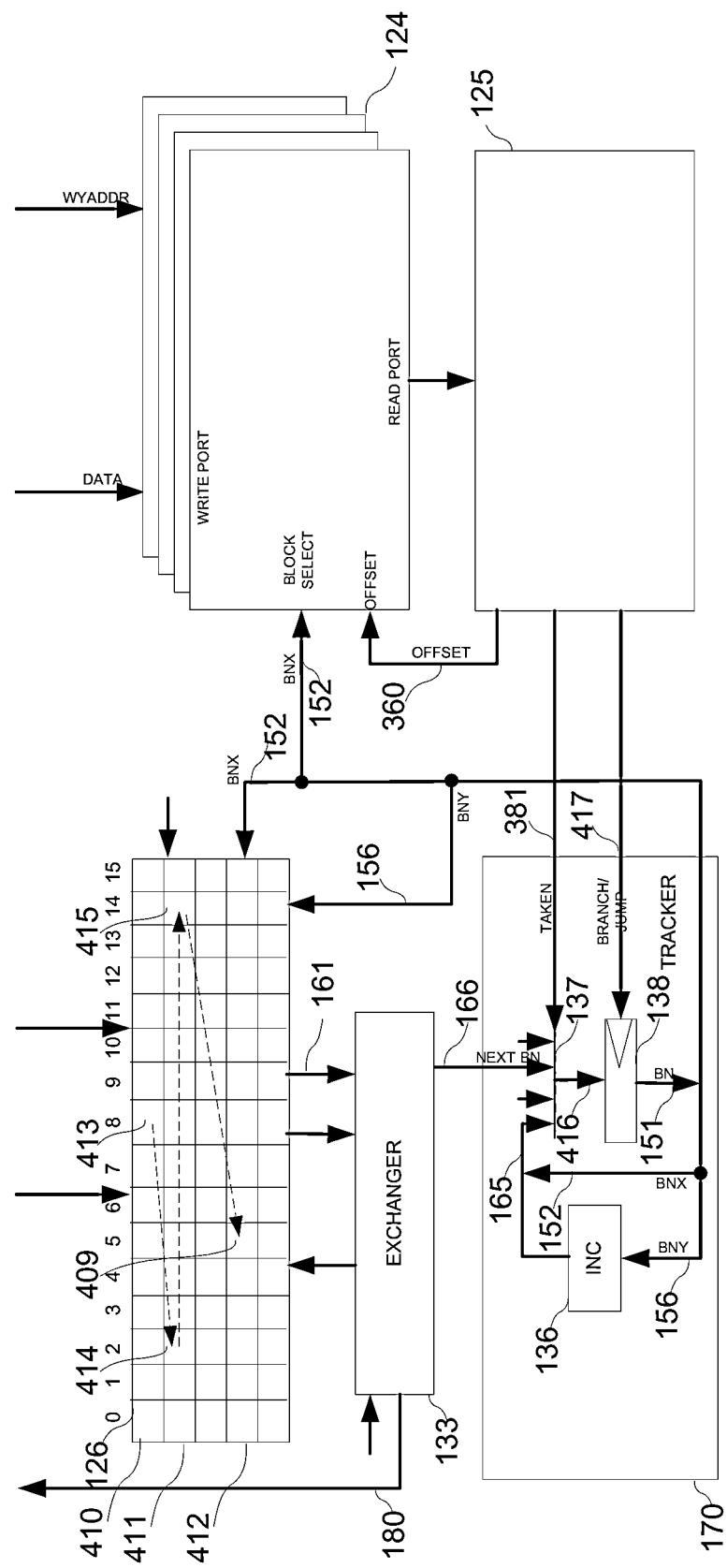
FIG. 10B illustrates a part of an exemplary cache system consistent with the disclosed embodiments.

Returning to FIG. 10A, after the content of a branch point send to exchanger 133 and exchanger 133 performs it operation on the track table output 161, which means the instruction block containing the branch target instruction is already in higher level memory 124, the result BN is directly outputted to tracker 170. The further processing is similar to FIG. 7A. FIG. 10B shows a part of cache system 9000 for operations of track table 126, higher level memory 124, and CPU core 125 using reserve list 120 and active list 121.

As shown in FIG. 10B, similar to FIG. 7B, tracker 170 includes incrementer 136, multiplexer 137, and register 138. Other components are omitted for illustrative purposes. During operation, tracker 170 outputs an address (i.e., BN 151) to be used to address track table 126 and higher level memory

124. BN 151 includes BNX 152 and BNY 156. BNX 152 may be used to address a row or a track from track table 126 and to address a memory block of higher level memory 124; while BNY 156 may be used to address an entry from a track in track table 126 pointed by BNX 152.

Further, multiplexer 137 is controlled by signal 381 from CPU core 125 to select, among other choices, a next BN 166 from exchanger 133 or the BN from incrementer 136 as the bus 418. Bus 418 (i.e., the next BN) from multiplexer 137 may optionally be stored in register 138 and controlled by signal 417 from CPU core 125. When signal 417 controls register 138 to keep the current BN 151 unchanged, the bus 418 is not outputted from register 138. On the other hand, when signal 417 controls register 138 to update the current BN 151, the bus 418 is then provided on bus 151 to become the current BN 151 as to update both BNX 152 and BNY 156.

To illustrates interactions between track table 126 and tracker 170, similar to FIG. 7B, track table 126 may include track (i.e., row) 410, 411, and 412. Each track may include 16 entries or track points from entry 0 to entry 15. Further, track point 413 (entry 8 of track 410) may be a branch point with a branch target track point 414 (entry 2 of track 411), and track point 415 (entry 14 of track 411) may be another branch point with a branch target track point 416 (entry 5 of track 412).

Assuming instruction block corresponding to track 410 was filled into higher level memory 124 and CPU core 125 starts executing instructions at the beginning of track 410. That is, the program counter (PC) of CPU core 125 starts from the address of the instruction corresponding to entry 0 of track 410.

At the same time, assuming tracker 170 also send out a read pointer 151 with the BNX and BNY pointed at entry 0 of track 410 in track table 126. Other entry of track 410 may also be used. The content of the entry may be checked to indicate the type of instruction information and address information, etc.

When starting with entry 0 of track 410, as previously explained, because entry 0 of track 410 is not a branch point, tracker 170 keep BNX 152 unchanged while increasing BNY by one via incrementer 136 to provide a next BN, which corresponding to the next entry of track 410 in track table 410. Tracker 170 continues increasing BNY to proceed with the next entry of track 410 until reaching a branch point, e.g., track point 413 (entry 8 of track 410). During this period, because BNX is unchanged, the instruction block address is thus unchanged. CPU core 125 can continue fetching instructions from higher level memory 124 using the offset from PC.

After pointer 151 provided by tracker 170 reaches track point 413 (entry 8 of track 410), because track point 413 is a branch point, both source address (that is value of pointer 151) and the content of the entry such as target address are analyzed. Exchanger 133 may check with the target address is in the form of BN or TBN. If the target address is a BN, the instruction block corresponding to the target address was already filled in higher level memory 124 ready to be read by core 125. On the other hand, if the target address is a TBN, the instruction block corresponding to the TBN has not been filled into higher level memory 124 yet. Thus, if the instruction block corresponding to the TBN is not in higher level memory 124, the instruction block is filled in higher level memory 124. Also, as explained above, exchanger 133 converts the TBNX to a BNX and assign the value of TBNY to BNY. Then a BN is provided by exchanger 133, which may be provided on bus 166 to be used next BN. Whether the content of the entry is a BN or a TBN, exchanger 133 will provide a BN as next BN 166.

In addition, if the instruction block containing the next instruction from the source address has not been filled into higher level memory 124, the instruction block is also filled into higher level memory 124 for possible execution by CPU core 125. With respect to point 413, however, because next instruction is entry 9 of track 410 and the instruction block corresponding to track 410 has already been filled into higher level memory 124, no filling is needed for the next instruction to track point 413. Thus, only instruction block corresponding to track 411 containing the branch target (entry 2 of track 411) is filled into higher level memory 124, if not already filled.

Because the speed of tracker 170 moving through track points corresponding to the instructions is faster than the speed of CPU core 125 executing instructions, both instruction blocks to be executed by CPU core 125 can be filled into higher level memory 124 before CPU core 125 executes any instructions in either instruction block. Thus, no cache miss may incur. The BNY 156 may be treated as a part of a look-ahead pointer (BNX may be unchanged within the same track) to fill higher level memory 124 with all instructions that could be executed by CPU core 125 before any relevant instruction is actually executed by CPU core 125.

That is, because the TBNX on reserve list 120 does not automatically fill higher level memory 124, tracks or entries in track table 126 can be created in a large number and in small amount of time. Instructions are filled into higher level memory 124 when the execution flow goes near to the instruction, e.g., instructions of a branch target.

Further, after reaching track point 413 and relevant instruction block(s) is filled into higher level memory 124, track table 126 or exchanger 133 may provide the branch target as the next BN 166 (entry 2 of track 211) with BNX as 411 and BNY as 2, and tracker 170 may wait for the branch instruction of track point 413 being executed by CPU core 125 such that signal 381 may provide an indication as to whether the branch is taken or not.

If the branch is taken, as in this example, the next BN provided by track table 126 or exchanger 133 on bus 166 is then used by tracker 170 as BN 151, with BNX pointing to track 411 and BNY pointing to entry 2 of track 411. BNX is also used as an address to the corresponding instruction block in higher level memory 124 such that CPU core 125 can start executing the instruction corresponding to entry 2 of track 411. If the branch is not taken, however, tracker 170 or the look-ahead pointer moves ahead as if the branch point is a simple non-branch point.

Similarly, starting from entry 2 of track 411, tracker 170 finds next branch point 415 (entry 14 of track 411) with a branch target of track point 416 (entry 5 of track 412). The instruction block corresponding to track 412 is then filled into higher level memory 124 if not already filled, and the look-ahead pointer waits for execution of branch instruction of track point 415, as explained above.

In addition, the above discussion is based on one-level track operation. That is, the look-ahead pointer stops at the first branch point, thus the filling operation is performed with respect to the two possible branch results of the first branch point. Track table 126 may also support two-level track operation or multi-level track operation. For example, in a two-level track operation, the look-ahead pointer may stop at the first branch point after the branch target of the first branch point. Thus, instructions corresponding to all four possible branch results of the two branch points are filled in higher level memory 124. Similarly, more instructions can be filled with multi-level track operation.

It is understood that, although reserve list 120, active list 121, and exchanger 133 are used to provide the flexibility and effectiveness of filling operation of higher level memory 124, as previously explained, a single list or any other structure may be used for the implementation.

Further, returning back to FIG. 10A, in operation, more tracks may be added into track table 126 and corresponding instructions being filled into higher level memory 124. However, the capacity of track table 126 and/or higher level memory 124 to be filled may be limited. A replacement scheme may be needed to replace tracks or entries in track table 126 and/or instruction blocks filled into higher level memory 124. For example, a replacement scheme based on active list 121, reserve list 120, and track table 126 may be used. More particularly, replaceable entries in active list 121 may be determined.

If, through bus 180, content with TBNX value '118' in a entry of track table 126 is used to fill an instruction block into higher level memory 124, the TBNX value of '118' corresponds to an instruction block address 0x1FC0 in reserve list 120, and active list 121 has an entry with a BNX value of '006' as pointed by bus 153, which corresponds to an instruction block address 0x4000. Thus, the address 0x1FC0 from reserve list 120 is read into bus 144 to replace the address 0x4000 in active list 121, and the address 0x1FC0 is further sent to fill-engine 132 to fill the instruction block from the address 0x1FC0 into higher level memory 124 to replace the instruction block from the address 0x4000. Further, the entry with the BNX value of '006' corresponding address 0x4000 is moved to an entry of reserve list 120 pointed by pointer 127.

A replacement policy may also be used to determine which track or storage unit of track table 126 should be replaced. For example, a least recently used (LRU) policy or a least frequently used (LFU) policy may be used. When the LRU policy is used, each track or track point may include a usage bit (U bit); when the LFU policy is used, each track or track point may include a count to record usages.

Figure 11A:
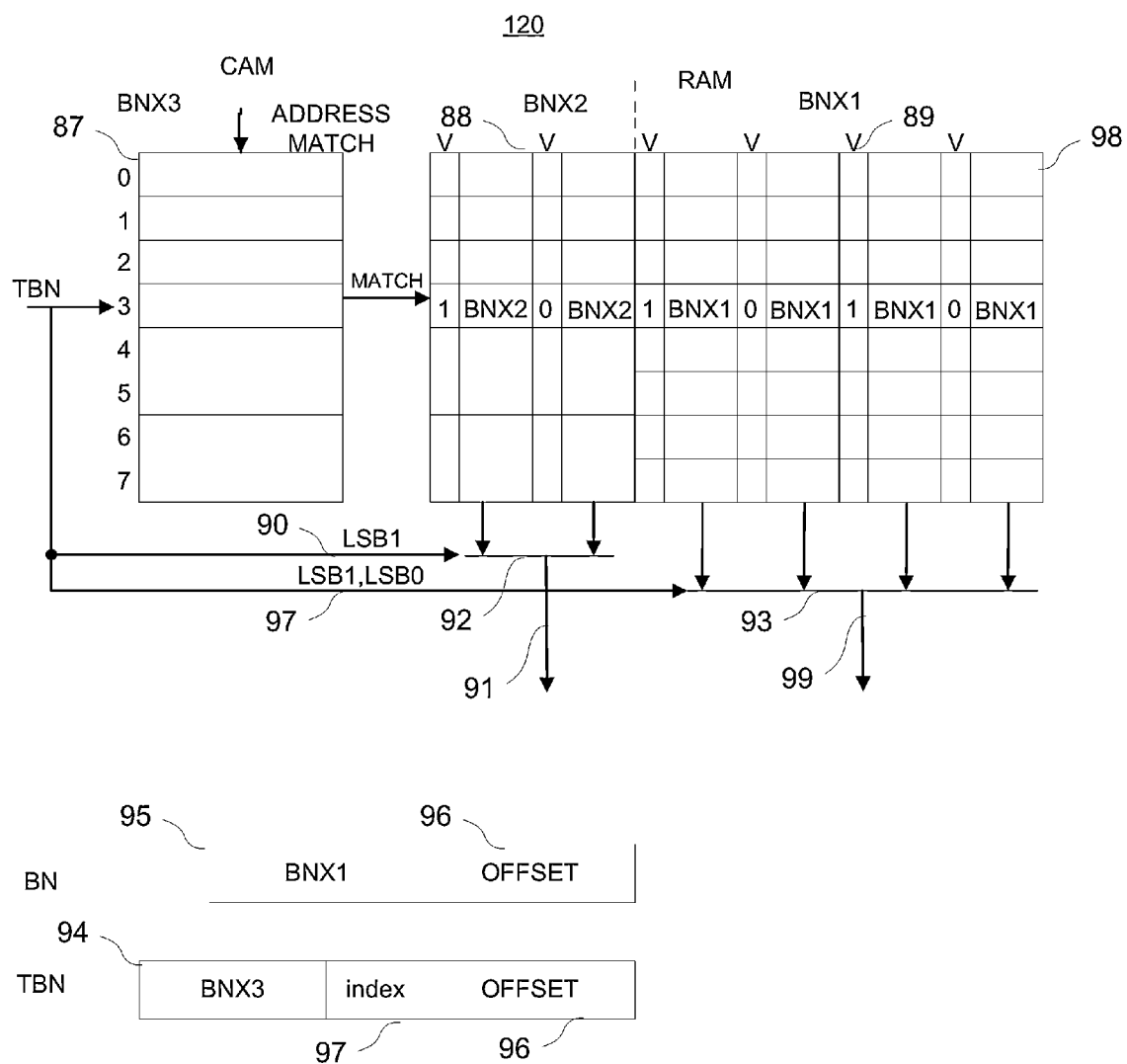
FIG. 11A illustrates an exemplary allocator or reserve list for multi-level cache structures consistent with the disclosed embodiments.

In certain embodiments, more than one level of cache structures may be used. Allocator 1200 or active list 121 may be configured to support more than one level of cache structure. FIG. 11A shows an exemplary allocator or active list for multi-level cache structures.

A total of three levels of cache memories may be used for illustration, a level-one memory, a level-two memory, and a level-three memory (not shown). For illustrative purposes, assuming three levels of cache memories are used as instruction memories (data memories are similar). The memory block or line size in level-two memory may be twice the memory block size in level-one memory (i.e., one level-two memory block may include two level-one memory blocks), and the memory block size in level-three memory may be twice the memory block size in level-two memory (i.e., one level-three memory block may include two level-two memory blocks and four level-one memory blocks). Level-one memory is coupled to CPU core 125 as a higher level memory module. Other different number of levels of cache memories may also be used.

In addition, also for illustrative purposes, the level-three memory may include all contents in both the level-two memory and level-one memory (i.e., inclusive), and the level-two memory may or may not include contents in the level-one memory. Although not shown, a track table may be used to create a track of instructions which may be in one of the three levels of memory, and each track point (e.g., a branch point) may contain an address (e.g., target branch address) to be represented in one of two formats as shown in FIG. 11A. One address format includes two fields, from most significant bits to least significant bits, a block address part for addressing blocks in the level-one memory, and an offset part for addressing within the track or memory block. The other address format includes three fields, a block address part for addressing blocks in the level-three memory, an index part, and an offset part.

As shown in FIG. 11A, allocator 1200 or reserve list 120 may include a content addressable memory (CAM) 87 and a random accessible memory (RAM) 98. CAM 87 may include one column and each entry in CAM may correspond to a block number BNX3 of a level-three memory block. That is, each entry may include a memory address of a particular level-three memory block corresponding to the particular BNX3.

Further, RAM 98 may include a total of six columns, two columns 88 are used for storing block numbers BNX2 of two level-two memory blocks corresponding to a particular level-three memory block and valid bits V, and the other four columns 89 are used for storing track number BNX1 of level-one memory and valid bits V corresponding to the level-three memory block. Multiplexer 93 may select a particular level-one block number or track number corresponding to the level-three memory block based on index 97. Similarly, multiplexer 92 may select a particular level-two block number or track number corresponding to the level-three memory block based on index 97 or, more specifically, high bit LSB1 (90) of index 97.

This list may be addressed in two ways. One way is using a memory address (e.g., level-three memory block address) to search CAM 87. If an address match is found, the entry in CAM is selected, and the contents of corresponding RAM 98 can also be read out. The other way is using a first address BNX3 (94) of a level-three block address (TBN) to direct address CAM 87 and/or RAM 98 to read out contents of a selected row of CAM 87 and/or RAM 98.

When filling the three levels of cache memories from a main memory or any external memory, as previously explained, the being filled instructions are scanned and examined. When a branch instruction is found, the branch target address of the branch instruction is compared with level-three memory block addresses in CAM 87.

If there is no match, it may indicate that there is no instruction block containing the branch target address in the level-three memory. A memory block in the level-three memory may be chosen according to certain criteria, such as a replacement policy, to be filled with the instruction block containing the branch target address. At the same time, the block address of the chosen memory block in level-three memory may be used in the level-one track for the track point corresponding to the branch point. The block number of the chosen memory block in level-three memory is used as the first address BNX3 (94), the index part of the memory address is used as the index (97), and the offset part of the memory address is used as the offset (BNY) (96). Further, index 97 may include 2 bits, a high bit LSB1 (90) is used to differentiate two corresponding memory blocks in the level-two memory and the high bit LSB1 and a low bit LSB0 together (97) are used to differentiate four corresponding memory blocks in the level-one memory.

On the other hand, if there is a match, it may indicate that there is a corresponding instruction block in at least the level-three memory. The matched BNX3 and the index part and the offset part of the memory address may then be recorded in the track table entry.

In operation, when the above track table entry is read by the look-ahead pointer, the table entry or the track point indicates the target branch address is a TBN of level-three memory. The first address of the TBN (BNX3) may then be used to address the entries in CAM 87 and/or RAM 98.

More particularly, the first address 94 (BNX3) of the level-three track is used to address RAM 98 and read out corresponding two level-two block numbers and valid bits and four level-one block numbers and valid bits. A multiplexer 93 may select a valid level-one track number from the four level-one block numbers based on the index bits 97 (i.e., LSB1, LSB0) and the valid bits V. Further, a multiplexer 92 may select a valid level-two block number from the two level-two block numbers based on the high bit 90 (i.e., LSB1) and valid bits V.

If a valid level-one track number is selected, which means the instruction corresponding to the target address is already filled into the level-one memory, the valid level-one track number is then provided on bus 99 to replace the first address of the branch instruction. Also, the index is discarded and the offset (BNY) is kept unchanged. The TBN thus becomes a BN. Further, BNX3 (94) alone may be insufficient to determine a level-one block number because a level-three memory block may include four level-one memory blocks. BNX3 is used together with index (97) to determine a particular level-one memory block. Among the four corresponding level-one memory blocks, zero, one, two, three, or four memory blocks may contain contents from the corresponding level-three memory block. Similarly, among the two corresponding level-two memory blocks, zero, one, or two memory blocks may contain contents from the corresponding level-three memory block.

On the other hand, if no valid level-one block number is selected, which means the instruction corresponding to the target address is not yet filled into the level-one memory. If a valid level-two block number is selected, which means the instruction corresponding to the target address is already filled into the level-two memory, the valid level-two block number is then provided on bus 91. The instruction block corresponding to the level-two block number from bus 91 may then be filled into level-one memory from level-two memory, and the respective level-one block number and valid bit in RAM 98 are updated to indicate the filled instruction block. For example, the level-one block number (BNX1) and its valid bit may be updated in RAM 98 in the entry pointed by BNX3 and the index, and the track table entry is also updated to use the BN number of level-one track. The BN number includes a first address (i.e., BNX1) and a second address (i.e., offset or BNY).

If no valid level-two track number is selected, which means the instruction corresponding to the target address is not already filled into the level-two memory, the instruction block corresponding to the level-three track number may then be filled into the level-two memory and level-one memory from the level-three memory. The respective fields in RAM 98 are also updated to indicate the filled instruction block in the level-one memory and the level-two memory. For example, the level-one block number (BNX1) and its valid bit may be updated in RAM 98 in the entry pointed by BNX3 and the index, and the track table entry is also updated to use the BN number of level-one track. The level-two block number (BNX2) and its valid bit may also be updated in RAM 98 in the entry pointed by BNX3 and the index if corresponding level-two memory block is also filled.

When the instruction block is filled, the instruction block may first be filled into level-two memory from level-three memory, and then be filled into the level-one memory from the level-two memory. Or, alternatively, the instruction block may be filled into level-two memory from the level-three memory, and at the same time be filled into level-one memory from the level-three memory if a separate path between the level-three memory and the level-one memory exists. Further, if track points in level-one memory only includes level-one track information, operations involving the track points are similar to those explained previously.

Figure 11B:
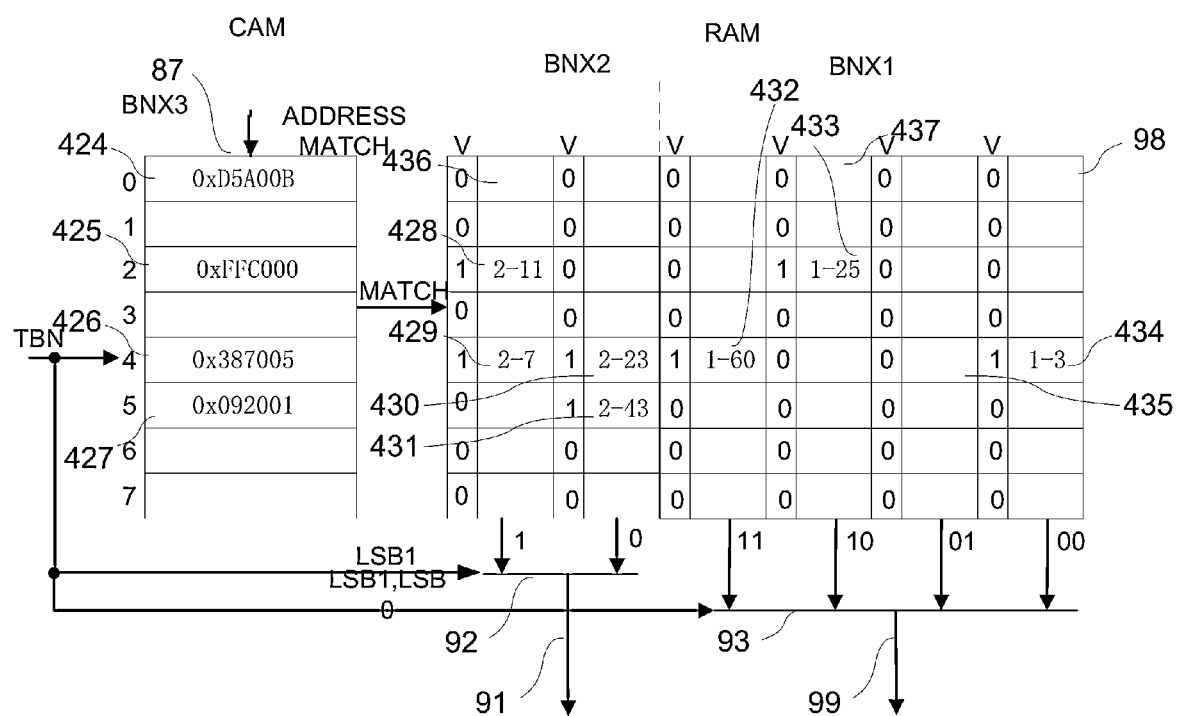
FIG. 11B illustrates an exemplary allocator or reserve list for multi-level cache structures consistent with the disclosed embodiments.

FIG. 11B illustrates an operation example of the structure described in FIG. 11A. As shown in FIG. 11B, a 32-bit CPU core is used for illustrative purposes, and the addressing range for instructions is 32 bits and the length of an instruction is 32 bits. Further, it may be assumed that a code segment in the level-one memory includes 16 continuous instructions, a code segment in the level-two memory includes 32 continuous instructions, and a code segment in the level-three memory includes 64 continuous instructions. Thus, a code segment in the level-three memory corresponds to two consecutive code segments in the level-two memory and four consecutive code segments in the level-one memory, and a code segment in the level-two memory corresponds to two consecutive code segments in the level-one memory.

Further, a 32-bit address (bits 0-31) can be divided different sections with different purposes. For example, the lowest two bits (least significant bits or LSBs), i.e., bits 0-1, are used for addressing individual words within the instruction. Further, bits 2-5 are used as offset within a code segment, i.e., the offset 96 shown in FIG. 11A, to address one of the 16 instructions in the code segment; bits 6-7 are used as an index, i.e., the index 97 shown in FIG. 11A, to address the four code segments in the level-three memory (bit 6 can also address the two code segments in the level-two memory with respect to the level-one memory and bit 7 can address the two code segments in the level-three memory with respect to the level-two memory); and bits 8-31 are used for addressing instruction code segments in the level-three memory, i.e., the address in the CAM 87.

The entry number '0' (424) in the CAM 87 has a valid address 0xD5A00B, which indicates that the 1, 2, 3, and 4 code segments have been filled in the level-three memory. However, the corresponding 6 entries in RAM 98 are all invalid (the valid bits of the entries are all '0'), which indicates that the four code segments in the level-three memory have not been filled into the level-two and level-one memory.

The entry number '2' (425) in the CAM 87 has a valid address 0xFFC000, which indicates that the four code segments have been filled in the level-three memory. Further, the corresponding entry 428 in RAM 98 is valid, which indicates that the code segments 3 and 4 (of the four code segments) have been filled in the level-two memory, and the corresponding level-two track number '2-11' was stored in entry 428. The corresponding entry 433 in RAM 98 is also valid, which indicates that the code segment 3 has been filled in the level-one memory, and the corresponding level-one track number '1-25' was stored in the entry 433.

The entry number '4' (426) in the CAM 87 has a valid address 0x387005, which indicates that the four code segments have been filled in the level-three memory. Further, the corresponding entry 430 and entry 429 in RAM 98 are both valid, which indicates that the four code segments have been filled in the level-two memory, and the corresponding level-two track numbers '2-23' and '2-7' were stored in entry 430 and entry 429, respectively. The corresponding entry 432 and entry 434 in RAM 98 is also valid, which indicates that the code segment 4 and code segment 1 have been filled in the level-one memory, and the corresponding level-one track number '1-60' and '1-3' were stored in the entry 432 and entry 434, respectively.

The entry number '5' (427) in the CAM 87 has a valid address 0x092001, which indicates that the four code segments have been filled in the level-three memory. Further, the corresponding entry 431 in RAM 98 is valid, which indicates that the code segments 1 and 2 (of the four code segments)

have been filled in the level-two memory, and the corresponding level-two track number '2-43' was stored in entry 431. The corresponding entries for the level-one memory in RAM 98 are invalid, which indicates that none of the four code segments has been filled in the level-one memory.

The input for matching the contents in CAM 87 can be the target address of a branch instruction, and the contents in the CAM 87 and RAM 98 can be the level-three track number (TBN). When generator 186 scans and analyzes instructions to be filled, the target address of the branch instruction is used to match the contents in the CAM 87. More particularly, bits 8-31 of the target address are sent to the CAM 87 to match any contents in CAM 87. If the matching is successful, indicating that the code segment corresponding to the target address has been filled in the level-three memory. The corresponding level-one entries in the RAM 98 are read, and the index bits in the target address (i.e., bits 6-7) is sent to multiplexer 93 to select the track point number and valid bit of an entry. If the selected entry is valid (valid bit is '1'), the selected level-one track number is used as the first-dimensional address (e.g., the actual address) of the content of the track point of the branch instruction. If the level-one track number is invalid, the code segment has not been filled in the level-one memory. The level-three track number (TBN) is used as the first-dimensional address of the content of the track point of the branch instruction.

On the other hand, if the matching is not successful, indicating that the code segment has not been filled in the level-three memory. As previously explained, new level-three track number (TBN) may be created based on certain algorithms, such as the LRU (least recently used), and the newly created level-three track number (TBN) is then used as the first-dimensional address of the content of the track point of the branch instruction. Meanwhile, the code segment is filled into the level-three memory based on the level-three track number (TBN).

When the tracker pointer BNY points to the track point of the branch instruction and the contents of the track point includes a level-three track number (TBN), the level-three track number (TBN) is used to search the RAM 98. For example, if the level-three track number (TBN) is '4' and the index is '1', the output 91 of the multiplexer 92 is the valid level-two track number '2-43' of the entry 430, and the output 99 of the multiplexer 93 is the invalid value of the entry 435. That is, the code segment has been filled in the level-two memory but has not been filled in the level-one memory.

Thus, a new level-one track number BN can be created using certain algorithms, such as the LRU, and the code segment in the level-two memory is identified based on the level-two track number '2-23' and filled into the level-one memory based on the newly created track number BN, and the level-one track number BN is also stored in the entry 435. When filling the code segment, the code segment is also scanned and analyzed to generate a corresponding track in the track table.

Also for example, if the level-three track number (TBN) is '4' and the index is '0', the output 99 of the multiplexer 93 is a valid track number '1-3' of the entry 434. That is, the code segment has been filled in the level-one memory and the output 91 of the multiplexer 92 can be ignored.

Also for example, if the level-three track number (TBN) is '0' and the index is '2', the output 99 of the multiplexer 93 is an invalid value of the entry 437 and the output 91 of the multiplexer 92 is also an invalid value of the entry 436. A new level-two track number and a new level-one track number are then created, and the code segment in the level-three memory is identified based on the level-three track number (TBN) '0' and is filled into both the level-one memory and the level-two memory based on the newly created level-one track number and level-two track number. Further, the level-one track number and level-two track number are also stored in the corresponding entries 437 and 436, respectively.

Figure 14A:
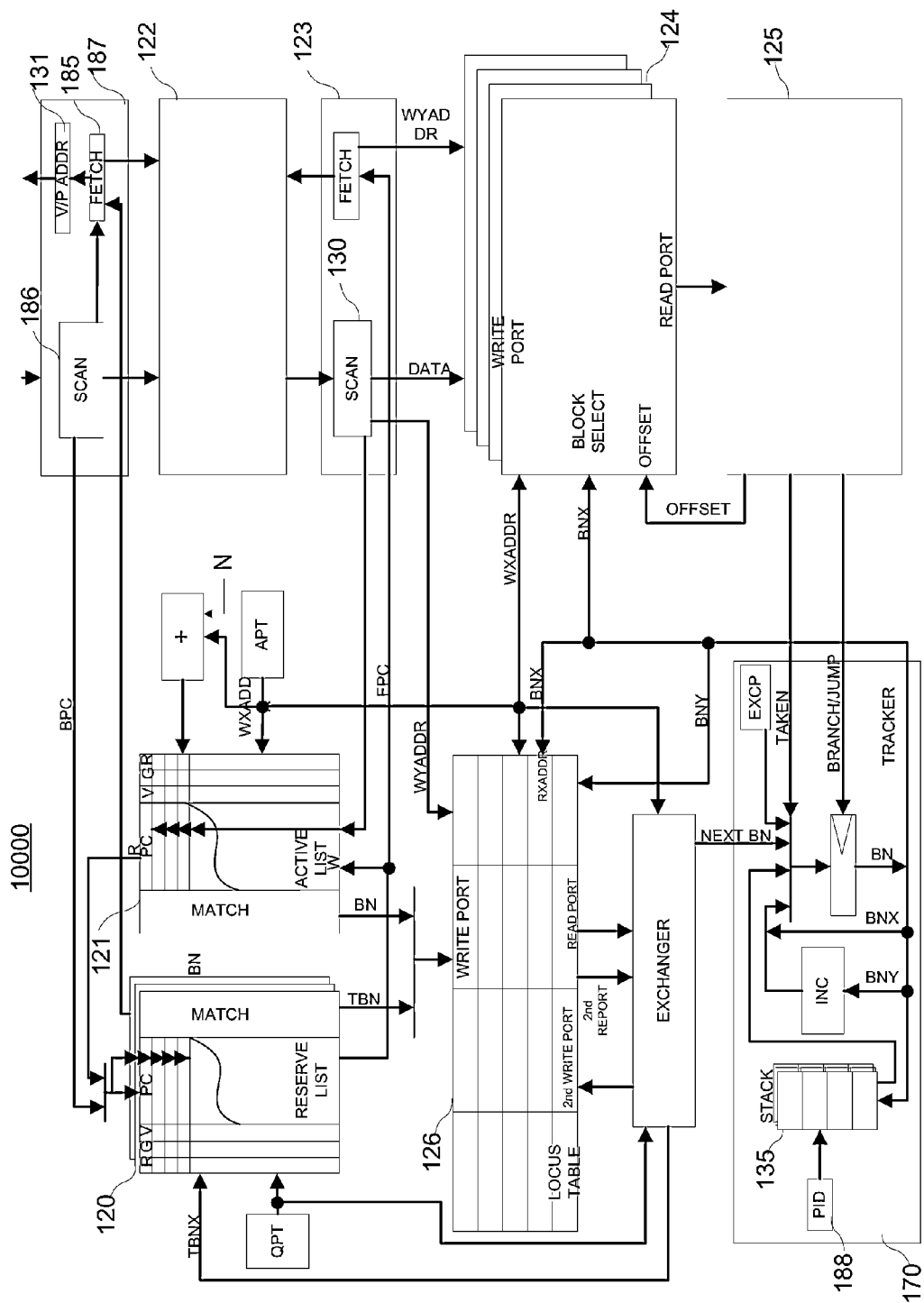
FIG. 14A illustrates another exemplary cache system consistent with the disclosed embodiments.

FIG. 14A shows another exemplary cache system 10000 consistent with the disclosed embodiments. Cache system 10000 may be similar to cache system 9000 described in FIG. 10A. However, cache system 10000 includes certain features to support multi-thread programming.

Individual tracks in track table 126 may correspond to a single thread or to multiple threads. Because operational status needs to be saved and recovered during thread context switching, a plurality of stacks 135 are used to keep information pushed into a particular stack by a single thread. A thread identifier (PID) 188 stores a current thread ID or thread number. When tracker 170 uses stacks 135, PID 188 provides a pointer to the stack to be used such that correct stack operation can be performed.

Further, a second fill/generator 187 may be provided outside lower level memory 122. Generator 186 in fill/generator 187 is similar to generator 130 in fill/generator 123, but with higher bandwidth than that of generator 130. More instructions may thus be scanned and analyzed at one time by generator 186. In addition, fill/generator 187 operates on reserve list 120 in similar ways by which fill/generator 123 operates on active list 121. That is, instruction blocks corresponding to addresses in reserve list 120 are filled by filling engine 185 into lower level memory 122 from a further lower level memory (not shown). Thus, instruction blocks corresponding to addresses in reserve list 120 are in lower level memory 122 to reduce or avoid the waiting time for CUP core 125 to fetch instructions.

In addition, different tracks may correspond to a same instruction block (a same instruction block may be placed in different L1 cache memory blocks according to different virtual address). Fill/generator 187 also includes a translation look-aside buffer (TLB) 131 placed outside filling engine 185 such that instructions in lower level memory 122 and higher level memory 124 are all in physical addressing mode and CPU core 125 can directly fetch the instructions in higher level memory 124 without the need of virtual to physical translation.

Figure 14B:
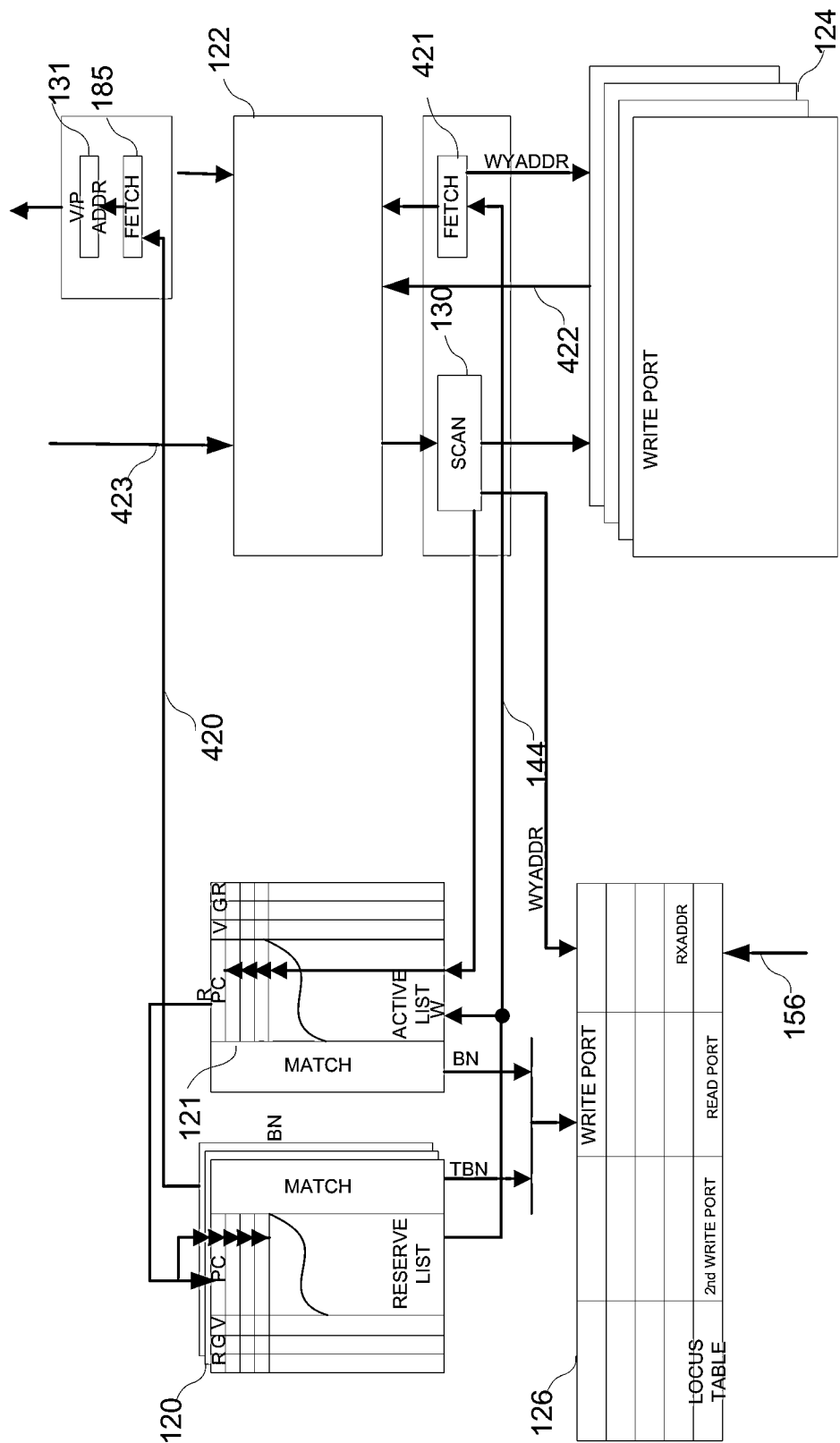
FIG. 14B illustrates a part of an exemplary cache system consistent with the disclosed embodiments.

FIG. 14B shows a part of cache system 10000 consistent with the disclosed embodiments. As shown in FIG. 14B, each entry in active list 121 may correspond to a memory block or instruction block in higher level memory 124 and also to a track in track table 126. Thus, higher level memory 124 may be managed through active list 121. On the other hand, lower level memory 122 may also be used as a cache, and lower level memory 122 is managed through reserve list 120. That is, each entry in reserve list 120 may correspond to a memory block or instruction block in lower level memory 122. Further, for illustrative purposes, assuming higher level memory 124 and lower level memory 122 are exclusive. In other words, a memory address or memory block is not included in both higher level memory 124 and lower level memory 122.

When instructions are filled into higher level memory 124, generator scans and examines the instructions, and a track may be created in track table 126 including a branch point. The target branch address may be matched with entries in active list 121. If there is a match, meaning that a corresponding instruction block is already filled in higher level memory 124, the target branch address is recorded as the matched block number of higher level memory 124, in BN format, in track table 126. However, if there is no match, a corresponding instruction block is not yet filled in higher level memory 124, and the target branch address may be matched with entries in reserve list 120 to initiate a fill process. Optionally, the target branch address may be matched with entries in reserve list 120 simultaneously with the active list 121.

If there is a match in reserve list 120, meaning that a corresponding instruction block is already filled in lower level memory 122, the target branch address is recorded as the matched block number of lower level memory 122, in TBN format, in track table 126. If there is no match in either reserve list 120 or active list 121, fill engine 185 may fill the corresponding instruction block from an external memory (not shown) into lower level memory 122 through bus 423. Virtual to physical address translator 131 may provide virtual and physical address conversion or translation. The filled memory block in lower level memory 122 may thus contain the corresponding instruction block, and the target branch address is recorded as the filled block number of lower level memory 122, in TBN format, in track table 126.

In operation, when the look-ahead pointer (156) reaches a branch track point in track table 126 that includes a TBN branch target address, as previously explained, a BN will be created in active list 121 and the corresponding instruction block is filled into higher level memory 124 from lower level memory 122. Further, the TBN in track table 126 is replaced by the BN and the TBNX of the TBN in reserve list 120 is removed.

Thus, when an instruction block corresponding to an entry in reserve list 120 is filled into higher level memory 124, the associated TBN is replaced by a new BN. Similarly, when an instruction block corresponding to an entry in active list 121 is swapped out or filled back into lower level memory 122, the associated BN can just be replaced by a new TBN. By switching between entries of reserve list 120 and active list 121, significant efficiency may be achieved in a multi-level cache arrangement.

Although various embodiments are separately disclosed with respect to various drawings, these various embodiments may be independently implemented or may be implemented in certain combination. Thus, the various components illustrated in those embodiments may also be used independently or in combination, without departing from the principles of the disclosed embodiments. The followings list certain implementations for illustrative purposes.

For example, generator 130 may be configured to extract a branch source address to be used to address the writing of track table 126. A source address (e.g., an instruction address) may be analyzed in two formats. One format is to represent the address with an upper address part, an index part, and an offset part in situations such as having multiple cache levels or memory level, and the other format is to represent the address with an upper or block address part and an offset part. In certain embodiment, the branch source address may be represented in an upper address part, an index part, and an offset part. Further, the offset part is used directly as BNY, and the upper address and Index are sent to allocator 1200 to be converted to a block number. Generator 130 may also be configured to extract instruction types (e.g., unconditional branch, conditional branch, non-branch (including load, store, etc.)).

Further, generator 130 may be configured to compute a branch target address as the branch source address plus a branch offset, wherein the branch source address may be a block address of the instruction block containing the branch source address plus an offset of the branch source instruction within the block, and the offset of the branch source instruction may be a jump amount. The upper address and index of the branch target address are put on bus 141 to match with content of allocator 1200 (e.g., active list 121, reserve list 120) CAM. Also, the offset address is put on bus 143 WYADDR as the Y write-address for track table 126. A write address for track table 126 may refer to an address used to create a track point entry in track table 126 including a row address (X address) and a column address (Y address) which correspond to XADDR and YADDR, respectively.

That is, generator 130 provides the branch source address as the write address of track table 126, and instruction type and branch target address as the content of track table 126. All such addresses are generated by generator 130 except the X write address, which is converted or assigned by allocator 1200. The X address may be a block number (BN) corresponding to a particular upper address, which itself may be too long and not continuous. For example, an 18-bit upper address corresponds to 256K different memory blocks, while assigning them to 256 blocks results in the BNX number for only 8 bits.

Track table 126 may be configured as a two dimensional table, in which each row, addressable by an X address or first address BNX, is corresponding to one memory block or memory line, and each column, addressable by a Y address or 2nd address BNY, is corresponding to the offset of the corresponding instruction (data) within memory blocks. In short, the track table write-address corresponds to the branch source instruction address. Further, for a particular branch source address (e.g., upper address, Index, offset), a BNX 153 is assigned by allocator 1200 (i.e. active list 121) based on the upper address and index, and BNY is the same as the offset. The BNX and BNY may then form the write address used to point to a table entry for writing.

Further, for the branch point, a branch target address (upper address, offset) is sent to active list 121 to match the upper address part, and active list 121 may assign a BNX. The assigned BNX, together with the instruction type from generator 130 and the offset (BNY), form the content of the track table entry of the branch source instruction.

Track table 126 may also be configured for other purposes. For example, track table 126 may support an automatic power management for CPU core 125 in a system. For example, track table 126 may designate a track for an idle task which is executed by CPU core 125 when CPU core 125 is idle (i.e., an idle track). Thus, the system may keep track of a percentage in which the idle track is used or visited. By comparing this percentage with a preset value or a set of preset values, the system may adjust power consumption of the CPU core 125 and the system. Adjustment methods may include changing clock frequency or adjusting voltages supplied to CPU core 125 and to the system.

Tracker 170 may be configured to provide a read pointer 151 to track table 126. Read pointer 151 may also be in the format of BNX and BNY. The content of the track table entry pointed by the read pointer is read out and examined by exchanger 133, along with BNX and BNY of the entry point (source BNX and source BNY). If the content of the entry has a TBN, the TBNX is sent to allocator 1200 to resolve or convert into a BNX and fill the L1 cache memory, then the BN (BNY has the same value of the TBNY) is sent to tracker 170 by exchanger 133. If the content of the entry already has a BN, the BN is sent to tracker 170 by exchanger 133. Tracker 170 may perform several different steps based on the content. For example, if the entry is not a branch point, tracker 170 may update the read pointer as $BNX_{next}=BNX_{source}$, and $BNY_{next}=BNY_{source}+1$.

If the entry is a conditional branch, tracker 170 obtains the target BNX and BNY (i.e., the first address and the second address), and sends the target BNX and BNY to allocator 1200 (i.e., active list 121) to fill higher level memory 124 or the L1 cache. Further, tracker 170 may wait for a control signal from CPU core 125 with respect to the branch point. If the control signal indicates the branch is not taken, tracker 170 may update the read pointer as $BNX_{next}=BNX_{source}$, and $BNY_{next}=BNY_{source}+1$. However, if the branch is taken, tracker 170 may update the read pointer as $BNX_{next}+BNX_{target}$, and $BNY_{next}=BNY_{target}$.

If the entry is an un-conditional branch (or jump), tracker 170 may treat this type of instruction as a taken conditional branch, and thus may update the read pointer as $BNX_{next}+BNX_{target}$, and $BNY_{next}=BNY_{target}$.

In addition, if the entry is a "Call" instruction, tracker 170 may push the current pointer BNX and BNY pair into a stack; read out the content or target BNX, which means the corresponding instruction block is already in L1 cache memory. Further, if the entry is a "Return" instruction (e.g., the end of a subroutine), tracker 170 may pop the BNX and BNY pair from top of the stack, and may update the read pointer as $BNX_{next}=BNX_{stack}$, and $BNY_{next}=BNY_{stack}$. Under certain circumstances, $BNY_{next}=BNY_{stack}+1$ may be used when the sub-routine call returns to the next instruction of the "Call" instruction.

Further, if the entry is an exception handling instruction, tracker 170 may read out the block number BNX and offset BNY saved in the Exception BN register (EXCP), and may update the read pointer as $BNX_{next}=BNX_{EXCP}$, and $BNY_{next}=BNY_{EXCP}$. The starting address of an exception handling routing is usually fixed for a particular CPU, and the starting block of the exception handling routine may be filled into the L1 cache and a corresponding track is built in track table (both may be set as not to be replaced).

Allocator 1200 may be implemented as a one dimension multi-entry list. Each entry includes a CAM containing upper addresses and a RAM containing BNs and valid, U bit and other flags. Allocator 1200 includes an incrementer (APT) 129 and an adder (+) to point to an entry, while the list may be indexed (addressing) by a TBNX (e.g., FIG. 10A). When a cache fill is requested, the entry pointed by APT 129, its corresponding memory block, and track table entry are filled.

In certain embodiments, allocator 1200 (e.g., reserve list 120, active list 121, etc.) may be configured to provide an address-BNX-TBNX number mapping relationship. For example, the TBNX may be used to index the upper address or the BNX; the upper address may be used to find the BNX or TBNX via upper address matching. When filling the L1 cache, generator 130 computes the branch target address and sends the upper address on bus 141 to CAM part of reserve list 120 for upper address matching. If there is no match, allocator 1200 may take the entry number pointed by pointer 127 as TBNX, and use the TBNX as the track table content. Meanwhile, allocator 1200 may fill the L2 cache block corresponding to the TBNX. On the other hand, if there is a match, allocator 1200 may find the corresponding TBNX, and use TBNX as track table content.

Further, during tracker 170's operation, when track table read pointer 151 points to a track table entry which has a TBN, the TBN is read out from bus 161 and send through bus 180 to index reserve list 120 (i.e., to check if the corresponding instruction block is in the L2 cache). If there is no valid BN, the BNX pointed by APT 129 is put into the entry of the RAM part of this TBN, and the TBN in track table 126 is replaced by the BN. Further, the corresponding instruction block in the L2 cache is filled into the L1 cache in the cache block indexed by the BN. If, however, there is a valid BN, meaning the corresponding instruction block is already in the L1 cache, in that entry, the TBN is replaced by the valid BN. Of course, when track table read pointer 151 points to a table content which has a BN, no checking to allocator 1200 is necessary because the corresponding instruction block is already in the L1 cache.

In addition, allocator 1200 may also support different configurations with respect to active list 121 and reserve list 120 with allocator 1200. For example, allocator 1200 may include two configurations with respect to inclusiveness of entries in active list 121 and reserve list 120.

In one configuration, an exclusive relationship may be generated between active list 121 and reserve list 120, similar to the description related to FIG. 13. To generate the exclusive relationship, reserve list 120 and active list 121 each has its own upper address CAM storage. An address from generator 130 goes to both active list 121 and reserve list 120 for matching to get a either TBNX or BNX. However, there is only one possible match in either active list 121 or reserve list 120, but not in both active list 121 and reserve list 120, which means a particular instruction may exist in either the L1 cache or the L2 cache but not both. Reserve list 120 is indexed by TBNX, its CAM holds upper addresses, and its RAM holds corresponding BNX number, as shown in FIG. 11. An index may select multiple BNX in the same row or entry. Further, active list 121 is indexed by BNX, its CAM holds upper addresses, and its RAM holds TBNX number.

In the other configuration, an inclusive relationship may be generated between active list 121 and reserve list 120. Under such relationship, only reserve list 120 holds upper addresses in its CAM storage, and reserve list 120 may have a structure similar to that shown in FIG. 11. However, active list 121 does not have a CAM part, so an address from generator can be matched only on reserve list 120, which means a particular instruction existing in the L1 cache must exist in the L2 cache. Further, active list 121 is indexed by BNX, and its content is TBNX only. When a L1 cache block is discarded (or replaced by another), the old BNX is sent to active list 121 to find a TBNX to be put in track table 126. For data memory, the L1 cache block may have to be stored back to the cache memory corresponding to reserve list 120.

In certain embodiments, a one-level cache system may be used. Thus, the reserve list entry may be indexed by a TBNX corresponds to a memory block in the main memory, instead of a cache memory, and the upper address of the main memory is in corresponding CAM entry. The RAM part contains a BNX as usual. That is, the TBNX temporary holds a track table entry until the read pointer of track table 126 is close enough to the entry so that the memory block corresponding to the upper address may be filled to the cache (L1). A BNX may then also be assigned to replace the TBNX in track table 126. This BNX may also be kept in the RAM part of the reserve list entry which is indexed by the TBNX.

In addition, allocator 1200 may be configured to facilitate the implementation of replacement policy with respect to the L1 cache. For example, allocator 1200 may support both a least recently used (LRU) policy or a least frequently used (LFU) policy.

Under the LRU policy, allocator 1200 may use a LRU window, formed by main pointer 129 (APT) and the clear pointer (adder +), to find the next memory block to be replaced. The clear pointer moves ahead of main pointer 129 (APT) by a variable amount N, and clears U bit (set to '0') of each entry on the way. On the other hand, the U bit of any entry accessed is set to '1' again. The U bit of the entry pointed by main pointer 129 is checked to determine whether to replace the entry. If the U bit is a '1', it means the entry has been accessed recently and thus not the least recently used, and main pointer 129 increments to check the next entry. If the U bit is a '0', main pointer 129 may stay at the entry for replacement.

Under the LFU policy, allocator 1200 may use the above window arrangement, but to use a count of the number of memory access (indicating a usage frequency) in place of the U bit, the count of the entry pointed by main pointer 129 may be compared to an adjustable value which is set by CPU core 125 or other devices. If the count is less than the adjustable value, main pointer 129 may stay at this entry for replacement.

Exchanger 133 may be configured to facilitate interactions between track table 126 and allocator 1200. For example, within track table 126, when a BN is assigned to replace a TBN (e.g., when an L2 cache block is filled to an L1 cache block), or a TBN is assigned in place of a BN (e.g., when an L1 cache block has to be replaced due to lack of L1 cache space and the replaced block goes back to the L2 cache if not already there), exchanger 133 may replace all references of the old TBNX (BNX) in track table 126 with the new BNX (TBNX) before the old TBNX (BNX) can be reused. Thus, the same BNX will not correspond to two different PC address.

More particularly, exchanger 133 may store a pair of the old TBNX and new BNX and, starting at the point the assign action happens, exchanger 133 moves down to the end of track table 126, goes around to the beginning of track table 126, and till reaching the starting point, replacing any old TBNX by the new BNX, via an extra read port 159 and an extra write port 158. At the same time, exchanger 133 replaces content read out of the old TBNX with a new BNX before the BN is sent to tracker 170.

Figure 15:
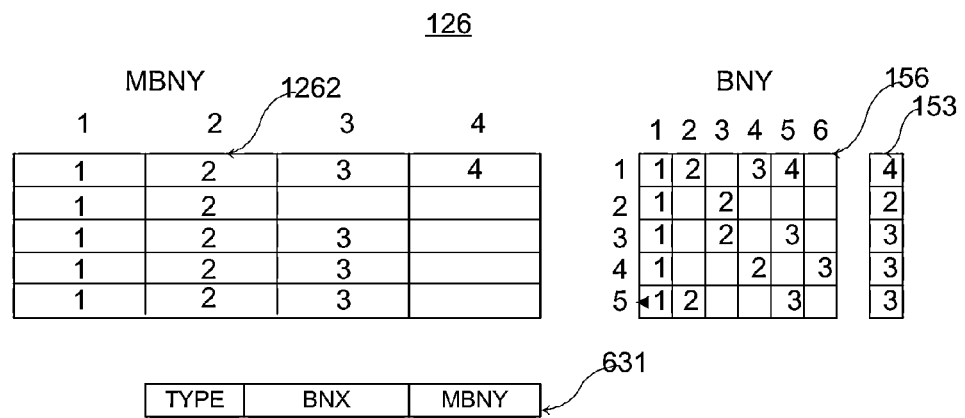
FIG. 15 illustrates an exemplary track table compression structure consistent with the disclosed embodiments.

Further, track table 126, active list 121, and reserve list 120 may also be compressed to save memory space used for the various tables. FIG. 15 illustrates an exemplary table compression structure consistent with the disclosed embodiments. As shown in FIG. 15, track table 126 may include a compressed track table 1262, a mapping table 156, and an ID table 153. Track table 1262 may store the branch target information but may have a substantially less number of entries than the original track table, and an entry in track table 1262 may have the same structure as an entry in original track table 126 as previously described. The ID table 153 is a table storing the last written entry number of the track table 1262. Tables 1262, 156, and 153 have the same number of rows and each row corresponds to each other. Further, each row of track table 1262 has a first number of columns which is larger or equal to the maximum number of branch instructions each row may contain. Mapping table 156 has a second number of columns which corresponds the total number of instructions this row contain. ID table 153 has only one column. These three tables together form the track table 126.

In operation, initially all rows of ID table 153 are reset to "1". When the track table 1262 is being filled, an external source provides a row address BNX, a column address BNY, and the content (e.g. branch target information). The same row from tables 1262, 156, and 153 are selected and properly filled. The content of the selected row in table 153 is used to select a column from table 1262 to store the branch information, i.e., the ID of the relevant column in Table 1262. The content of the selected row in table 153 is used to select a column from track table 1262 to store the branch target information (type, target BNX, target BNY). The column address is called an MBNY (Mapped BNY). The MBNY is also written into the selected row of table 156 at a column indexed by the column address BNY. The relevant column of the selected row of track table 1262 as identified by the content of the selected row in table 153 is then selected to store the branch target information (i.e., the content of track table). Thus, a mapping relationship between the BNY and column number in track table 1262 is maintained in mapping table 156. The content of the selected row in table 153 is then incremented by '1' to point to the next available column in table 1262. During read operation, the BNX selects a row, and the BNY selects a column from table 156. The content of that entry, MBNY, points to a column in table 1262 which is the entry point of the branch instruction.

During read operation, the BNX is used to select a row from tables 1262, 156, and 153, and the BNY is used to select a column from mapping table 156. The content of the entry in table 156 as identified by the BNX and BNY is read out, which point to a corresponding column in table 1262. Thus, the entry in the track table 1262 is read out for obtaining the desired branch target information or other information previously stored. Because branch instructions typically count for ⅙ of total instructions, and entries in table 156 only hold a simple content (i.e., only the column number of table 1262) which takes much less memory than those of table 1262. Therefore, the memory size for entire track table 126 may be substantially reduced.

In certain embodiments, the content of the entry in track table 1262 may be in a different format to enhance track table tracking (e.g., by tracker 170). As shown in FIG. 15, the entry of track table 1262 may have a format 631, including a type, a BNX, and an MBNY. The 'type' field may indicate the type of the instruction, such as a branch instruction, a jump instruction, a read/write instruction, or any appropriate type of instruction. The 'MBNY' field may indicate a mapped BNY, i.e., an offset in track table 1262 as mapped by the mapping table 156. Instead of writing the branch target offset directly as BNY in track table 1262, the target BNX and offset are sent to table 156 to map an MBNY. Type, target BNX, and together with this MBNY form the track table 1262 content. When a look ahead pointer reads out table 1262 content, the target BNX and target MBNY form an address pointing to an entry in table 1262.

That is, in operation, the BNX is used to select a row from tables 1262, 156, and 153, and the BNY is used to select a column from mapping table 156. The content of the entry in table 156 as identified by the BNX and BNY is read out, which points to a corresponding column in table 1262 to store branch target information. The column address is an MBNY, and this MBNY is also written to table 156 at a column indexed by the column address BNX. The content of table 153 is then incremented by 1 to point to the next available column in track table 1262.

During read operation, BNX selects a row, and BNY selects a column from mapping table 156. The content of that entry is an MBNY pointing to a column in track table 1262, which is the entry point of the branch instruction. The MBNY of the entry in the track table 1262 may then be directly used to find the branch target address within the track table 1262.

That is, the MBNY can be replaced by a target MBNY. That is, the branch target information (i.e., the content of an entry in track table 1262) may include type, BNX, and target MBNY. In other words, instead writing the branch target offset directly as BNY in track table 1262, the BNX and the branch target offset are sent to mapping table 156 to read out a content of the mapped entry in mapping table 156 which is an MBNY. Type, BNX, and the MBNY form the content of the track table entry in track table 1262. When a look ahead pointer reads out an entry from track table 1262, the BNX and target MBNY form an address for track table 1262.

As shown in FIG. 15, there are a few entries that are empty in table 156, certain mechanism may be provided to solve the problem of branch target falling in between branch source instructions. For example, if a branch target is at BNX=1, BNY=3, this entry in table 156 is empty, and the certain mechanism will return the MBNY of next branch source "3". Further, if the branch target is at BNX=2 and BNY=4 in table 156, beyond the last branch source at BNY=3, the certain mechanism returns the highest MBNY which points to the end of the memory block (usually this position is marked with a jump to the beginning of memory block of the next adjacent memory address).

In addition, other components may also be configured to provide certain functionalities to support the above disclosed embodiments. For example, CPU core 125 may provide a control signal "TAKEN" to control multiplexer 137 in tracker 170.

CPU core 125 may also provide a control signal "BRANCH/JUMP" to control register 138 in tracker 170. Read pointer 151 moves ahead (e.g., increasing BNY) until the track table content read out is a branch/jump type, and read pointer 151 stops there waiting for CPU core 125 to catch up. In the meantime, the necessity of filling the L1 cache is checked based on the branch target address contains in the content. The BRANCH/JUMP signal indicates to tracker 170 that CPU core 125 has reached the branch instruction and the TAKEN signal is the true will of the program being executed and the correct next address has be selected. Thus, upon detecting this BRANCH/JUMP signal, tracker 170 clocks register 138 to let the new address in register 138 to appear as BN 151.

Figure 16A:
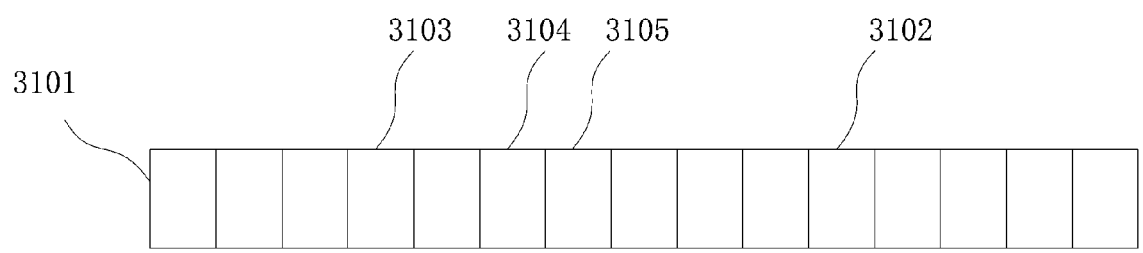
FIGS. 16A-16B illustrate an exemplary branch decision structure consistent with the disclosed embodiments.
Figure 16B:
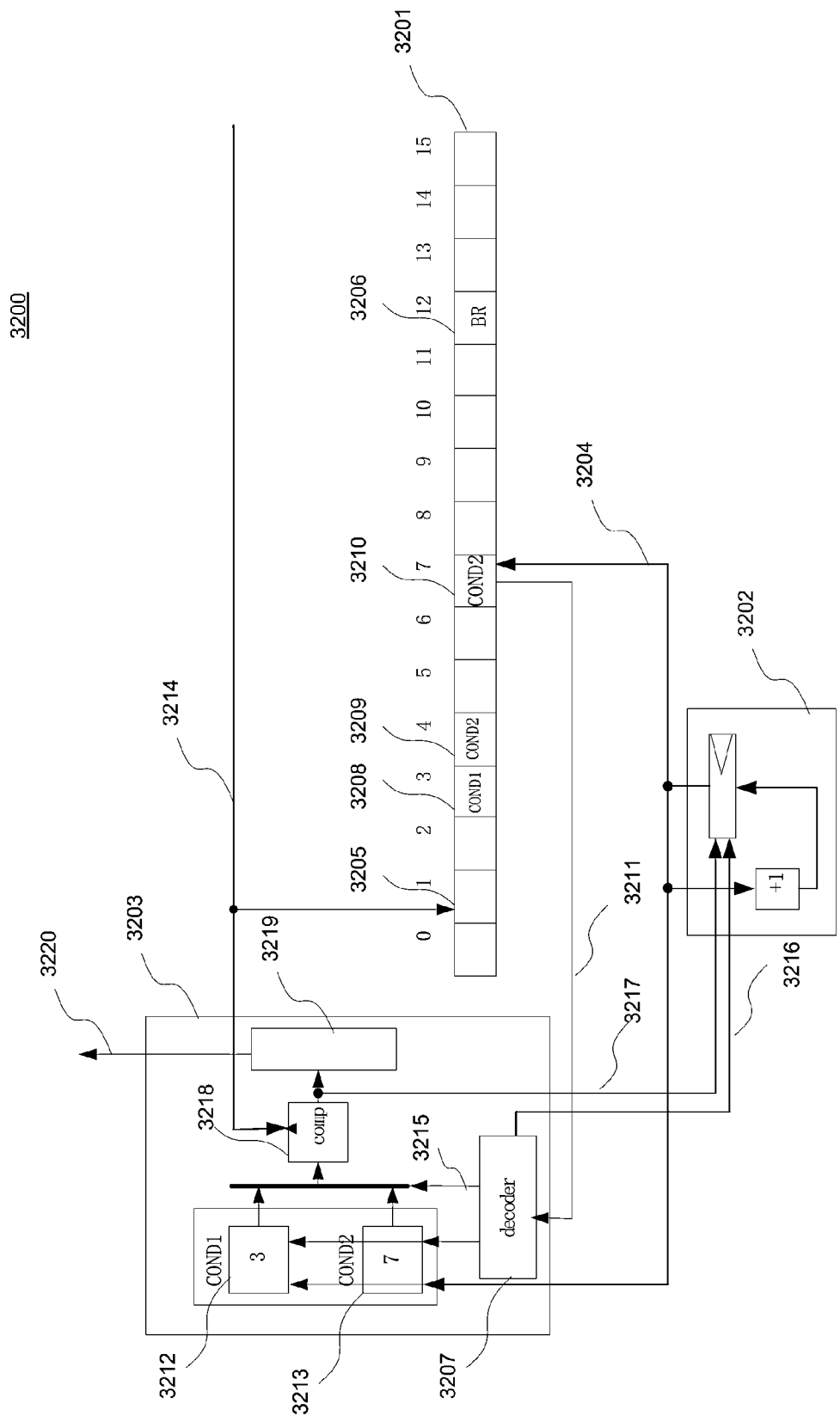

The "TAKEN" signal or "BRANCH/JUMP" signal may be used to indicate whether a branch or jump is taken, and such signal may be generated based on various branch prediction algorithms. FIGS. 16A-B illustrate an exemplary branch decision structure consistent with the disclosed embodiments.

As shown in FIG. 16A, instruction stream 3101 includes a sequence of instructions and the execution sequence would be from the left to right. More particularly, instruction 3102 may be a branch instruction, and instructions 3103, 3104, and 3105 are instructions changing the branch condition of the branch instruction 3102. The instruction 3105 is the last instruction changing the branch condition of the branch instruction 3102. Instead of determining whether the branch condition of the branch instruction 3102 is satisfied when the branch instruction 3102 is being executed, such determination may be performed after the last instruction changing or impacting the branch condition of the branch instruction 3102.

More particularly, as shown in FIG. 16B, branch prediction system 3200 may include three parts, an instruction buffer 3201, pre-detection control unit 3202, and carry test unit 3203. Other devices may also be included. Instruction buffer 3201 may store a sequence of instructions, such as instruction 3205 being executed and subsequent instructions 3208, 3209, and 3210, etc. Carry test unit 3203 may include location registers each containing a branch condition judgment carry for each branch instruction, i.e., a value indicating or being used to derive an indication whether the branch condition is satisfied. Depending on the type of instruction set used by the CPU core, the branch condition judgment carry may be a general register, a status register, or a flag bit/bits of a particular register. Whether the branch condition is satisfied can be determined based on the branch condition judgment carry. For example, different values of the branch condition judgment carry may be compared or the value of the branch condition judgment carry may be compared with a fixed value.

Pre-detection control unit 3202 controls an advance pointer 3204, which moves along the instruction buffer 3201 starting from the current instruction 3205 at a speed faster than the program counter (PC) of the CPU core. The advance pointer 3204 scans each instruction in the instruction buffer 3201 when moving through the instruction buffer 3201, and stops at the first branch instruction 3206. Each scanned instruction may be sent to the carry test unit 203. Because the total number of branch condition judgment carries is limited in a CPU core, carry test unit 3203 may include a decoder 3207 to determine whether an instruction changes the values of any particular branch condition judgment carries. If an instruction is determined as one changing the values of any branch condition judgment carries, the particular branch condition judgment carry or carries is also determined. Further, during the scanning process, when an instruction pointed by the advance pointer 3204 is found changing the branch condition judgment carry values, the instruction position information is written to location register or registers in carry test unit 3203 corresponding to the particular branch condition judgment carry or carries.

To simplify the illustration, only two branch condition judgment carries, 'COND1' and 'COND2', are used in the branch prediction system 3200. Any number of branch condition judgment carries may be included similarly.

After the instruction buffer 3201 is scanned, there are three instructions between the current instruction 3205 and the first branch instruction 3206 that can change branch condition judgment carry values: instructions 3208, 3209, and 3210. More particularly, instruction 3208 is at position '3' and changes the value of branch condition judgment carry 'COND1'; instruction 3209 is at position '4' and changes the value of branch condition judgment carry 'COND2'; and instruction 3210 is at position '7' and changes the value of branch condition judgment carry 'COND2'.

When advance pointer 3204 points to instruction 3208, instruction 208 is read out and sent to decoder 3207 via bus 3211. After the decoding, it can be determined that instruction 3208 changes the value of 'COND1'. The position information '3' is written into location register 3212 corresponding to the branch condition judgment carry 'COND1.' Similarly, when advance pointer 3204 points to instruction 3209, instruction 3209 is read out and sent to decoder 3207 via bus 3211. After the decoding, it can be determined that instruction 3209 changes the value of 'COND2'. The position information '4' is written into location register 3213 corresponding to the branch condition judgment carry 'COND2.' Further, when advance pointer 3204 points to instruction 3210, instruction 3210 is read out and sent to decoder 3207 via bus 3211. After the decoding, it can be determined that instruction 3210 changes the value of 'COND2'. The position information '7' is written into location register 3213 corresponding to the branch condition judgment carry 'COND2.' The value '7' replaces the previously written value '4'.

Thus, when the advance pointer 3204 reaches the first branch instruction 3206, the location registers 3212 and 3213 respectively store position information about the instructions last updating the branch condition judgment carry values before execution of the first branch instruction 3206. Further, when the advance pointer 3204 reaches the branch instruction 3206, the branch instruction 3206 is read out and sent to decoder 3207 via bus 3211. It can be determined that instruction 3206 is a branch instruction, a stop signal may then be sent to pre-detection control unit 3202 via control line 3216 such that the advance pointer 3204 is stopped at the branch instruction 3206.

At the same time, because the instruction pointed to by advance pointer 3204 is the branch instruction, decoder 3207 may select a location register corresponding to the branch condition judgment carry or carries used by the branch instruction via control line 3215 and output the value of the selected register to comparator 3218 as one input. The other input to comparator 3218 is the position information 3214 of the current instruction being executed by the CPU core.

Thus, when the position information 3214 of the current instruction being executed by the CPU core is larger than or equal to the stored position of the instruction last updating the branch condition judgment carry value, it may indicate that the branch condition judgment carry value(s) is ready for making a decision on whether the branch condition is satisfied. The comparator 3218 may then output an "equal" result to control unit 3219. After all branch condition judgment carries required by the branch instruction are updated, the control unit 3219 may send out a "ready" signal 3220 to allow the CPU core to make a determination whether the branch is taken or jump should be taken and to determine the branch target (e.g., the "TAKEN" signal or "BRANCH/JUMP" signal).

Although not shown explicitly, the carry test unit 3203 can also obtain other information from registers of the CPU core, instruction buffer 3201 and other appropriate devices to generate the "ready" signal 3220. Further, carry test unit 3203 may also send information to the CPU core in order to generate the "ready" signal 3220.

In certain circumstances, such as when the CPU core is not perform out-of-order instruction execution, not all location registers corresponding to the branch condition judgment carries should send their values to the comparator 3218. Decoder 3207 may generate a control signal to select a largest position value among the values of all location registers corresponding to the branch condition judgment carries. Thus, when the comparator 3218 outputs the "equal" signal control unit 3219, or the largest position is less than or equal to the position of the current instruction being executed, the values of all branch condition judgment carries are updated. The program counter (PC) may also be used as the position of the current instruction being executed.

Further, CPU core 125 also provides a partial address "OFFSET" to L1 cache 124 to index instructions within a cache block determined by BNX of BN 151. L1 memory 124 or higher level memory 124 may be configured into cache blocks or memory blocks indexed by BNX. L1 memory 124 may contain a write port to receive data from bus 140. For the write address, X address (WXADDR), as provided by allocator 170, is from bus 153 generated by APT 129, and Y address (WYADDR, the offset address) is provided by Fetch engine (sync with the data being filled). L1 memory 124 may contain a read port to output data to CPU core 125. For the read address, X address (BNX) is provided from tracker 170 as BN 151, and Y address is provided by CPU core 125 as OFFSET.

Figure 17:
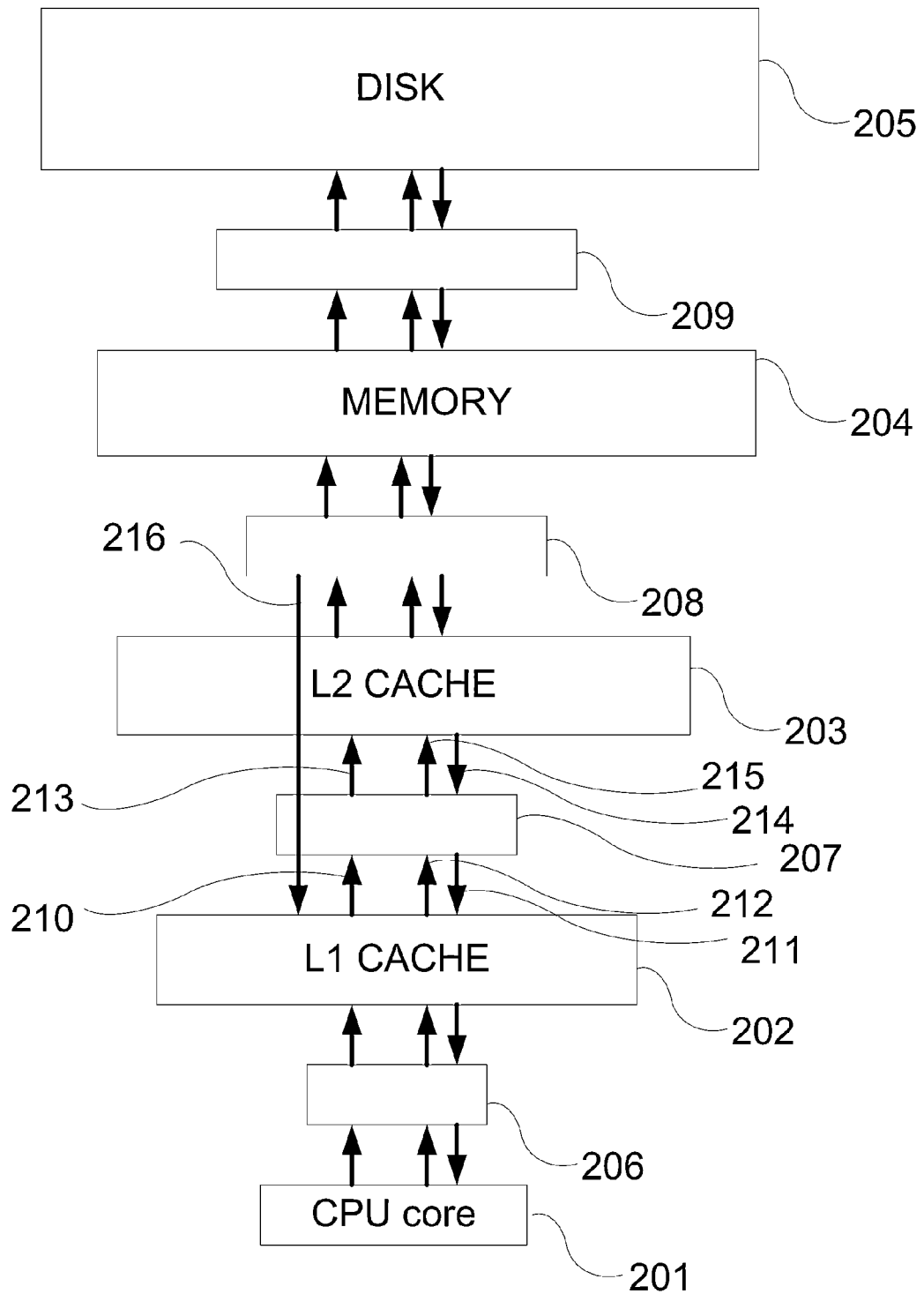
FIG. 17 illustrates an exemplary storage structure using high performance caching structures consistent with the disclosed embodiments.

FIG. 17 is an exemplary storage structure using high performance caching structures consistent with the disclosed embodiments. A caching structure may be similar to a cache control unit as explained previously. As shown in FIG. 17, storage devices used by CPU core 201 include (from high speed to low speed) first level memory 202, second level memory 203, main memory 204, hard disk or mass storage 205. In general, capacity of first level memory 202 is less than second level memory 203; capacity of second memory 203 is less than main memory 204; and capacity of main memory 204 is less than capacity of hard disk 205. Any size or capacity may be used by any storage device.

Further, a caching structure 206 is placed between CPU core 201 and first level memory 202; a caching structure 207 is placed between first level memory 202 and second memory 203; a caching structure 208 is placed between second level memory 203 and main memory 204; and a caching structure 209 is placed between main memory 204 and hard disk 205. Other arrangement may also be used. Such layered caching structures may improve performance of CPU core 201.

For example, with respect to caching structure 207 between first level memory 202 and second memory 203, because CPU core 201 needs to fetch instructions from level-one memory 202, and instructions in level one memory 202 comes from level-two memory 203. Thus, when instructions passing through caching structure 207, the instructions can be scanned and analyzed to fetch related instructions into level-one memory 202 ahead of execution to increase cache hit rate for both instructions and data.

Caching structure 207 may be similar to caching structure 206, the interface of caching structure 207 to level-one memory includes address bus 210, read data bus 212, and write data bus 211, and interface to level-two memory 203 includes address bus 213, read data bus 214, and write data bus 215. Caching structure 207 may thus increase a hit rate of level-one memory 202.

Similarly, caching structure 208 between level-two memory 203 and main memory 204 may increase a hit rate of level two memory 203, and caching structure 209 between main memory 204 and hard disk 205 may increase a hit rate of main memory 204. If hard disk 205 includes all instructions required by CPU core 201, through this layered caching structures, a high hit rate or high performance may be maintained by CPU core 201.

Further, caching structures between slower memories may have wider bandwidth, i.e., the number of instructions or data fetched at one time. For example, the bandwidth of caching structure 209 is larger than the bandwidth of caching structure 208; the bandwidth of caching structure 208 is larger than the bandwidth of caching structure 207; and the bandwidth of caching structure 207 is larger than the bandwidth of caching structure 206. Other configurations may also be used.

In addition, a separate path 216 may be provided between caching structure 208 and level-one memory 202. Instructions or data may be filled from main memory 204 into level-two memory 203 and level one memory 202 at the same time to further increase the performance of the entire system.

Figure 18A:
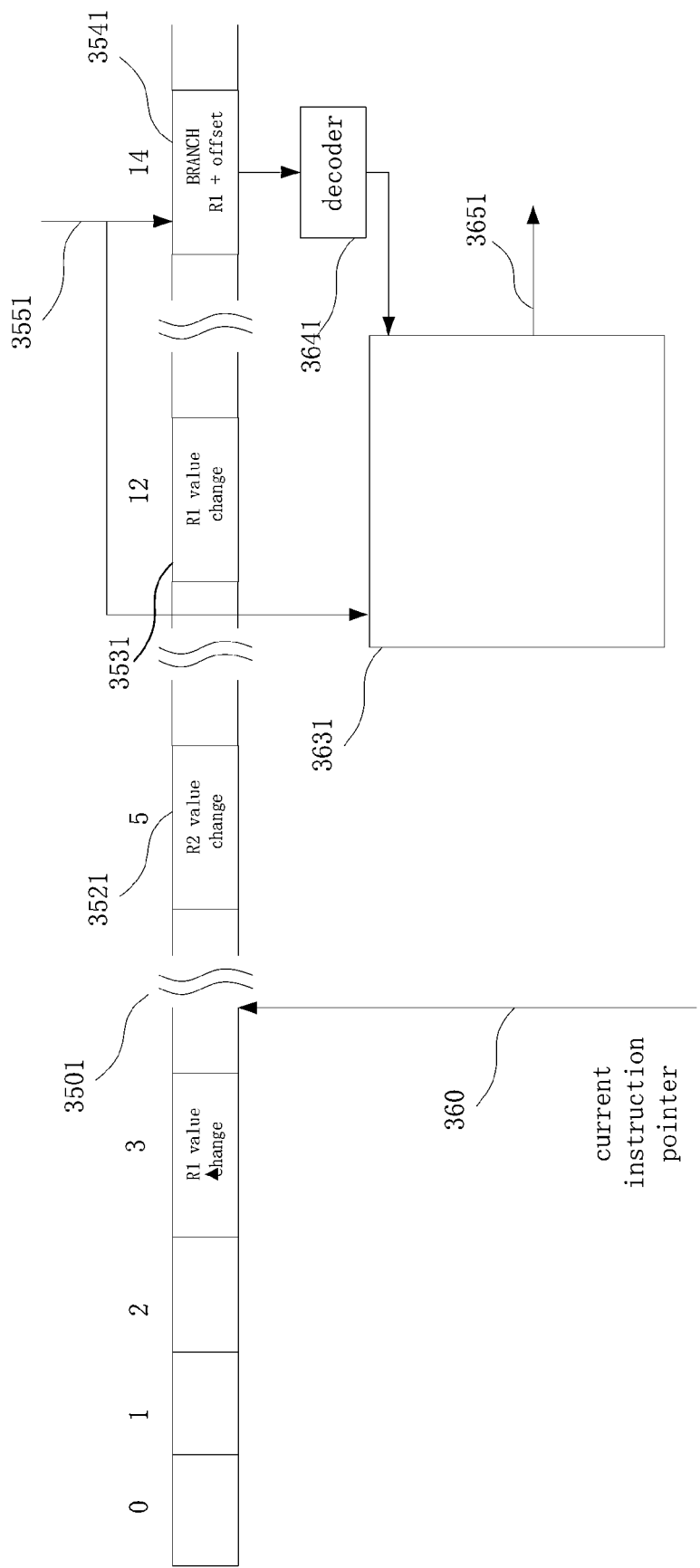
FIG. 18A illustrates an exemplary instruction pre-filling based on indirect addressing consistent with the disclosed embodiments.

The above embodiments use direct addressing to calculate branch target address and to perform instruction pre-filling. However, indirect addressing can also be used. FIG. 18A illustrates an exemplary instruction pre-filling based on indirect addressing. When the indirect addressing is used, register value (e.g., base register value) may need to be first determined in order to calculate branch target address. Thus, any updating information about the register used in the indirect addressing may be stored in corresponding track points of the track table.

As shown in FIG. 18A, a track 3501 includes a plurality of track points (0-14). Track point 14 is a branch instruction using register R1 for indirect addressing with the target address as the R1 register value+offset. Track points 3 and 12 both update the R1 register value. In operation, the instruction pointer 3551 (e.g., BNY) moves ahead of the current instruction pointer 360 along the track 3501. When pointer 3551 is moving through every track point on track 3501, information about the track point may be read out and decoder 3641 may determine whether the track point is an indirect addressing branch instruction, and relevant information such as track point number and instruction information, such as instruction type, base register number, and offset, etc., may be stored in device 3631.

Instruction pointer 3551 keeps moving until reaching a first track point of an indirect addressing branch instruction. As shown in FIG. 18A, pointer 3551 stops at track point 14 (3541). When pointer 3551 moves through the track points before stopping at track point 14, the device 3631 receives information on track points that update the base register(s) used by the indirect addressing branch instruction. Thus, when the pointer 3551 moves to track point 14 (3541), the register number of the base register used by the indirect addressing branch instruction of track point 3541 can be determined, and the number of the track point that updates the base register for the last time before the indirect addressing branch instruction can also be determined. For example, the track point last updating the base register R1 is track point 12 (3531).

At the same time, when the current instruction pointer 360 moves along the track 3501, the value of current instruction pointer 360 is the track point number of the instruction that is being executed by the CPU core. Device 3631 compares the value of the current instruction pointer 360 and the track point number of the track point last updating the base register (i.e., track point 12 (3531)) and outputs the result of the comparison on bus 3651. If the value of the current instruction pointer 360 is greater than or equal to the track point number of the track point last updating the base register, it may indicate that the base register used by the indirect addressing branch instruction has been updated, and the register number of the base register can then be sent to the CPU core to fetch the updated value of the base register for calculating the branch target (e.g., the base register value+offset). Depending on the actual branch instructions, the branch target address can be calculated by using the base register value plus an offset, or by using the base register value directly. After the branch target is calculated, the corresponding code segment can be filled into the higher level memory, as explained previously.

Figure 18B:
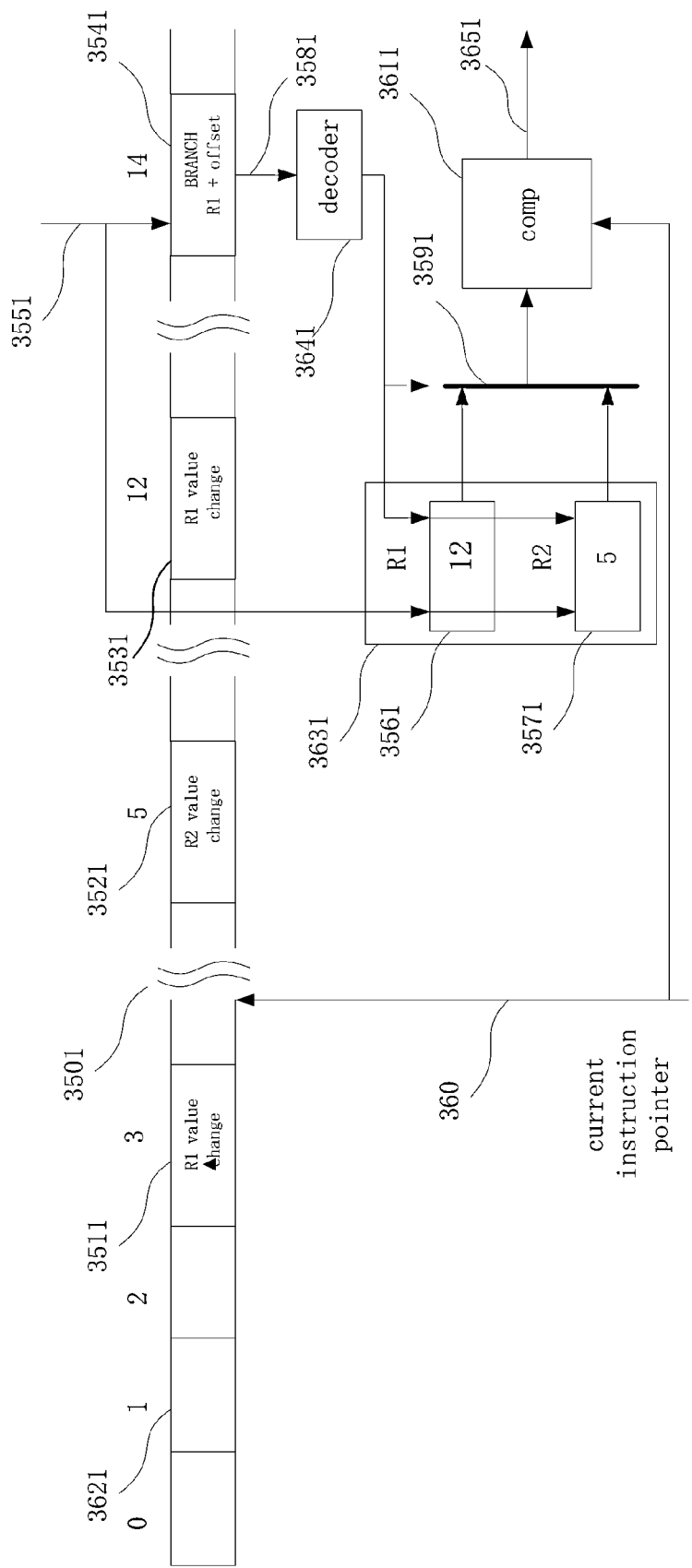
FIG. 18B illustrates another exemplary instruction pre-filling based on indirect addressing consistent with the disclosed embodiments.

FIG. 18B illustrates another exemplary instruction pre-filling based on indirect addressing. For illustrative purposes, it may be assumed that two base registers R1 and R2 are used for indirect addressing in the instruction set for the CPU core, and the value of an individual base register can be used as the base address for any indirect addressing branch instruction. More base registers may be used similarly. Further, although only indirect addressing branch instructions are discussed, other branch instructions can also be included and used such that various addressing modes can be provided.

As shown in FIG. 18B, track 3501 stores relevant information about indirect addressing branch instructions and base register updating instructions, etc. Track point 3621 may be an entry point to track 3501, and the relevant information includes information about the base register number used in the indirect addressing branch instruction, the offset, and the base register updating instructions, etc.

When the program flow enters track 3501 from entry point 3621, current instruction pointer 360 and the instruction pointer 3551 all start from the entry point 3621, and the track point number (or YADDR) of the entry point may be stored in corresponding registers in device 3631 as initial values.

The current instruction pointer 360 moves along the track 3501 based on the execution speed of the CPU core; while the instruction pointer 3551 moves ahead faster than the current instruction pointer 360. When the instruction pointer 3551 moves through the track points in track 3501, the base-register-related information of the track points is also checked. For example, if a track point corresponding to an instruction updating a relevant base register (e.g., R1 or R2), the track point number (or YADDR) of the track point is stored in the corresponding register in device 3631.

Thus, as shown in FIG. 18B, register 3561 stores the track point number for base register R1, and register 3571 stores the track point number for base register R2. Decoder 3641 may receive contents of the track points pointed by the instruction pointer 3551 and, based on the contents, may generate enable signals for the various registers in the device 3631 and a select signal of multiplexer 3591 to control the values written into the various registers and the value outputted to comparator 3611.

More particularly, as shown in FIG. 18B, pointer 3551 starts from the track point number '1', the register 3561 and the register 3571 stores the initial value of the track number '1'. The pointer 3551 then moves from left to right to track point 3 (3511), and the content of track point 3 (3511) is first read out and the track number '3' is stored in R1 register 3561. Then the pointer 355 continues to move to track point 5 (3521), and the content of track point 5 (3521) is then read out and the track number '5' is stored in R2 register 3571. Further, the pointer 3551 continues to move to track point 12 (3531), and the content of track point 12 (3531) is then read out and the track number '12' is stored in R1 register 3561 to replace the previous value of '3'.

The pointer 3551 then moves to the indirect addressing branch instruction at track point number 14 (3541), the corresponding content of the track point 14 (3541) indicates that R1 base register is used for indirect addressing. Thus, based on the content of the track point 14 (3541) through bus 3581, multiplexer 3591 selects the value from R1 register 3561 and sends the value to the comparator 3611. The other input to comparator 3611 is the value of current instruction pointer 360 (the track point number pointed to by the current instruction pointer 360).

When the comparator 3611 determines the value of the current instruction pointer 360 is greater than or equal to the value of R1 register 3561, indicating that the base register R1 has been updated to the value required by the track point 14, a signal can be sent to bus 3651 to another unit for calculating a complete branch target address (e.g., the base address plus an offset). Other methods may also be used.

Figure 19:
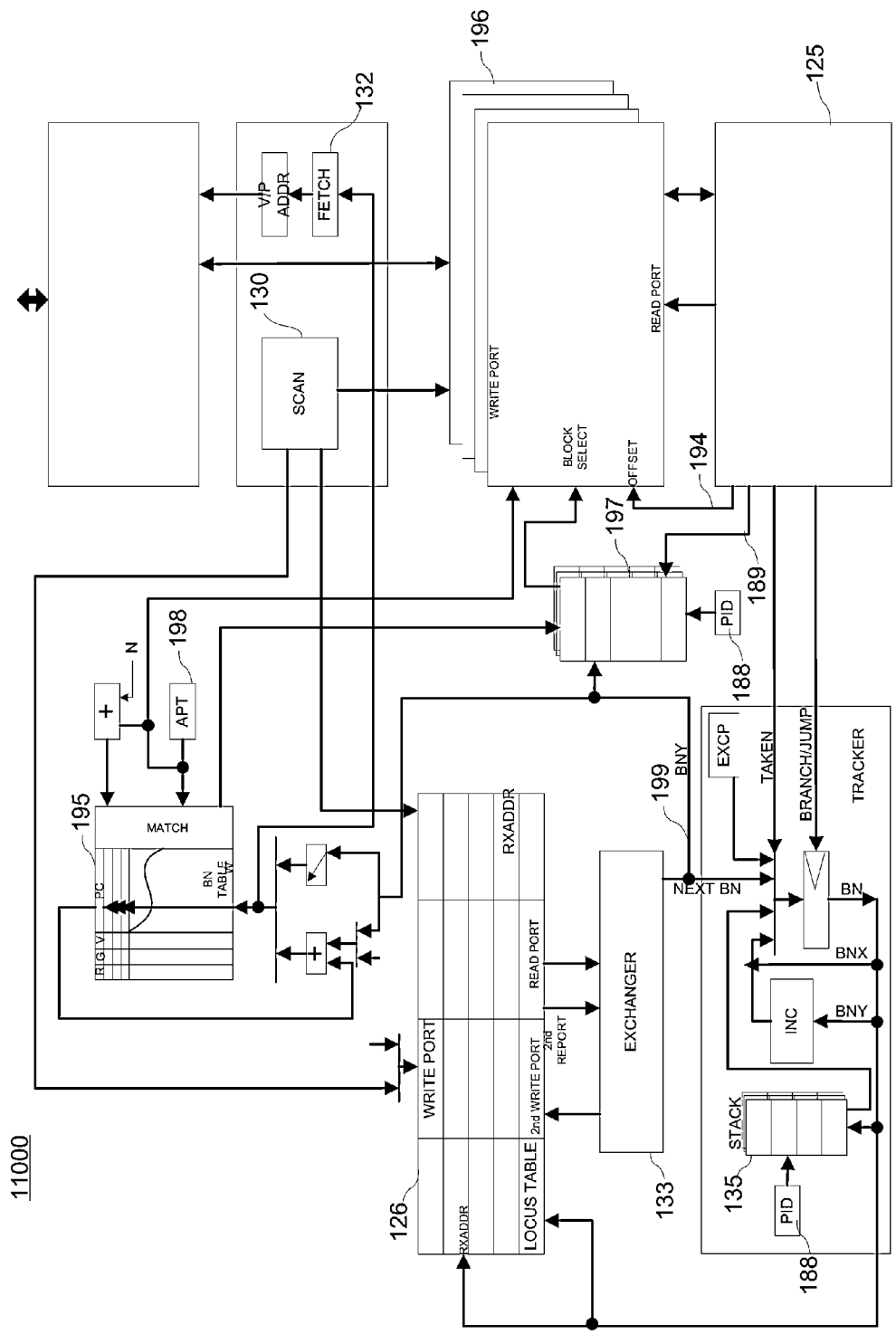
FIG. 19 illustrates another exemplary cache system consistent with the disclosed embodiments.

FIG. 19 shows another exemplary cache system 11000 consistent with the disclosed embodiments. Similar to cache system 9000 described in FIG. 10A, cache system 11000 may be used for caching data instead of instructions. Thus, reserve list 120 and exchanger 133 may be omitted.

Active list 195 for data usage may have the same structure as active list 121. Each entry in active list 195 corresponds to a data block in higher level memory 196. Further, a base address pointer storage 197 is provided to store block number of data blocks corresponding to base addresses. The number of base address pointers in base address pointer storage 197 is the same as the number of base addresses used by CPU core 125 and can be, for example, 8. Any number may be used. In addition, CPU core 125 may use a base address plus an offset to address higher level memory 196. The offset can ensure the addressed data does not exceed the range of the data block corresponding to the base address.

Multi-thread programming may also be supported. For example, a plurality of stacks 135 may be used for filling instructions in multi-thread programming, as explained previously, and a plurality of base address pointer storages 197 may be used for filling data in multi-thread programming. PID 188 may thus point to a current stack 135 and a current base address pointer storage 197. However, if only one thread is supported, a single stack 135 and a single base address pointer storage 197 may be used and PID 188 may be omitted.

When generator 130 scans and analyzes instructions being fetched, if an instruction changes base address of data, information about the base address, instant number, and register number, etc., are stored in a corresponding track point in track table 126. Further, when CPU core 125 executes the instruction, the base address or a converted base address, may be provided to active list 195 to match contents in active list 195.

If a match is found, the entry number of the matched entry is provided to base address storage 197 as the content for the base address pointer. Because entries in active list 195 correspond to data blocks in higher level memory 196, the base address pointer now has the base address of the corresponding data block in higher level memory 196.

On the other hand, if a match is not found, the base address is provided to fill engine 132 to fill the corresponding data block. When the data block corresponding to the base address is fetched, the base address is stored in an entry of active list 195 pointed by pointer 198, and the fetched data block is stored in a data block in higher level memory 196 pointed by pointer 198. The entry number of the entry in active list 195 is stored in a corresponding base address pointer in base address pointer storage 197. Similar to filling instructions, pointer 198 moves to the next available entry in active list 195.

When CPU core 125 executes an instruction visiting certain data in higher level memory 196, the base address 189 from the instruction is used as an index to read out data block number (DBN) from base address pointer storage 197. Further, a data load/store address offset 194 is used as an index to find a data entry in the data block pointed by the data block number (DBN). The data entry is then used by CPU core 125 for read and write operations.

Figure 20:
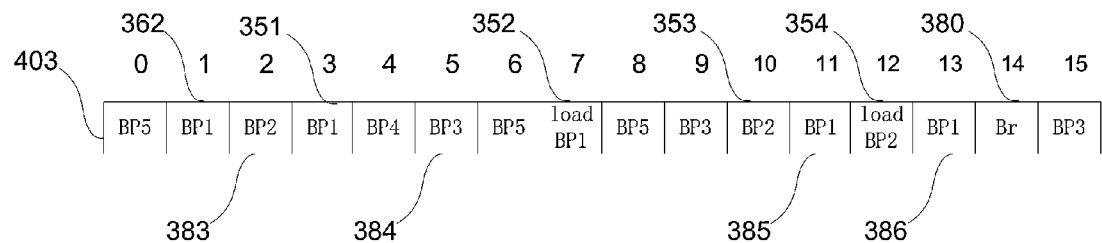
FIG. 20 illustrates an exemplary interaction between data operation and instructions consistent with the disclosed embodiments.

In addition, a track table structure can also be applied to data caching. In operation, data is always related to instructions, i.e., the instructions cause the data to be read out, processed, or written back. Thus, in certain embodiments, data operation can be associated with certain instructions, such as read/write (load/store) instructions and branch instructions. For illustrative purposes, target addresses for the load/store instructions and branch instruction are represented in a base-register-plus-offset format, other addressing formats can also be similarly realized. FIG. 20 illustrates an exemplary interaction between data operation and instructions.

As shown in FIG. 20, an instruction segment 403 may contains 16 instructions, instruction 0 to instruction 15 (the number 0, 1, 2, . . . , 15 are equivalent to the BNY values described previously). Instruction 1 (362) may be a target instruction entering the instruction segment 403. Instruction 7 (352) is a load instruction using BP1 as the base register. Because instruction 7 uses base register BP1 for reading data, any instruction that is executed before instruction 7 and also changes the value of BP1 base register may be relevant to when the BP1 base register has a correct value for instruction 7. That is, to determine when the data needed by instruction 7 can be pre-filled into cache (the higher level memory) using the disclosed systems and methods.

Thus, as shown in FIG. 20, with respect to instruction 7 (352) loading data using the BP1 base register, instruction 1 (362) and instruction 3 (351) are two instructions in the code segment 403 to be executed before instruction 7 (352) and also updating the BP1 base register. Further, although instruction 1 (362) updates the value of BP1 base register, instruction 5 (351) updates the value of BP1 base register again after instruction 1 (362). Thus, the value of BP1 base register at the time when instruction 7 (352) is executed should be the value of BP1 base register after instruction 5 (351) is executed.

Similarly, instruction 12 (354) is a loading instruction using BP2 as the base register. Instruction 2 (383) and instruction 10 (353) are two instructions to be executed before instruction 12 (354) in the code segment 403 and updating the BP2 base register. Although instruction 2 (383) updates the value of BP2 base register, instruction 10 (353) updates the value of BP2 base register again after instruction 2 (383). Thus, the value of BP2 base register at the time when instruction 12 (354) is executed should be the value of BP2 base register after instruction 10 (353) is executed.

Further, instruction 14 (380) is the first branch instruction after the entry point to the code segment 403, so that all instructions from the entry point and before the instruction 14 (380) will be executed. Thus, when the execution flow of the CPU core starts with the entry point to the code segment 403 (e.g., instruction 1 (362)), data segments corresponding to instruction 7 (352) and instruction 12 (354) can be filled into higher level memory 124 before these instructions are executed. However, a pre-filling operation may have to be performed after the instruction providing the last-updated value of a corresponding base register.

For example, although instructions 1, 2, 11, and 13 (362, 383, 385, 386) update the value of BP1 or BP2 base register, none of these instructions provides the last updating value of BP1 or BP2 base register. Other instructions update values of BP3, BP4, BP5 and other registers but do not update the value of BP1 or BP2 base register. Thus, to ensure the proper values of the BP1 base register and the BP2 base register, instructions updating the base registers need to be analyzed and the instructions updating the base registers with the proper values are to be identified.

Figure 21A:
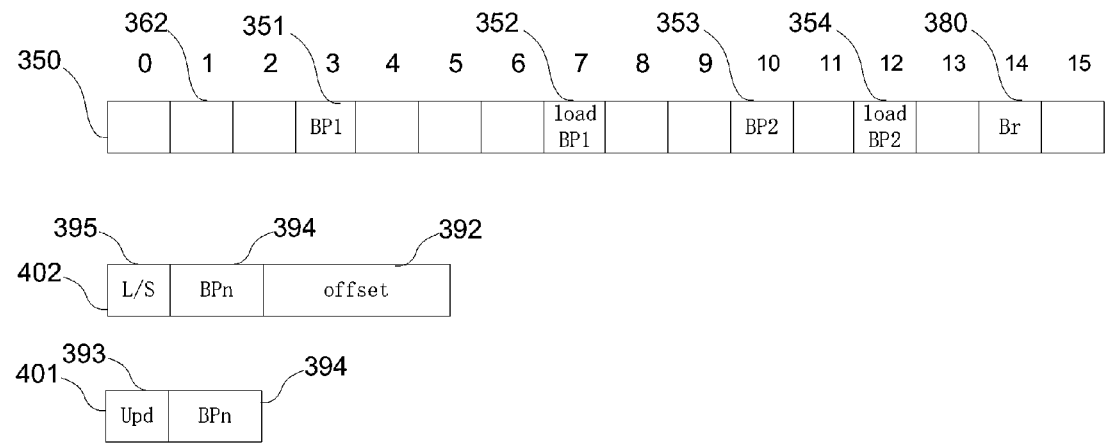
FIG. 21A illustrates an exemplary track table structure storing data-loading information consistent with the disclosed embodiments.

Because the above established relationship between the data operation and instructions, a similar track table structure can be used for data operation. FIG. 21A illustrates an exemplary track table structure storing data-loading information consistent with the disclosed embodiments.

As shown in FIG. 21A, a row 350 is a track table row corresponding to code segment 403. Various track points may be added to the track table to record information related to the data pre-filling. For example, two types of information may be recorded in the content of a track point of a corresponding track:

(1) read/write instruction information;
(2) last register-updating instruction information. A last register-updating instruction may refer to an instruction that provides a last update to the value of a corresponding base register used in the read/write instruction before the execution of the read/write instruction.

More particularly, in track table row 350, information on load instruction 7 (352), load instruction 12 (354), instruction 3 (351), and instruction 10 (353) is appropriately stored. Among these instructions, load instruction 7 (352) and load instruction 12 (354) are read/write instructions and have type-one information; and instruction 3 (351) and instruction 10 (353) are last register-updating instructions and have type-two information.

Further, the different types of information may have different formats when being stored. For example, for type-one information, the entry format 402 may include a read/write identifier 395, a base register number 394, and an offset 392. Further, for type-two information, the entry format 401 may include a last register updating instruction identifier 393 and a base register number 394. Other formats may also be used.

Figure 21B:
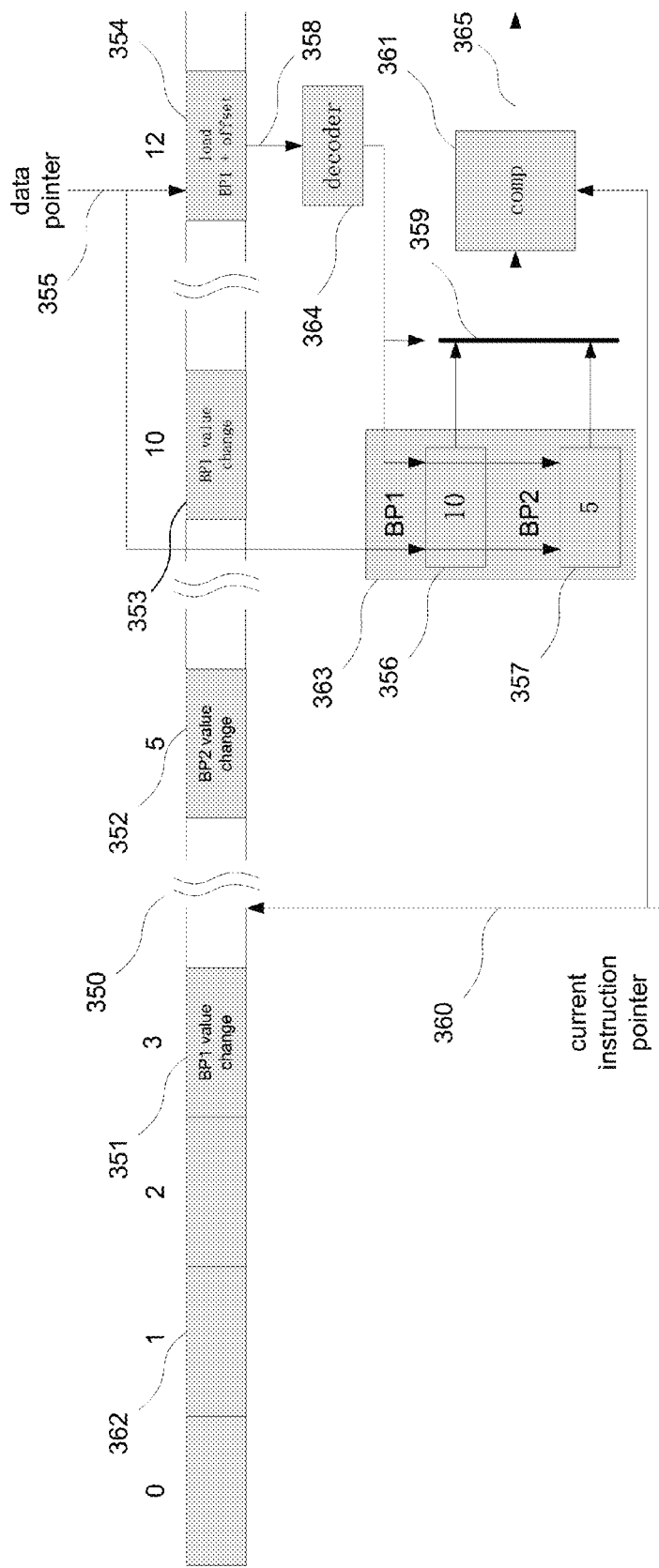
FIG. 21B illustrates an exemplary structure for data pre-filling based on the track table structure consistent with the disclosed embodiments.

After the track table row 350 is stored with the various types of information described above, the information may be used to pre-fill data segments in advance of corresponding instruction execution. FIG. 21B illustrates an exemplary structure for data pre-filling based on the track table structure.

As shown in FIG. 21B, the code segment 403 corresponding to track 350 is being executed. That is, track 350 was already created and the code segment 403 was already in higher level memory. Further, track 350 was created to including the data segment information (e.g., the types of information mentioned above). For example, track point 362 is an entry point to track 350, i.e., a target address of another track point. In this disclosure, when created the track 350 or analyzing any particular load/write instruction or indirect addressing branch instruction, a reverse scan may be used to limit the instruction information to be stored in track 350 or to be analyzed. For example, when one or more read/write instructions use particular base registers, only instruction information of instructions updating the particular base registers may need to be stored. That is, these instructions are scanned first and instructions affecting registers used by these instructions are scanned later or in a second round.

Further, a data pointer 355 is used to facilitate pre-filling any relevant data segment, and a group of registers 363 may be used to record values of the base registers, such as register 356 and register 357 (e.g., BP1 base register and BP2 base register). When the program flow enters track 350 from entry point 362, current instruction pointer 360 and the data pointer 355 all start from the entry point 362, and the values of registers 356 and 357 may be set to the track point number of the entry point 362 or a default value.

The current instruction pointer 360 moves along the track 350 based on the execution speed of the CPU core; while the data pointer 355 moves ahead faster than the current instruction pointer 360. When the data pointer 355 moves through the track points in track 350, the data-related information of the track point is also checked. For example, if type-two information (last register updating instructions) is identified, the values of base registers in registers 363 may be updated accordingly. Thus, as shown in FIG. 21B, after the data pointer 355 moves through track points 352 and 353, the register 356 (BP1 register) is updated to '12', and the register 357 (BP2 register) is updated to '5'.

More particularly, as shown in FIG. 21B, the register 356 stores the track number (BN or BNY) of the track point last updating the BP1 base register, and the register 357 stores the track number (BN or BNY) of the track point last updating the BP2 base register. Further, according to the received content 358 of the track point 354 pointed by the data pointer 355, the decoder 364 creates the write-enable signal for registers 363 and the select signal for the multiplexer 359 to control the updating of the registers 363 and to select the value of one of the registers 363 to the comparator 361.

At the beginning of execution, the data pointer 355 moves from the track point 1 (362), and register 356 and register 357 are initialized as the starting track point number of the data pointer 355, the value '1'. Data pointer 355 is then moving from left to right to track point 3 (351), and the entry of track point 3 (351) is first read out and the value of the BP1 register is updated with the current data pointer value, which is 3.

Data pointer 355 continues to move to track point 5 (352), and the entry of track point 5 (352) is then read out and the value of the BP2 register is updated with the current data pointer value, which is 5. Further, Data pointer 355 continues to move to track point 10 (353), and the entry of track point 10 (353) is then read out and the value of the BP1 register is updated with the current data pointer value, which is 10, to replace the previous value of 3.

Data pointer 355 then moves to the first read/write instruction at track point 12 (354), the corresponding entry of the track point 12 (354) indicates that BP1 base register is used to read data. Thus, based on the content of the track point 12 (354), decoder 364 select the register 356 corresponding to BP1 base register and output the value of the register 356 to the comparator 361 through multiplexer 359. The other input to comparator 361 is the value of current instruction pointer 360 (the track point number pointed to by the current instruction pointer 360).

When the comparator 361 determines the value of the current instruction pointer 360 is greater than or equal to the value of register 356, indicating the data base register BP1 has been updated to the required value by the track point 12, a signal can be sent to bus 365 to another relevant unit for calculating a complete address for memory read/write (e.g., the base address plus an offset). The data segment can be filled by using the complete address in advance of the execution of the read/write instruction 12 (354)).

Figure 21C:
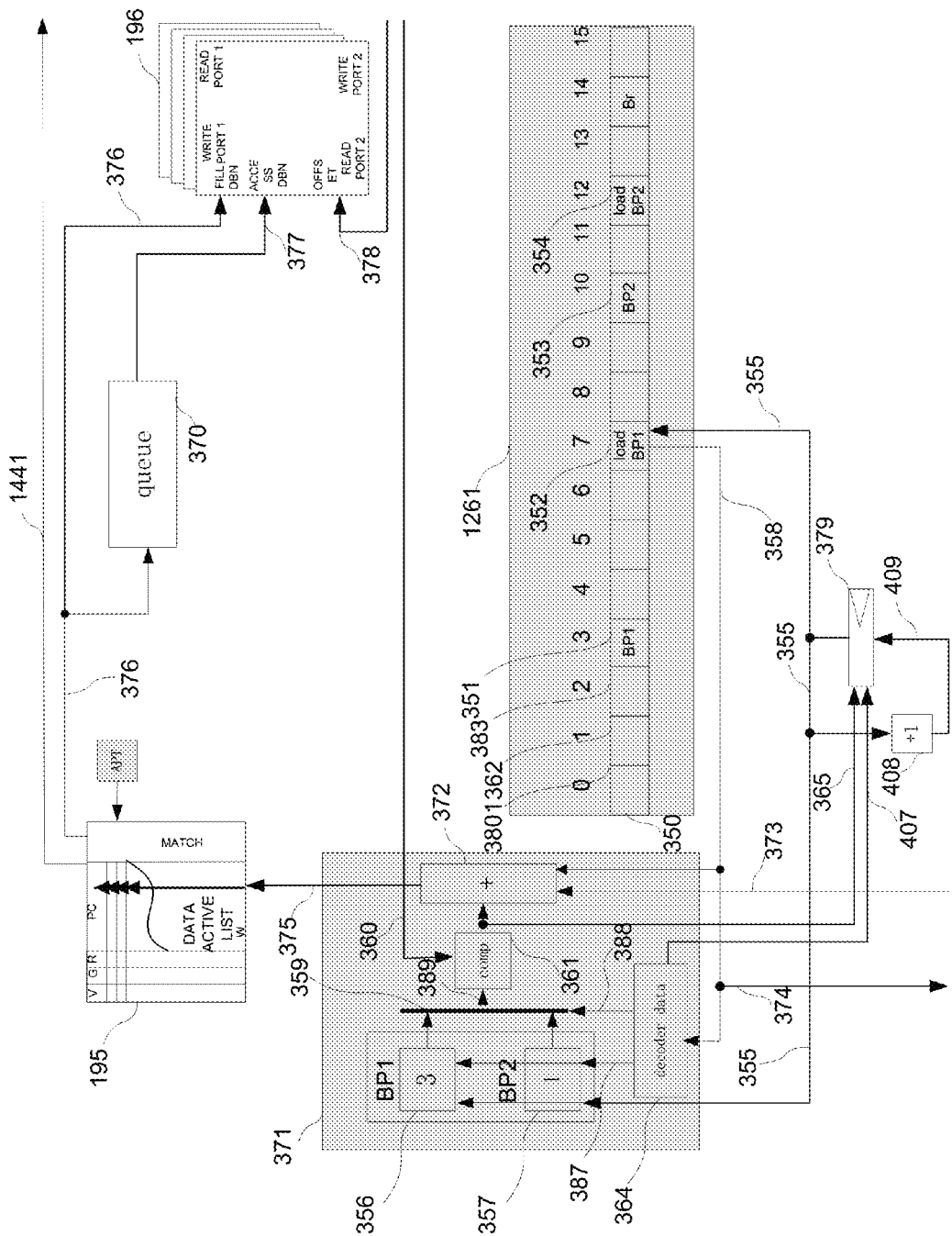
FIG. 21C illustrates more details of a caching system implementing the data pre-filing structures consistent with the disclosed embodiments.

FIG. 21C shows more details of a caching system implementing the data pre-filing structures. As shown in FIG. 21C, track 350 is created in track table 1261. When entering track 350, i.e., when the CPU core executes an entry track point (e.g., track point 0 (3801)), data pointer 355 points to the track point 3801. Afterwards, the data pointer 355 moves to the right (i.e., into the track 350) and the contents of the track points moved over are checked. The data pointer 355 stops at a first read/write instruction (track point 352).

More specifically, when the data pointer 355 starts at the entry track point 3801 (i.e., track point 0), the number '0' is written into register 379. Further, the value of the register 379 is increased by one at a time though a self-incrementor 408 and writing back the incremented value to the register 379. Thus, the data pointer 355 (i.e., output value of the register 379) can be increased one at a time and moves to the right. In addition, the register 379 can be controlled by signal 407 to stop writing back temporarily (data pointer 355 stopping), or controlled by signal 365 to resume writing back (data pointer 355 moving).

Further, detection module 371 includes registers 356, register 357, multiplexer 359, comparator 361, adder 372, and decoder 364. Detection module 371 and register 379, multiplexer 359, self-incrementor 408, and active list 195 work together to fill data segments into the higher level data memory 196.

When the data pointer 355 moves into the entry track point 3801, the track point number '0' of track point 3801 is written into registers for storing the base address via bus 358, e.g., the register 356 corresponding to the BP1 base register and register 357 corresponding to the BP2 base register. Alternatively, certain default value may be written into these registers as the initial values of registers corresponding to all of the base registers. Or no initialization may be performed as to keep the current values of the registers.

Further, when the data pointer 355 moves through the track 350, the track point 1 (362) may be detected as an instruction updating the base register BP1. Thus, when data pointer 355 points to track point 362, the content of track point 362 is sent to decoder 364 via bus 358, and the decoder 364 generates a write enable signal 387 to write the track number '1' into register 356. When the data pointer 355 reaches track point 2 (383), which may be detected as an instruction updating the base register BP2, the content of the track point 383 is sent to decoder 364 via bus 358, and the decoder 364 generates a write enable signal 387 to write the track number '2' into register 357.

Similarly, when the data pointer 355 reaches the track point 3 (351), which may be detected as an instruction updating the base register BP1, the track number '3' is written into register 356 to replace the previous value of '1'. When the data pointer reaches track point 352, a read/write instruction, the content of the track point 352 is sent to decoder 364 via bus 358, and the decoder 364 generates control signal 407 to the register 379 to stop updating register 379 (i.e., stop moving data pointer 355). When the data pointer 355 stops at the track point 352, the decoder 364 generates a selection signal 388 to select from multiplexer 359 the value of the register 356 corresponding to the base register BP1 (356). The value of the register 356 is sent to comparator 361 via bus 389.

At the same time, the current instruction pointer 360 moves with the execution flow of instructions. The current instruction pointer 360 indicates the position information of the instruction being currently executed in the instruction segment. For example, the position information may be the lower address of the program counter (PC). The track number of the track point pointed by current instruction pointer 360 is also sent to the comparator 361. When the comparator 361 determines that the number from the current instruction pointer 360 is greater than or equal to the number sent by bus 389 (i.e., the track point number '3'), it may indicate that the last register-updating instruction has been executed, and the BP1 base register is updated with the required value. The enable signal 365 from the comparator 361 to the adder 372 is valid.

Thus, the base register information in the track point 7 (352) can be sent to the CPU core 125 via bus 374, and the value of the base register can be retrieved to adder 372 via bus 373. The offset information in the track point 7 (352) can also be sent to the adder 372 via bus 358. The adder 372 can complete the calculation of a data address by adding the value of the base register and the offset while the enable control signal 365 is still valid, and can send the calculated data address to active list 195 via bus 375. The active list 195 may perform the matching operation.

If the matching operation is not successful, a new data block number (DBN) may be created and the data address is sent to fill engine 132 via bus 1441 to obtain the corresponding data segment from lower level memory 122. At the same time, the new DBN is sent to higher level data memory 196 via bus 376 as the filling address and to fill the higher level data memory 196 with the obtained data segment at a location determined by the new DBN. The new DBN is further sent to the DBN queue 370. On the other hand, if the matching operation is successful, the matched DBN can be directly sent to the DBN queue 370.

While the data segment corresponding to the track point 7 (352) is being filled, updating of register 379 is resumed under the control of signal 365. The data pointer 355 continued to move to the right until the data pointer 355 points the track point 12 (354). The content of the track point 12 (354) is sent to the decoder 364 via bus 358. The decoder 364 generates control 407 to suspend the updating the register 379. The above operation process may then be repeated to fill the data segment corresponding to track point 12 (354) into the higher level data memory 196, and the corresponding DBN is also sent to the DBN queue 370.

Further, the DBNs corresponding to the read/write instruction in track point 352 and the read/write instruction in track point 354 are in the DBN queue 370, and when the CPU core 125 executes these read/write instructions, the corresponding DBN can be obtained from the DBN queue 370 one at a time in sequence via bus 377, and the corresponding data segments can be determined. Together with the offset from CPU core via bus 378, the required data can be located in the data segment.

In addition, if the value of the register for storing base address register BP1 or BP2 is not updated after the data pointer 355 enters into the track 350 and reaches a read/write instruction, it may indicate that the base register required by the read/write instruction is already updated. At this time, because the registers for storing the BP1 and BP2 were written as '0' when the data pointer 355 enters into the track 350, the data segment can be pre-filled as long as the track point number pointed by the current instruction pointer 360 is greater than '0'.

Figure 22A:
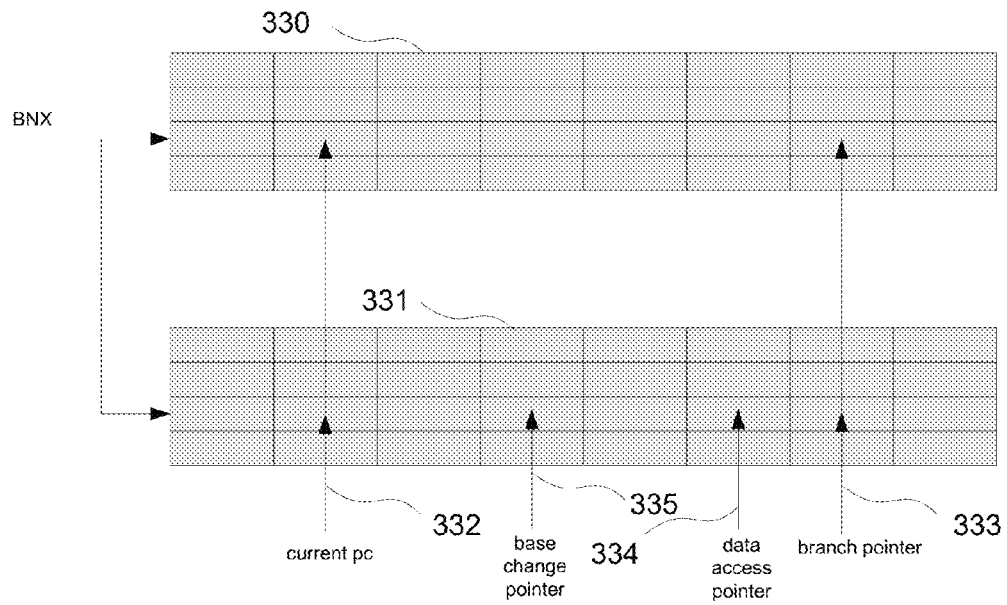
FIG. 22A illustrates an exemplary arrangement of data and instruction track tables consistent with the disclosed embodiments.

In certain embodiments, a track table structure for data may be integrated with the track table for instructions. That is, a single track table (e.g., track table 126) may be used for both data and instruction. In certain other embodiments, a separate track table may be used for data, in addition to the track table for instructions. FIG. 22A illustrates an exemplary arrangement of data and instruction track tables.

As shown in FIG. 22A, a track table 330 is provided for instructions and a corresponding track table 331 is provided for data. Each row in track table 330 corresponds to a memory block in the higher level instruction memory, and each entry in the row corresponds to an instruction in the memory block. The entry is also the track point, including information such as instruction type (i.e., whether the instruction is a branch instruction) and the calculated target address if the instruction is a branch instruction.

Data track table 331 may have similar size to the instruction track table 330. Further, entries in data track table 331 may correspond to entries in instruction track table 331. For illustrative purposes, same positions in the track tables 330 and 331 indicate the corresponding entries from track tables 330 and 331. As previously explained, an entry in data track table 331 includes information such as instruction type (e.g., whether the instruction is a read/write instruction) and the base register and offset for calculating data address if the instruction is a read/write instruction.

In addition, the current program counter (PC) 332 points to the entries in both track tables 330 and 331 at the same position. When the current program counter 332 points to a table row in track table 330, the code segment corresponding to the table row has been filled into the higher level instruction memory, and the instruction type of each instruction has been identified and stored in the track table 330. Thus, the first branch instruction after the current program counter 332 can be found, as pointed by branch pointer 333.

For a one-level track structure, a code segment corresponding to the target address of the branch instruction is filled into the higher level memory, and a related track in the track table 330 is created. However, for a two-level track structure, more pointers are needed to point to a first branch instruction after the branch instruction pointed by branch pointer 333, and to point to a first branch instruction after the target instruction of the branch instruction pointed by the branch pointer 333. The higher level memory may then be similarly filled, and the extra tracks may be created accordingly. More levels in track structure can be used.

When the current program counter 332 and branch pointer 333 coincides, the branch instruction is being executed, and the current program counter 332 will move to a new track point, a current instruction, based on the result of the execution of the branch instruction (i.e., whether the branch happens). Branch pointer 333 will also change with the current program counter 332, pointing to a first branch instruction after the new current instruction. This process is repeated so as to fill the code segments into the higher level memory in advance of execution.

Similarly, when the code segment is filled into the higher level memory, data related information (whether an instruction is a read/write instruction, etc.) is also stored in track table 331. Thus, a first read/write instruction before the branch instruction pointed by the branch pointer 333 can also be found, as pointed by data access pointer 334. Further, track table 331 also stores information about instructions last updating the corresponding base registers used by the read/write instructions. Thus, the last register-updating instruction after the current program counter 332 and before the branch instruction pointed by the branch pointer 333 is also found, as pointed by base change pointer 335.

With the execution of instructions of the current track, when the current program counter 332 moves to the position of base change pointer 335, the read/write address for the first read/write instruction pointed by data access pointer 334 can be calculated and be used to fill the data segment corresponding to the calculated read/write address into the higher level data memory. At the same time, the corresponding base register is also updated with the new value (e.g., as a result of the execution of the instruction pointed by the base change pointer 334).

If the base change pointer 335 is not located between the track points pointed by the current program counter 332 and the data access pointer 334, the value of the base register needed by the first read/write instruction pointed by data access pointer 334 may be considered as a valid value. The read/write address can immediately be calculated and the data segment corresponding to the calculated read/write address can be filled into the higher level data memory.

In addition, if the read/write instruction pointed by data access pointer 334 is after the branch instruction pointed by the branch pointer 333, because it may be difficult to determine whether the read/write instruction will be executed or not in advance of the execution of the branch instruction, the data segment will not be filled into the higher level data memory no matter where the base change pointer 335 points to.

When the current program counter 332 and data access pointer 334 coincides, it may indicate that the read/write instruction is being executed. Data access pointer 334 may then point to next read/write instruction after the current program counter 332 and before the branch pointer 333. At the same time, base change pointer 335 may point to an instruction last updating the base register used by the next read/write instruction, also after the current program counter 332 and before the branch pointer 333 (if none exists, the value of the base register needed by the next read/write instruction pointed by the new data access pointer 334 may be considered as a valid value). This process may be repeated until a new track is started and then in the new track as well such that data segments can be filled into higher level data memory in advance of the execution of the instructions accessing the data segments.

Of course, if the data segment associated with the base register has already been filled in the higher level data memory, the data segment does not need to be filled again. In such case, the active list 195 described previously is used to match the existing data block already in the higher level data memory.

Figure 22B:
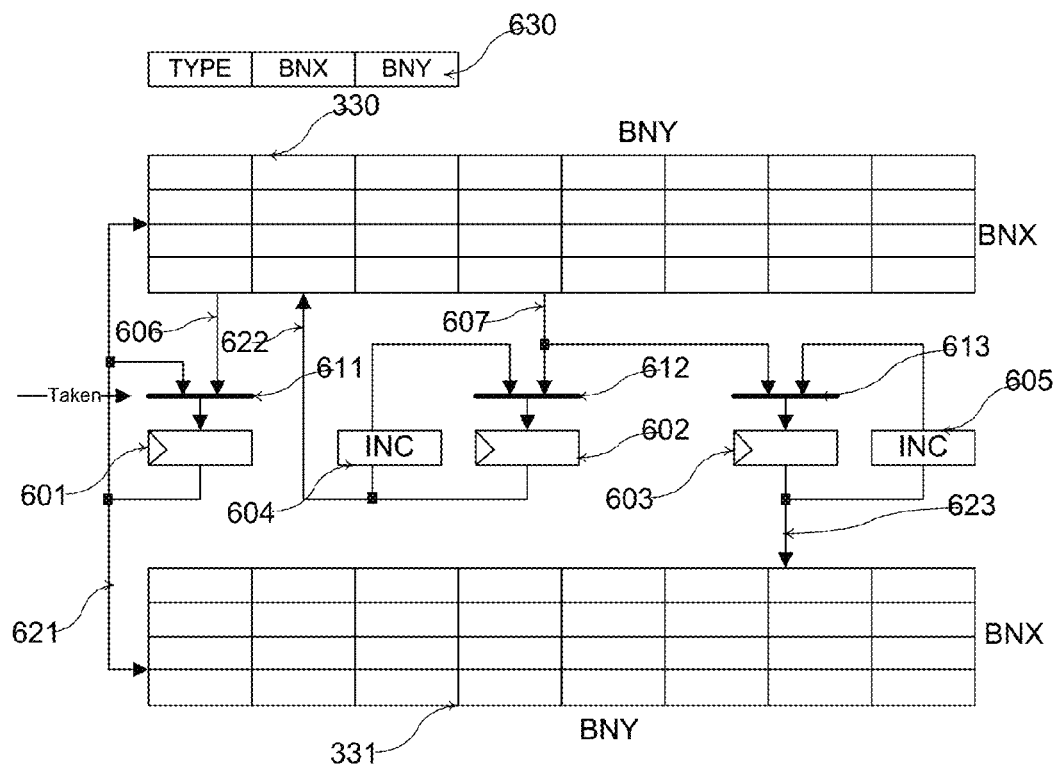
FIG. 22B illustrates an exemplary interface structure between an instruction track table and a data track table consistent with the disclosed embodiments.

Further, in operation, instruction track table 330 and data track table 331 may need to be synchronized using certain interfaces provided between instruction track table 330 and data track table 331. FIG. 22B illustrates an exemplary interface structure between the instruction track table 330 and data track table 331.

As shown in FIG. 22B, instruction track table 330 may have the content format 630: branch type, target BNX, and target BNY. Instruction track table 330 is also coupled to data track table 331. Further, latches 601, 602, and 603 are configured between the instruction track table 330 and the data track table 331. Latches 602 and 603 also have incrementors 604 and 605, respectively.

Further, the same BNX is used for both the instruction track table 330 and the data track table 331, while separate BNYs are used for the instruction track table 330 and the data track table 331, called IBNY and DBNY. In operation, BNX 621 and IBNY 622 are provided to index an entry from instruction track table 330, and the content of the entry is read out and placed on bus 606 and bus 607. More particularly, target BNX is outputted on bus 606, and target BNY is outputted on bus 607 (branch type is not shown here for simplicity).

Further, multiplexers 611, 612, and 613 are configured to provide inputs to latches 601, 602, and 603, respectively, and are controlled by the same branch taken decision signal (i.e., the "TAKEN" signal). BNX 621 and DBNY 623 are provided to index an entry from data track table 331.

When a branch is taken, all multiplexers select inputs from the instruction track table 330. BNX 621 is then equal to target BNX, and IBNY 622 and DBNY 623 are equal to target BNY. Further, target BNX on bus 606 is latched in latch 601; target BNY on bus 607 are latched in latch 602 and latch 603. Thus, BNX 621 and IBNY 622 now index an instruction track table entry whose table address is the content of the table entry before branch is taken. BNX 621 and DBNY 623 now index a data track table entry.

After the branch is taken and the new track is started, multiplexers 611 and 612 both select the input other than the ones from the instruction track table. BNX 621 stays on the same BNX, and BNY 622 increments every clock cycle until encounter an entry which holds the next branch instruction. Then BNY 622 can stay on the next branch instruction so the branch target is available on bus 606 and bus 607 when the next branch taken signal will select BNY 622 through the multiplexers and latch them in respective latches 601, 602 and 603. Or the branch target can be saved in a temporary storage (not shown for clarity) for branch purpose, while the BNY 622 moves further ahead to ensure the instructions needed by the program in the near future are in L1 cache (as described in this disclosure).

For data track table, similar actions may be performed according to the instruction branch. When the branch is taken, BNX 621 is set to target BNX, DBNY 623 is set to target BNY. Starting from the data track table entry of the branch target, the pointer DBNY 623 moves further ahead to ensure the data needed by the program in the near future is in L1 cache (as described in this disclosure).

Figure 22C:
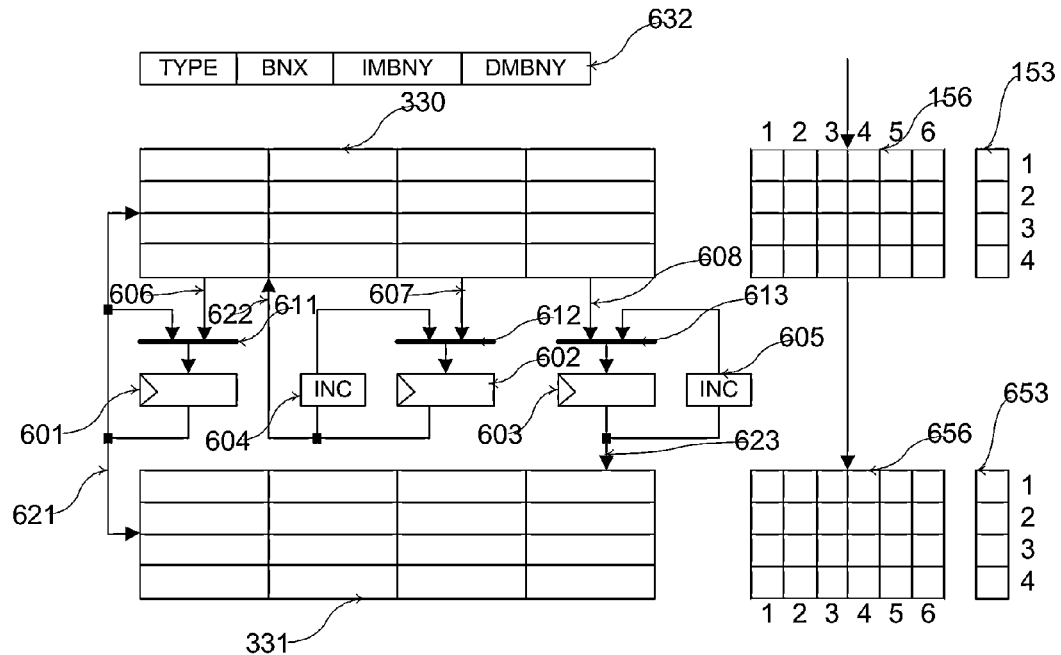
FIG. 22C illustrates an exemplary interface structure between an instruction track table and a data track table with compression consistent with the disclosed embodiments.

Of course, the track table compression structure may also be applicable to both instruction track table 330 and data track table 331. FIG. 22C illustrates an exemplary interface structure between the instruction track table 330 and data track table 331 with compression.

The interface structure in FIG. 22C may be similar to that in FIG. 22B. However, as shown in FIG. 22C, a separate port/bus 608 is added to instruction track table 330 to output the target data BNY, target DBNY, from instruction track table 330. The mapping from BNY to MBNY can be done at time of filling the entries in the track table 330. FIG. 22C may include combined structures from FIG. 22B and FIG. 15. That is, mapping table 156 and ID table 153 are used for table compression of instruction track table 330, and mapping table 656 and ID table 653 are used for table compression of data track table 331. The table entry format of the instruction track table 330 is in the format 632 of: type, target BNX, target IMBNY (instruction mapped BNY), and target DMBNY (data mapped BNY).

For example, assuming that track 2 of instruction track table 330 is being filled, and there is a branch instruction in the position of row 3, column 2 (BNX=3, BNY=2), which points to the branch target at row 1, column 5 (BNX=1, BNY=5). The entry in row 3, column 2 (i.e., the branch source) may be generated as follows.

First, the content is generated. The content type can be from decoding the instruction (i.e., the branch source instruction), target BNX can be the matching result of the upper part branch target address by active list 121 (e.g. row 1). The lower portion (BNY) of target address (e.g., 5) together with the BNX index entries at row 1, column 5 of both table 156 and table 656. The content of table 156 entry (e.g., 2) is the target IMBNY, and the content of table 656 entry (e.g., 4) is the target DMBNY. Thus, the target column address (target BNY) 5 has been mapped to target IMBNY 2 and target DMBNY 4.

Then, row 2 in instruction track table 330 and row 2 in data track table 331 are to be filled. The row 2 in table 153 is used to index an entry in row 2 of instruction track table 330 to be filled with the generated content, and the row 2 in table 653 is used to index an entry in row 2 of data track table 331 to be also filled. The operation of the compressed track table is described with respect to FIG. 15 and is therefore omitted. Next step is to determine where to fill the generated content. Because the branch source is in the entry of row 3 and column 2, the row 3 of table 153 is checked to assign a column number for table 330. As here, row 3 of table 153 is '1'. Therefore, the content is to be filled into row 3, column 1 of table 330, and the IMBNY 1 is filled to row 3, column 2. After the above operation is completed, the row 3 or table 153 is incremented to 2.

If the active list matching operation does not find the branch target memory block in L1 cache, which may indicate no corresponding row in track table 330, the content type field can be filled as "PC" to indicate the link needs to be recomputed when this entry is read out as branch target. In this case, type is marked as "PC", BNX is not valid, both IMBNY and DMBNY are filled with the branch source address offset BNY (note this is not target BNY). When this entry is read out from table 330 as branch target, the "PC" type triggers the system to compute branch target address. The source instruction used to compute the branch target address is indexed by the BNY stored in the IMBNY and DMBNY fields from the current memory block. The target memory block and its associate information are then filled into L1 cache, table 330, table 156 and table 153 at a newly assigned row. After this is complete, the entry marked as "PC" is filled with the updated branch target information.

Content of table 331 might not contain branch target information. Generation of this content is based on the decoding of the instruction alone without going through the mapping as described in the table 330 content generation. Further, the filling of the table 331 is done with a similar process to that in the table 330. That is, table 156 is checked, table 331 and table 656 are filled. Afterward, the entry in table 653 is incremented.

When pointer 621 points to row 3 and column 1 of table 330, the content is outputted. Target BNX 622 is 1, target IMBNY is 2, and target DMBNY is 4. If the branch is taken, then the content in row 1 and column 2 of table 330 is read out, and content in row 1 and column 4 of table 331 is read out. If the branch is not taken, the entries to the right of the current entries are read out. For example, the entry at row 3 and column 2 of table 330 is read out.

Similar to FIG. 22B, when there are temporary storage to store the branch target information in preparation for branch, pointers 621, 622 and 623 can move ahead to ensure the instructions or data which might be needed in near future are in L1 cache.

Figure 22D:
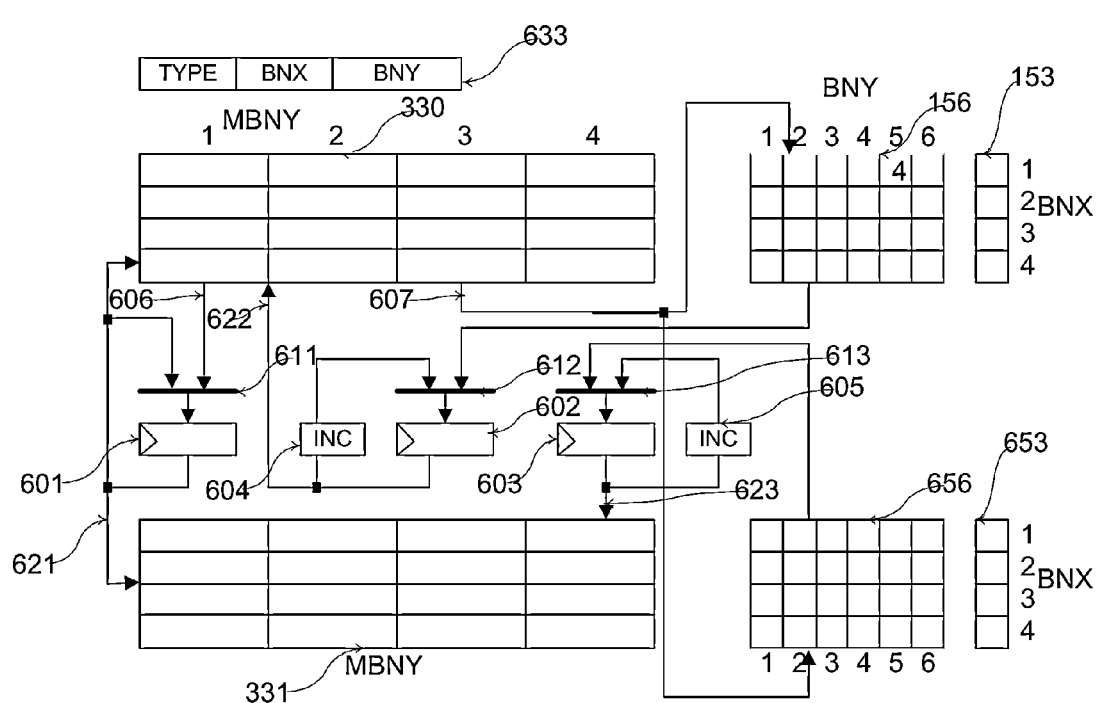
FIG. 22D illustrates an exemplary interface structure between an instruction track table and a data track table with compression consistent with the disclosed embodiments.

Alternatively, the mapping from BNY to MBNY can be performed at time the content is read out from table 330 instead of being performed at time of table 330 entry being filled. In this way, content of table 330 only has type, target BNX and target BNY. When the target BNY is read out from table 330, this target BNY is sent to both table 156 and table 656 together with the target BNX to resolve IMBNY and DMBNY, respectively. The IMBNY and DMBNY are then sent to multiplexer 612 and multiplexer 613 as the input being selected if branch is taken, as illustrated in FIG. 22D. Format 633 is the table entry format for table 330.

Figure 23:
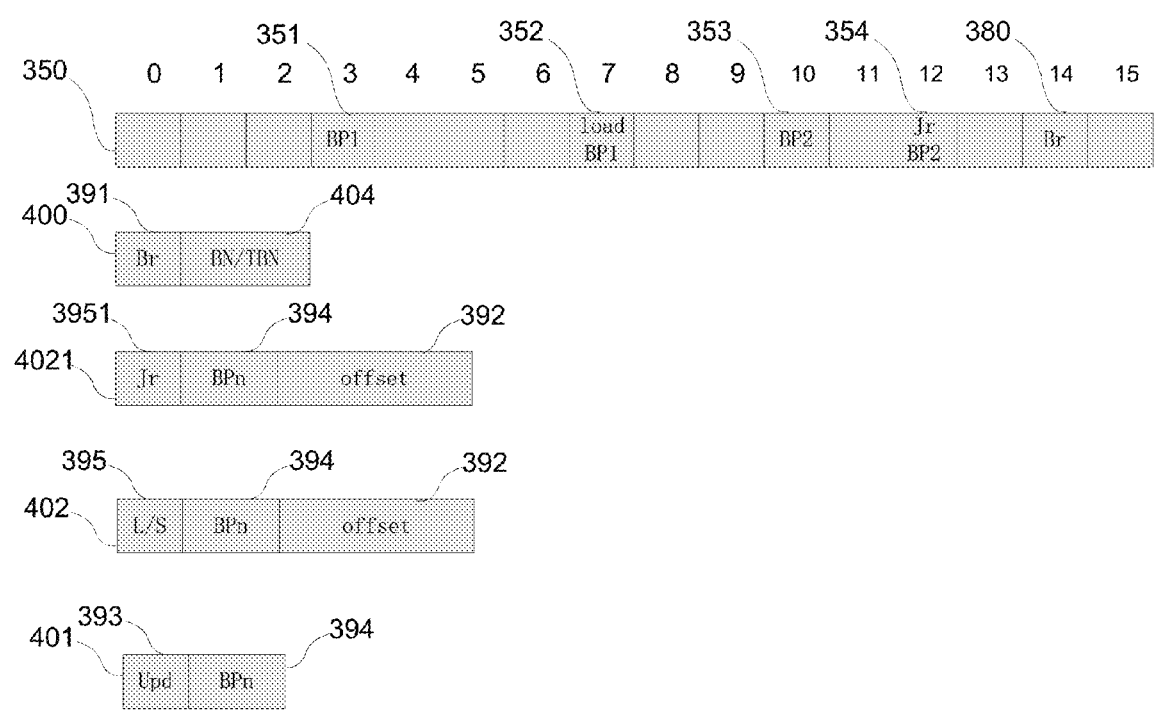
FIG. 23 illustrates an exemplary row of a track table and types of information consistent with the disclosed embodiments.

Further, in certain embodiments, the two track tables 330 and 331 may be integrated and a single track table (e.g., track table 126) may be used. Thus, instruction track table related information as well as data track table related information may be stored in the integrated track table. FIG. 23 illustrates an exemplary row of a track table and types of information.

As shown in FIG. 23, a row 350 is a track table row corresponding to a code segment. Various track points may be added to the track table to record information related to the data segment operation. For example, four types of information may be recorded in a track point of a corresponding track:

(1) direct addressing branch instruction information;
(2) indirect addressing branch instruction information;
(3) read/write instruction information; and
(4) last register-updating instruction information.

More particularly, in track table row 350, information on branch instruction 14 (380), branch instruction 12 (354), load instruction 7 (352), instruction 3 (351), and instruction 10 (353) are appropriately stored. Among them, branch instruction 14 (380) is a direct addressing branch instruction and has type-one information; branch instruction 12 (354) is an indirect addressing branch instruction and has type-two information; load instruction 7 (352) is a read/write instruction and has type-three information; and instruction 3 (351) and instruction 10 (353) are last register updating instructions and have type-four information.

Further, the different types of information may have different format when being stored. For example, for type-one information, the entry format 400 may include a branch instruction identifier 391 and a target address 404 in the form of a BN or TBN (the BN includes BNX and BNY). For type-two information, the entry format 4021 may include an indirect addressing branch instruction identifier 3951, a base register number 394, and an offset 392. For type-three information, the entry format 402 may include a read/write instruction identifier 395, a base register number 394, and an offset 392. Further, for type-four information, the entry format 401 may include a last register updating instruction identifier 401 and a base register number 394. Other formats may also be used.

Figure 24:
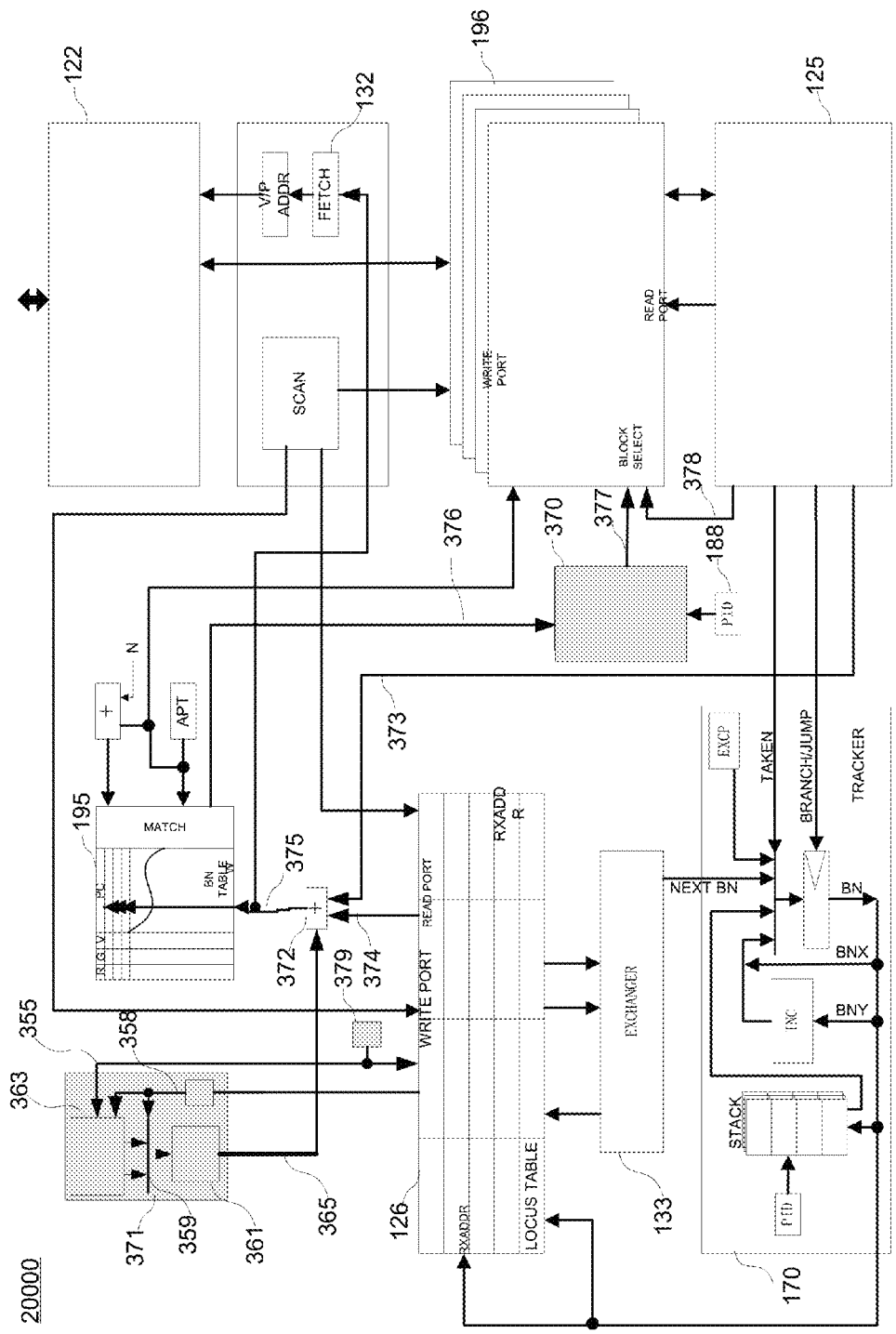
FIG. 24 illustrates an exemplary cache system consistent with the disclosed embodiments.

After the track table row 350 is stored with the various information described above, the information may be used to fill data segments in advance of corresponding instruction execution. FIG. 24 illustrates an exemplary cache system 20000 consistent with the disclosed embodiments. FIG. 24 may be based on the cache systems previously described and the disclosed data/instruction track table structures.

As shown in FIG. 24, cache system 20000 is similar to cache system 11000 in FIG. 19, e.g., exchanger 133 and tracker 177 are used to fill instructions into higher level memory (e.g., memory 124 and 196) and both instructions and data are stored in lower level memory 122. Cache system 20000 also includes a data pointer module 379, a detection module 371, and a data block number (DBN) queue 370. Further, cache system 20000 uses a single track table 126 for storing track information for both instruction and data (i.e., an integrated track table).

Data pointer module 379 is used to control the movement of data pointer 355. Detection module 371 may include structures shown in FIG. 21C, such as the group register 363 (e.g., registers 356 and 357), the multiplexer 359, the decoder 364, and the comparator 361, etc. The decoder 364 may receive the content 358 of a track point from the track table 126 as pointed by the data pointer 355. Further, the value of the base register can be sent by CPU core 125 to operation unit 372 via bus 373, and the offset value can be sent by track table 126 to operation unit 372 via bus 374. Operation unit 372 may then calculate the read/write address based on the base register value and the offset value, and may send the calculate read/write address to active list 195 for matching operation.

Active list 195 may match the received read/write address with entries in active list 195. If there is a match, i.e., the data segment was already in the higher level memory 196, the corresponding data block number (DBN) can be retrieved, and the DBN is sent to the DBN queue 370 via bus 376.

On the other hand, if there is not a match, i.e., the data segment was not in the higher level memory, the data block number (DBN) is created and the active list 195 and track table 126 are updated with the new DBN, similar to instruction filling operation described previously. The DBN is also sent to the DBN queue 370 via bus 376, and the read/write address is sent to fill engine 132. The data segment associated with the read/write address is then filled into the higher level memory 196.

Because the tracker 170 determines the execution sequence based on contents of the track table, each DBN in the DBN queue can be related to the instruction corresponding to the address of the DBN. When a read/write instruction is executed, the correct DBN can be obtained from the DBN queue to select the correct data segment in the higher level memory 196 via bus 377. At the same time, the lower address (i.e., offset) of the read/write address is provided by bus 378 to access the required data from the data segment and to complete the read/write operation.

If the DBN queue 370 that stores a DBN corresponding to an read/write instruction after the first branch instruction, when the first branch instruction is being executed and it is determined that the branch is taken, the DBN of the read/write instruction not to be executed due to the branch taken may be flushed out of the DBN queue 370. Alternatively, the DBN queue 370 may only store DBNs corresponding to read/write instructions before the first branch instruction so as to avoid the queue flushing operation.

In addition, the offset value for calculating the read/write address may be stored in the higher level instruction memory (e.g., higher level memory 124) as a part of the instruction, without being stored in the track table 126. When there is a need to calculate the read/write address, the offset value can be sent to operation unit 372 from the higher level instruction memory. Further, in a multi-thread programming environment, when switching threads, the DBN queue may be cleared for the old thread and the DBNs of the new thread may then be added. Or the DBNs in the DBN queue may include a thread ID to be set using the proper thread ID sent by PID 188.

Alternatively, the DBN queue and active list 195 may be omitted. After the memory read/write address is generated and the data segment is read out, a tag-RAM structure may be used in the higher level memory 196 to fill the data segment into the higher level memory 196, and also to fill the address tags. When a read/write instruction is executed, the data segment can be found using a tag-matching method. Further, although the above examples use read/write instructions, other instructions such as indirect branch instructions may be processed similarly.

Figure 25:
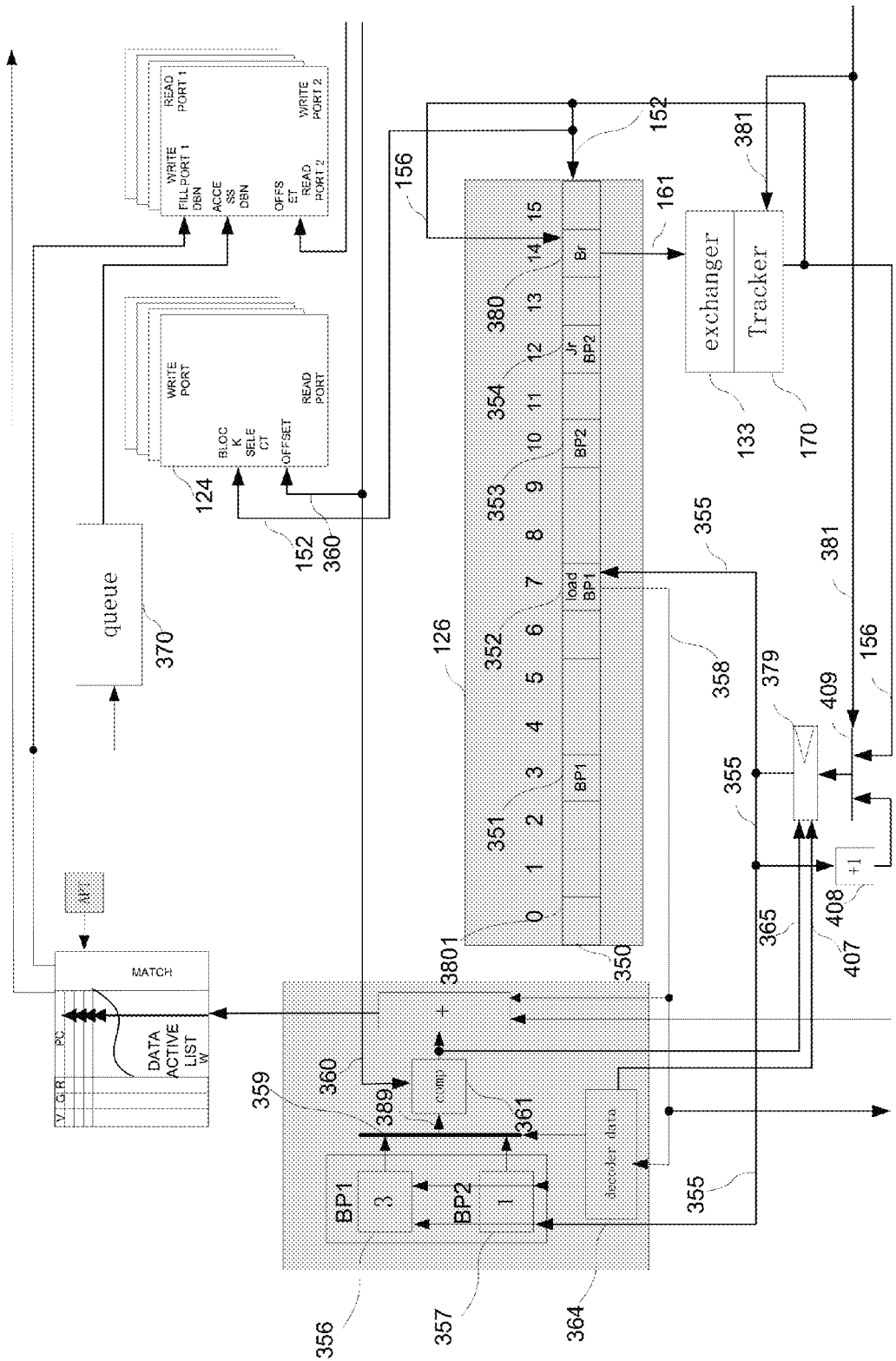
FIG. 25 illustrates an exemplary cache system consistent with the disclosed embodiments.

FIG. 25 illustrates more details and configurations of cache system 20000. As shown in FIG. 25, track 350 is created in track table 126. When a branch instruction causes the program execution flow enters into track 350 through an entry track point 3801, BNX 152 points to track 350 and the corresponding instruction block in higher level instruction memory 124; BNY 156 points to the track point 3801, and data pointer 355 also points to the track point 3801. Afterwards, the BNY pointer 156 and the data pointer 355 move to the right (i.e., into the track 350) and the contents of the track points being moved over are checked. The BNY pointer 156 stops at a first branch instruction and the data pointer 355 stops at a first read/write instruction or an indirect addressing branch instruction.

The contents of the track point pointed by BNY pointer 156 is sent to the exchanger 133. The details of how exchanger 133 updates BN/TBN and tracker 170 operates have been explained previously and are omitted here. The BNY pointer 156 moves to the right and stops at the first branch instruction track point 380. If the information stored in track point 380 includes a BN, the instruction segment corresponding to the target address of the first branch instruction has already been filled in the higher level instruction memory 124. If the information stored in track point 380 includes a TBN, the instruction segment corresponding to the target address of the first branch instruction has not already been filled in the higher level instruction memory 124, and the instruction segment is found from the lower level memory 122 and filled into the higher level instruction memory 124 in advance of the execution of the first branch instruction. In certain embodiments, the exchanger 133 may be omitted when the reserved list is not used.

At the same time, when the BNY pointer 156 moves, data pointer 355 also moves to the right and stops at the first read/write instruction track point 352. More specifically, when the BNY pointer 156 starts at the entry track point 362 (i.e., track point 0), the number '0' pointed by the BNY pointer 156 is written into register 379. Further, the value of the register 379 is increased by one at a time though a self-incrementor 408 and writing back the incremented value to the register 379. For example, if the track 350 includes 16 track points, the self-incrementor 408 may use a mod-16 plus 1 logic (i.e., a value of '15' is incremented to '0'). Thus, the data pointer 355 (i.e., output value of the register 379) can be increased one at a time and moves to the right and wraps at a starting point of a new track. In addition, the register 379 can be controlled by signal 407 to stop writing back temporarily, or controlled by signal 365 to resume writing back.

As previously illustrated, when the data pointer 355 moves to the track point 7 (352), the track point number '3' of track point 351 was already stored in register 356, the content of track point 352 is then sent to decoder 364 via bus 358, and the decoder 364 generates control signal 407 to the register 379 to stop updating register 379 (i.e., stop moving data pointer 355). Further, the decoder 364 generates a selection signal 388 to select from multiplexer 359 the value of the register 356 corresponding to the base register BP1 (356). The value of the register 356 is sent to comparator 361 via bus 389.

When the comparator 361 determines that the number from the current instruction pointer 360 is greater than or equal to the number sent by bus 389 (i.e., the track point number '3'), the base register value and offset may be calculated and the matching and data-filling may be performed similarly to the previously explained examples.

While the data segment corresponding to the track point 7 (352) is being filled, updating of register 379 is resumed under the control of signal 365. The data pointer 355 continued to move to the right and the track number '10' of track point 353 is stored in the register 357 corresponding to the BP2 base register. Further, the data pointer 355 moves to the right until reaching the track point 12 (354). The content of the track point 12 (354) is sent to the decoder 364 via bus 358. The decoder 364 generates control 407 to suspend the updating the register 379. The above operation process may then be repeated to fill the data segment corresponding to track point 12 (354) into the higher level data memory, and the corresponding DBN is also sent to the DBN queue 370.

Figure 26:
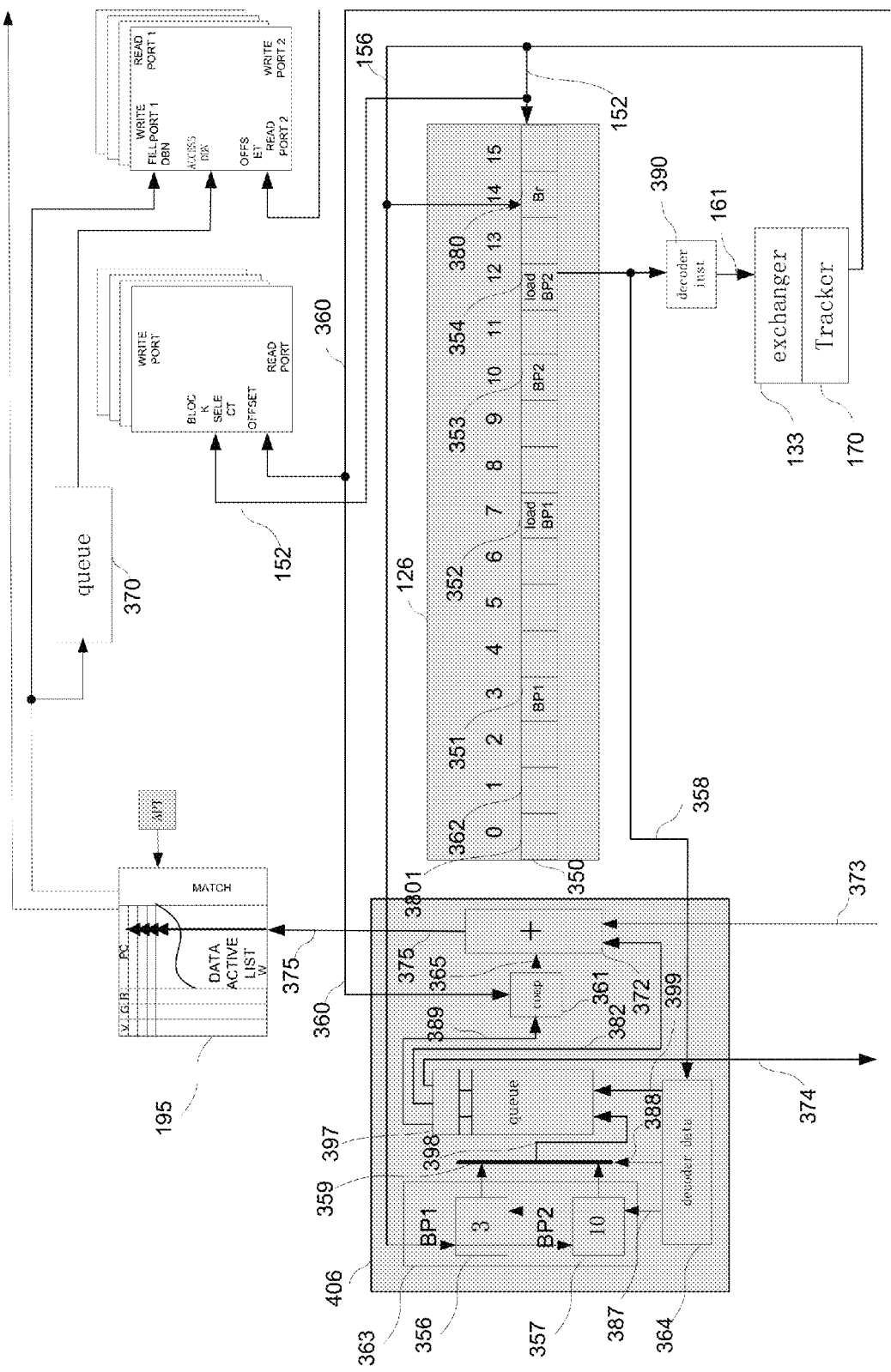
FIG. 26 illustrates an exemplary cache system consistent with the disclosed embodiments.

FIG. 26 illustrates cache system 20000 with certain different arrangements from that in FIG. 25. As shown in FIG. 26, most structures are the same as those in FIG. 25, such as the track table 126 (containing the track 350), active list 195, DBN queue 370, higher level instruction memory 124, higher level data memory 196, exchanger 133, tracker 170, etc. However, cache system 20000 in FIG. 26 does not include self-incrementor 408, selector 409, data pointer 355, and other related supporting logics. That is, pointer 156 is used for both instruction and data operations (e.g., pre-filling), which may also cause detection module 406 being different from detection module 371 in FIG. 25. For example, detection module 406 includes a queue 397. Queue 397 may be used to store base register updating information, such as a track point number of the instruction updating the base register, the base register number, and the offset, etc.

In operation, when the execution flow enters into track 350 through the entry track point 3801, the BNX pointer 152 points to the track 350, and the BNY pointer 156 point to the entry track point 3801. The BNY pointer 156 moves to the right under the control of the tracker 170 and the contents of the track points being moved through are checked. Same as previously mentioned, the BNY pointer 156 stops at the track point of the first branch instruction, and the instruction segment filling operation may be performed in the similar way as previously explained. For data, detection module 406 and active list 195 work together to perform the data segment filling operation. The detection module 406 includes base address location group registers 363 (e.g., register 356 and register 357), queue 397, multiplexer 359, comparator 361, adder 372, and decoder 364, etc.

When the BNY pointer 156 starts at the entry track point 3801 (i.e., track point 0), the number '0' pointed by the BNY pointer 156 is written into registers 356 and 357 in the group registers 363 via bus 358. Further, when the BNY pointer 156 moves through the track 350, the track point 3 (351) may be detected as an instruction updating the base register BP1. Thus, when the BNY pointer 156 moves to track point 351, the content of track point 351 is sent to decoder 364 via bus 358, and the decoder 364 generates a write enable signal 387 to write the track number '3' into register 356 corresponding to the base register BP1.

The BNY pointer 156 continues to move to track point 352, the content of the track point 352 is sent to decoder 364 via bus 358, and the decoder 364 generates a selection signal 388 to select from multiplexer 359 the value of the register 356 corresponding to the base register BP1 (356). The value of the register 356 is sent to queue 397 via bus 398. At the same time, decoder 364 also sends the base register number BP1 and offset information in track point 7 (352) to queue 397. Because of the queue 397, the BNY pointer 156 does not need to stop at track point 352 and can continue to move to the right until reaching the first branch instruction.

When the BNY pointer 156 stops at the first branch instruction of track point 14 (380), the value of the register 356 corresponding to the BP1 base register has been updated to '3', and the value of the register 357 corresponding to the BP2 base register has been updated to '10'. The track point number of the first entry of queue 397 is sent to comparator 361 via bus 389, the base register number (BP1) of the first entry is sent to the CPU core 125, and the offset of the first entry is sent to adder 372 via bus 382.

At the same time, the current instruction pointer 360 moves with the execution flow of instructions. The current instruction pointer 360 indicates the position information of the instruction being currently executed in the instruction segment. For example, the position information may be the lower address of the program counter (PC). The track number of the track point pointed by current instruction pointer 360 is also sent to the comparator 361. When the comparator 361 determines that the number from the current instruction pointer 360 is greater than or equal to the number sent by bus 389 (i.e., the track point number '3') from queue 397, it may indicate that the last register updating instruction has been executed and the BP1 base register is updated with the required value. The enable signal 365 from the comparator 361 to the adder 372 is set as valid.

Thus, the value of the base register from the CPU core 125 can be sent to adder 372 via bus 373. The adder 372 can complete the calculation of a data address by adding the value of the base register and the offset, and can send the calculated data address to active list 195 via bus 375. The active list 195 may then perform the matching operation. The following operations such as data filling are similar to the above descriptions.

Therefore, the queue 397 can be used to store information of track points related to the read/write instructions, such as track point 3 (351), track point 7 (352), track point 10 (353), and track point 12 (354), etc. The queue 397 may also be updated or cleared after the completion of the filling operation of the corresponding instruction segment and data segment in sequence using the same structure.

Figure 27A:
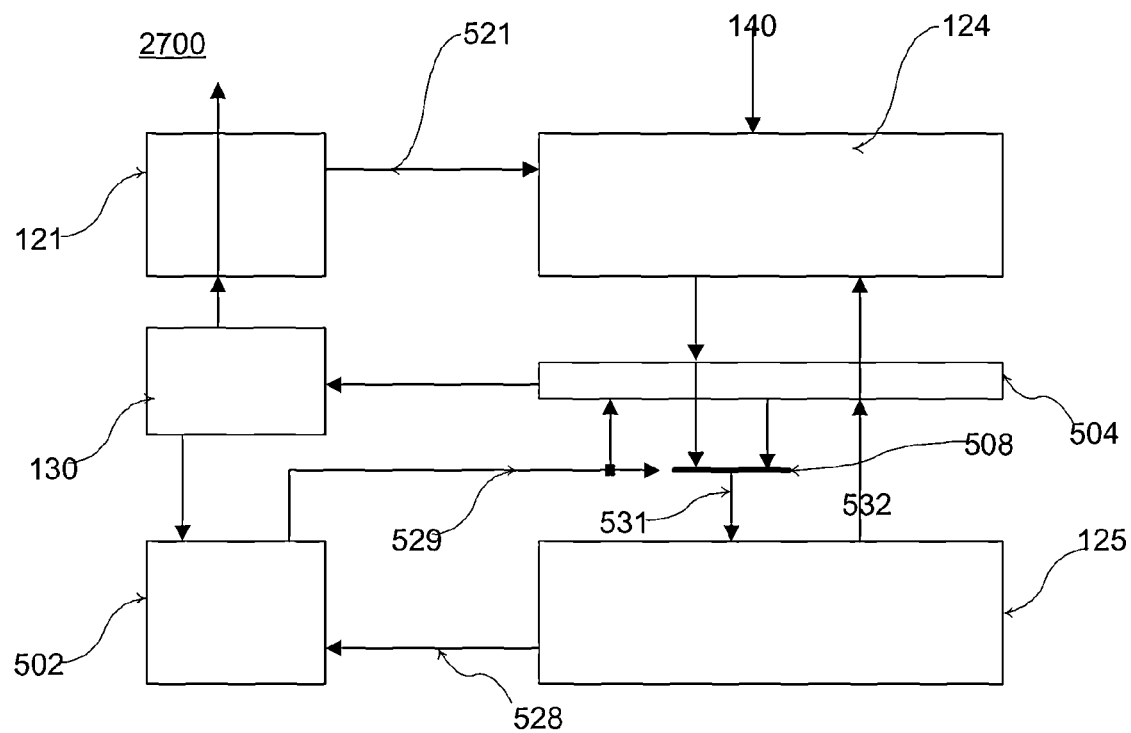
FIG. 27A illustrates an exemplary structure for an on-the-fly cache structure consistent with the disclosed embodiments.

In certain embodiments, for the instruction cache and/or the data cache, the size of track table 126 may be substantially reduced or the track table 126 may be omitted together, such that relevant operations (e.g., scanning, matching, and pre-filling, etc.) may be performed on-the-fly (or in real-time during operation). FIG. 27A illustrates an exemplary structure for an on-the-fly cache structure 2700.

As shown in FIG. 27A, cache structure 2700 may include active list 121, generator 130, a branch decision unit 502, a buffer 504, and a multiplexer 508. Other devices may also be included.

Higher level memory 124 may be filled with instructions inputted through bus 140 from lower level memory and/or other memory. As previously explained, higher level memory 124 may be addressed by BNX 521. Higher level memory 124 may also output an instruction block to fill buffer 504 or may be directly used by CPU core 125. Each of memory blocks in higher level memory 124 (i.e., a line) may correspond to one entry in active list 121.

Buffer 504 may be a multi-port memory. For example, buffer 504 may have 3 ports, one write port from which multiple instructions from higher level memory 124 can be written into buffer 504, a first read port from which generator 130 may read instructions in buffer 504 for scanning, and a second read port from which the CPU core 125 may read instructions from buffer 504 through multiplexer 508. The buffer 504 may have an appropriate size. For example, buffer 504 may correspond to one memory or instruction block from the higher level memory 124.

The CPU core 125 decodes and executes instructions inputted from multiplexer 508 and generates BNY 532. The CPU core 125 may also generate branch taken/not taken and/or jump signal 528. Multiplexer 508 is controlled by signal 529 to select instructions from higher level memory 124 or from buffer 504.

Because the memory line (block) being executed by the CPU core 125 is in buffer 504, generator 130 may scan the instructions in buffer 504 ahead of the instructions being decoded and executed by the CPU core 125, and generator 130 may scan instructions from the first read port of buffer 504. Because the content of buffer 504 may correspond to an instruction block from the higher level memory 124, the scanning operation is similar to that of previously described cache structures, such as finding the branch instruction, computing the branch target address, and sending the branch target address to active list 121 for matching operations, etc.

Thus, when generator 130 finds a branch instruction, the generator 130 computes the branch target address of the found branch instruction and sends the branch target address to the active list 121. The generator 130 also sends the type of branch (e.g. conditional or unconditional) to branch decision unit 502.

The active list 121 may accept the branch target address sent from generator 130 and may match the branch target address with the contents of the active list 121 to find the corresponding instruction memory block number BNX 521. If the active list 121 does not find a match in the contents with the branch target address sent from generator 130, the branch target address is sent to lower memory (not shown) to fetch the corresponding memory block and to fill the fetched corresponding memory block to higher level memory 124. A corresponding entry to the branch target address is then created in the active list 121.

On the other hand, if the active list 121 finds a match in the contents with the branch target address sent from generator 130, active list 121 sends the corresponding memory block number BNX to higher level memory 124 to index a corresponding memory block. The content of that memory block may also be outputted to buffer 504 and/or the CPU core 125.

CPU core 125 provides block offset BNY 532 to both higher level memory 124 and buffer 504 to address particular offset within the block. CPU core 125 also produces a signal 528 to inform branch decision unit 502 whether a branch is taken or not taken. Further, branch decision unit 502 generates signal 529 based on branch type signal 527 and branch taken/not-taken signal 528 to control multiplexer 531 and to control the replacement of content in buffer 504 with the instruction block outputted from higher level memory 124.

If the branch is not to be taken, then the signal 529 controls multiplexer 508 to select the output from buffer 504 (instruction after the branch instruction) and controls buffer 504 to keep the current content. In this case, the CPU core 125 executes instructions after the branch instruction.

However, if the branch is to be taken, then the signal 529 controls multiplexer 508 to select the output from higher level memory 124 (i.e., the branch target). The signal 529 also controls buffer 504 to update the content from that outputted by the higher level memory 124. In this case, the CPU core 125 executes the branch target instruction and instructions following the branch target instruction.

In both cases, generator 130 is looking for the next branch instruction and the above process is repeated. Because the generator 130 may scan the instruction block faster than the execution of the CPU core 125, an instruction block corresponding to a branch instruction may be pre-filled into the higher level memory 124 in advance of the execution of the branch target instruction.

Figure 27B:
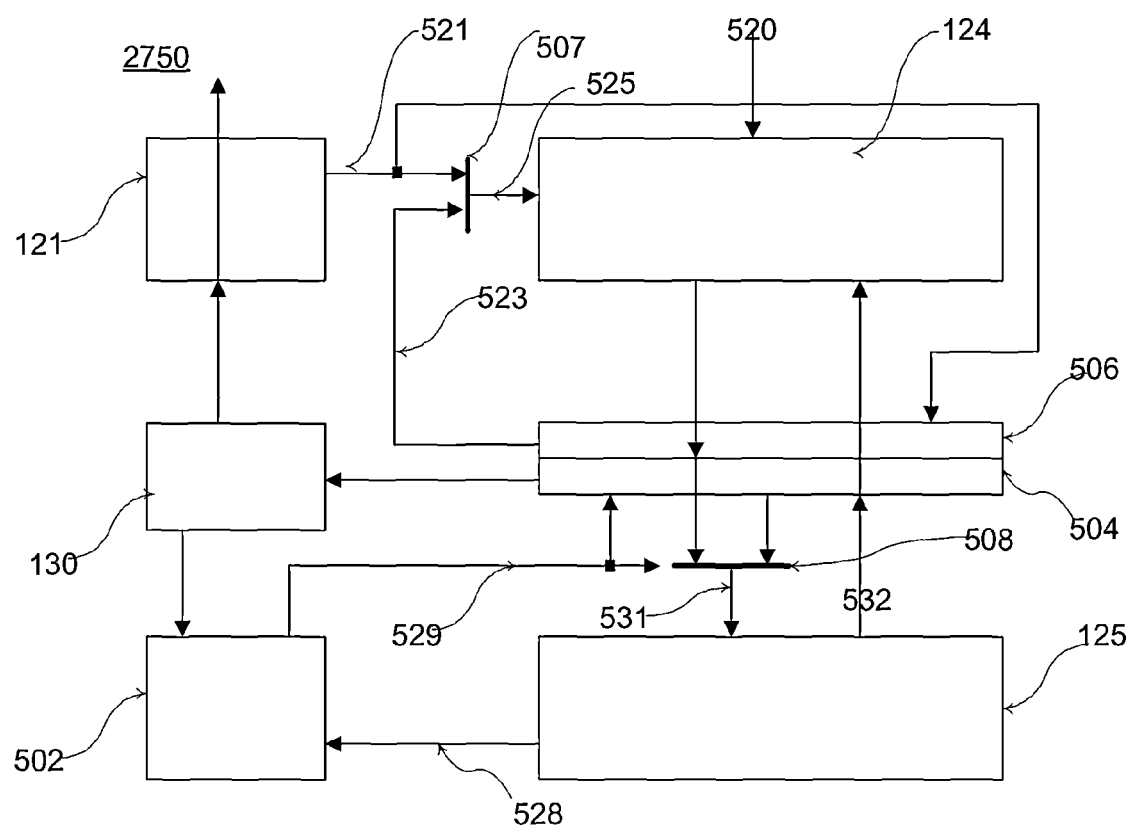
FIG. 27B illustrates an exemplary structure for an on-the-fly cache structure consistent with the disclosed embodiments.

Further, structure 2700 may be further optimized. FIG. 27B illustrates another exemplary cache structure 2750. Cache structure 2750 may be similar to cache structure 2700 described in FIG. 27A, however, as shown in FIG. 27B, cache structure 2750 may include an additional buffer 506 and a multiplexer 507. That is, an associate memory block 506 is added to buffer 504. Buffer 506 may contain certain information to improve the scanning speed.

More particularly, when active list 121 finds a match and produces a corresponding block number BNX 521, BNX 521 not only is used to index higher level memory 124, but also is stored in buffer 506 in an entry associated with the originated branch instruction. When, next time, the generator 130 scans the same entry, the BNX can be directly read out from buffer 506 through bus 523 and sent to multiplexer 507 (controlled by the validity of this BNX) to be on address bus 525 to index higher level memory 124. Thus, matching operation from the active list 121 may be avoided to save power and to reduce latency. In addition, buffer 504 may coincide with the higher level memory 124 if the higher level memory 124 is a multi-port memory. Buffer 504 may also correspond to multiple instruction/memory blocks and the BNX values stored in buffer 506 may be utilized more efficiently.

FIGS. 28A-B illustrate an exemplary track table 601 with certain improvements consistent with the disclosed embodiments. As shown in FIG. 28A, track table 601 may include, for example, rows '0'-'3', columns 'Y0'-'Y7' and an end column. Each entry in track table 601 may have a type as one of various types recognized by the track table 601. For example, the various types include 'BR' for conditional branch instruction type and 'J' for un-conditional branch instruction type, and both branch instruction types 'BR' and 'J' have a BNX value associated with the entry to indicate the branch target memory block number. The various types also include 'Null' for a non-branch instruction type, and 'PC' for a branch instruction without a BNX associated with the entry.

That is, the 'PC' type indicates a BNX is not assigned yet, and the corresponding memory block should be read out to compute the branch target address. Other types may also be included for other operation such as data cache operation. When a row or track is created, some entries can be marked as PC. The end column of each row in track table 601 has a jump type and associated BNX value to indicate which memory block the consecutive instructions may be stored in.

More particularly, row '0' may have an entry 602 as 'BR2' which indicates a branch instruction with a target BNX value of '2' (i.e., row '2'); an entry 603 as 'BR1' which indicates a branch instruction with a target BNX value of '1'; and an entry 604 as 'J1' which indicates a jump to row '1' for consecutive instructions. The row '1' may have an entry 605 as 'BR3' which indicates a branch instruction with a target BNX value of '3'; an entry 606 as 'BR2'; and an entry 607 as 'J2'. The row '2' may have an entry 608 as 'BR1'; an entry 609 as 'BR1'; and an entry 610 as 'J3'. Further, row '3' may have an entry 611 as 'BR0' which indicates a branch instruction with a target BNX value of '0' and an entry 612 as 'BR1'. Other types may also be included.

Further, the rows in track table 601 may be created out-of-order and the sequence of the rows in track table 601 may be different from the sequence of memory blocks in higher level memory 124 or an L1 cache. A correlation table 613 may be established to indicate the correlative relationship between rows in track table 601, such as branching among different rows.

Correlation table 613 may have the same number of rows as track table 601 and columns equal to the number of rows. That is, correlation table 613 is an N×N table, where N is the number of rows in the corresponding track table 601. Each row of correlation table 613 corresponding to each row of the track table 601. For a particular row of correlation table 613, if there is a branch instruction in the corresponding row in track table 601, the value of the entry in the particular row of correlation table 613 with column number as the BNX of the branch instruction is set to '1'. If there are more than one branch instructions in the corresponding row in track table 601, the values of the relevant entries are set to '1' similarly.

More particularly, because row '0' in track table 601 includes two branch instructions, 'BR2' and 'BR1', two entries 614 and 615, (0, 1) and (0, 2), in correlation table 613 are set to '1'. Similarly, entries 616 (1, 2), 617 (1, 3), 618 (2, 1), 620 (3, 0), 621 (3, 1) are all set to '1'. A summation may also be calculate to derive a total number branched-into rows to include 622, 623, 624, and 625 having values of '1', '3', '2', and '2', respectively. The summation values may be used to determine which row to be replaced if more than one rows are selected for replacement. Further, a valid column 626 may also be used to indicate whether a row in correlation table 613 is valid. The valid column 626 includes bit 627, bit 628, bit 629, and bit 630 corresponding to the rows of correlation table 613, respectively. Optionally, a row in track table 601 branch back to itself is not needed to be represented in the correlation table 613.

During operation, because the total number of rows in track table 601 may be limited, existing rows may be replaced by new rows. When determining which row is to be replaced, track table 601 may use, in general, a policy like LRU or LFU to determine a row or rows to be replaced, which may also indicate that corresponding instruction/memory block in the L1 cache and entry in the active list 121 may also be updated or replaced.

However, when one memory block (and the corresponding track table row) is replaced, there may be other track table rows having branch instructions with the replaced rows as branch targets (the track table row contains the BNX of the replaced row). In this situation, after the replacement is taken place, the branch instruction with the replaced rows as branch targets can branch to different instruction block and thus cause errors. Certain mechanisms may be implemented to prevent such errors from happening.

When one row in track table 601 needs to be replaced (such as when all rows in track table 601 are filled but new contents have to be filled into the L1 cache and track table 601, track table 601 may identify row '0' by using an LRU policy. Before or when the row '0' is replaced, correlation table 613 is accessed to determine any row of track table 601 would be affected by such replacement. That is, using the row number to be replaced (i.e., '0') as the column number to search correlation table 613. When the column '0' of correlation table 613 is read out, any corresponding row of the entry with value of '1' would be affected by the replacement.

More particularly, for column '0', the entry of row '3' is a '1', which indicates row '3' has a branch instruction having a branch target to row '0'. Thus, row '3' of track table 601 is examined, and any entry with a branch target to row '0' in row '3' of track table 601 is replaced by 'PC' which indicates no branch target BNX value is available. When the tracker (e.g., look ahead pointer) reaches this entry with 'PC', the corresponding instruction block is read again to recalculate the branch target and to re-assign a new BNX to the track table entry.

After all affected rows are processed (e.g., replacing with the 'PC'), row '0' of the track table 601 can be replaced by new contents. As shown in FIG. 28B, the original contents of row '0' of track table 601 are set to '0'. Further, the entries in row '0' of the correlation table 613 are set to '0'; and the entries of column 0 of the correlation table 613 are set to '0'. The row 0 of the correlation table 613 is filled with new contents during the replacement.

Figure 29:
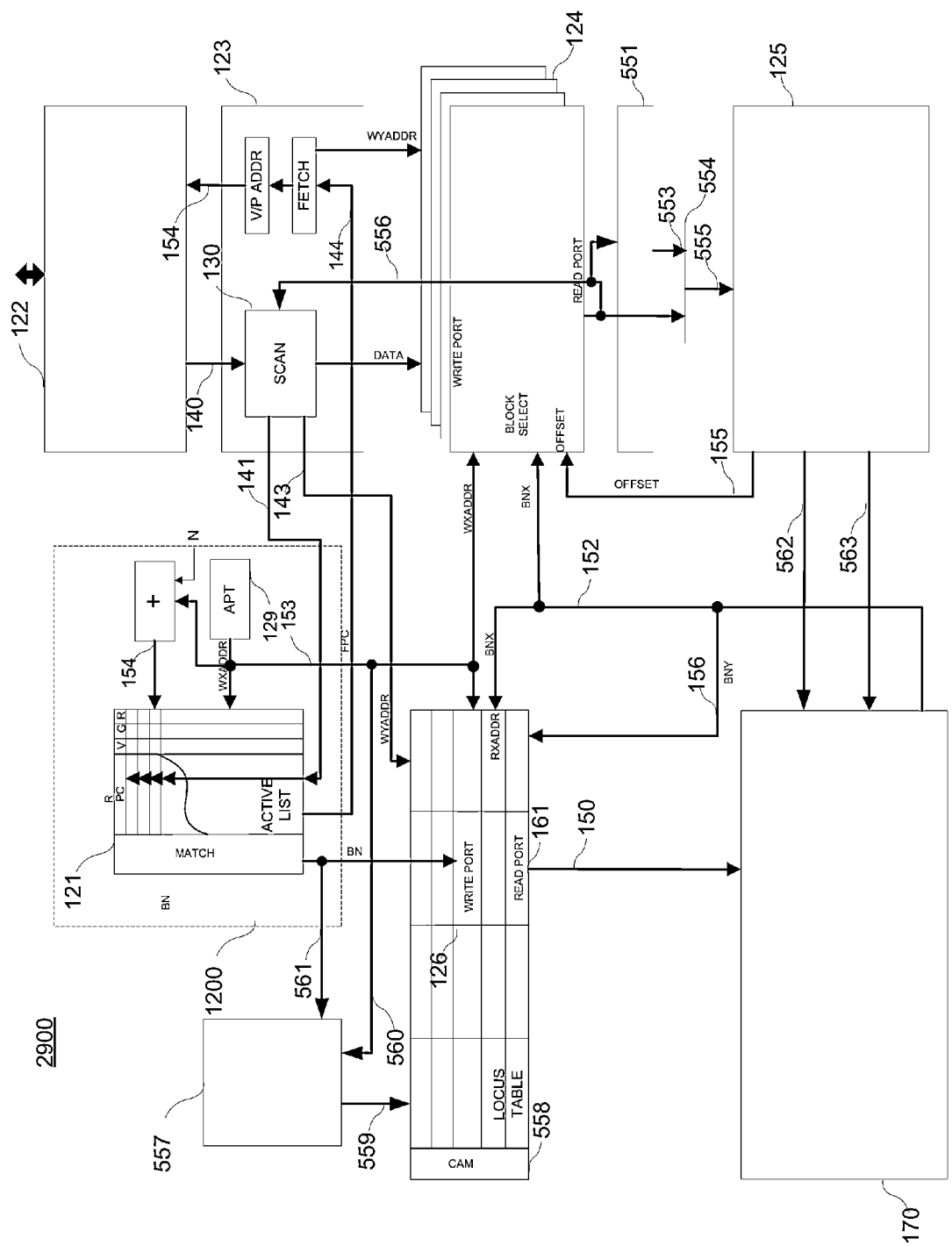
FIG. 29 illustrates an exemplary cache structure consistent with the disclosed embodiments.

FIG. 29 illustrates an exemplary cache structure 2900 incorporating the correlation table described in FIG. 28A-B. As shown in FIG. 29, cache structure 2900 is similar to cache structures previously disclosed. However, cache structure 2900 includes a correlation table 557 coupled between track table 126 and active list 121. Further, when a 'PC' entry is reached in track table 126, generator 130 can scan the corresponding memory block again to recalculate the branch target address. Track table 126 may optionally include a CAM 558 to manage the track table 126.

The disclosed systems and methods may provide fundamental solutions to caching structure used in digital systems. Different from the conventional cache systems using a fill after miss scheme, the disclosed systems and methods fill instruction and data caches before a processor executes an instruction or accessing a data, and may avoid or substantially hide compulsory misses. That is, the disclosed cache systems are integrated with pre-fetching process, and eliminate the need for the conventional cache tag matching processes. Further, the disclosed systems and methods essentially provide a fully associative cache structure thus avoid or substantially hide conflict misses and capacity misses. In addition, the disclosed systems and methods support simultaneous searching for a multiple layers of cache structures therefore reduce the multi-layer cache miss penalty. The disclosed systems and methods can also operate at a high clock frequency by avoiding tag matching in time critical cache accessing. The power efficiency of the disclosed system and method is also significantly better than the conventional cache system due to less matching operations required and a lower cache miss rate. In addition, the disclosed systems and methods can fill data cache in advance of the execution of instructions using the pre-filled data based on independent data cache control structures or integrated instruction/data cache control structures. Other advantages and applications are obvious to those skilled in the art.

What is claimed is:
1. A digital system, comprising:
   a processor core capable of being coupled to a first memory containing data and a second memory with a faster speed than the first memory, and configured to execute a segment of instructions having at least one instruction accessing the data from the second memory using a base register; and
   a cache control unit configured to be coupled to the first memory, the second memory, and the processor core to fill the data from the first memory to the second memory before the processor core executes the instruction accessing the data, wherein the cache control unit is further configured to:
examine the segment of instructions to extract instruction information containing at least data access instruction information and last register updating instruction information;
create a track corresponding to the segment of instructions based on the extracted instruction information; and
fill the data from the first memory to the second memory based on the track corresponding to the segment of instructions after execution of an instruction last updating the base register used by the at least one instruction accessing the data.

2. The digital system according to claim 1, wherein:
the track includes a plurality of track point, each corresponding to an instruction of the segment of instructions, and is contained in a first track table.

3. The digital system according to claim 2, wherein:
the data is addressed in a base register plus offset format.

4. The digital system according to claim 3, wherein:
the data access instruction information includes a data access instruction identifier, a base register number, and an offset; and
the register updating instruction information includes a register updating instruction identifier and a base register number.

5. The digital system according to claim 1, wherein the cache control unit further includes:
a data pointer moving through the segment of instruction to extract the instruction information faster than a current instruction pointer pointing to an instruction currently being executed by the processor core, and to stop at the at least one instruction accessing the data.

6. The digital system according to claim 5, wherein the cache control unit is further configured to:
store position information of all instructions updating base registers in corresponding base register position registers;
compare the current instruction pointer with the position information stored in the base register position register corresponding to the at least one instruction accessing the data; and
when the current instruction pointer is greater than or equal to the position information stored in the base register position register, generate a signal to derive a complete data address based the base register.

7. The digital system according to claim 6, wherein the cache control unit is further configured to:
fill the data from the first memory to the second memory using the complete data address.

8. The digital system according to claim 6, wherein the cache control unit is further configured to:
match the complete address against entries in an active list to determine whether the data is already in the second memory;
when no entry is matched with the complete address, create a new entry in the active list containing a data block number for the data, and fill the data into the second memory using the data block number; and
when an entry is matched with the complete address, obtain the data block number for the data from the entry.

9. The digital system according to claim 6, wherein the cache control unit further includes:
a queue for containing a plurality of data block numbers corresponding to a plurality of data blocks to be used by the processor core to access the plurality of data blocks in sequence.

10. The digital system according to claim 1, wherein:
the track is also used as a track for the segment of instructions for filling the segment of instruction in a portion of the second memory different from a portion of the second memory containing the data.

11. The digital system according to claim 10, wherein:
the instruction information includes direct addressing branch instruction information, indirect addressing branch instruction information, read and write instruction information, and last register-updating instruction information.

12. The digital system according to claim 10, wherein the instruction information further contains branch instruction information, and the cache control unit further includes:
a data pointer moving through the segment of instruction to extract the instruction information faster than a current instruction pointer pointing to an instruction currently being executed by the processor core, and stops at a first branch instruction without stopping at the at least one instruction accessing the data.

13. The digital system according to claim 12, wherein:
the branch instruction information contains both direct addressing branch instruction information and indirect addressing branch instruction information.

14. The digital system according to claim 1, wherein:
a second track table is used to include a track for the segment of instructions for filling the segment of instruction in a portion of the second memory different from a portion of the second memory containing the data.

15. The digital system according to claim 14, wherein:
a synchronization mechanism is provided between the first track table and the second track table to synchronize the first track table and the second track table based on a branch taken decision signal.

16. The digital system according to claim 1, wherein:
the track is maintained in a track table;
each track point is addressed by a first address for determining a track number, and a second address for determining an offset within the track; and
the second address is mapped through a mapping table such that a length of the track is substantially reduced.

17. A digital system, comprising:
a processor core capable of being coupled to a first memory containing executable instructions and a second memory with a faster speed than the first memory, and configured to execute one or more instructions of the executable instructions from the second memory; and
a cache control unit configured to be coupled to the first memory, the second memory, and the processor core to fill the instructions from the first memory to the second memory before the processor core executes the instructions,
wherein the cache control unit is further configured to:
examine a segment of instructions to extract instruction information containing at least branch instruction information and last register updating instruction information;
create a track corresponding to a branch instruction within the segment of instructions based on the extracted branch instruction information in a track table, the track including a plurality of track points each of which corresponds to an instruction of the segment of instructions; and
fill a corresponding segment of instructions from the first memory to the second memory based on the track corresponding to the segment of instructions after a branch target of the branch instruction is determined and before the corresponding segment of instructions is executed by the processor core.

18. The digital system according to claim 17, wherein:
the branch instruction corresponds to a branch condition register; and
the register updating instruction information includes a register updating instruction identifier and a branch condition judgment carry identifier.

19. The digital system according to claim 18, wherein the cache control unit further includes:
an advance pointer moving through the segment of instructions to extract the instruction information faster than a current instruction pointer pointing to an instruction currently being executed by the processor core, and to stop at the branch instruction.

20. The digital system according to claim 19, wherein the cache control unit is further configured to:
store position information of all instructions being ahead of the branch instruction and updating one or more branch condition judgment carriers in corresponding position registers;
compare the current instruction pointer with the position information stored in the position registers; and
when the current instruction pointer is greater than or equal to the position information stored in the position registers, generate a signal to indicate that the branch target of the branch instruction can be correctly calculated.

21. The digital system according to claim 17 wherein:
the branch target is addressed in a base register plus offset format.

22. The digital system according to claim 21, wherein:
the instruction information includes an instruction type, a base register number, and an offset; and
the register updating instruction information includes base register updating instruction information and a base register number.

23. The digital system according to claim 22, wherein the cache control unit further includes:
an instruction pointer moving through the segment of instructions to extract the instruction information faster than a current pointer pointing to an instruction currently being executed by the processor core, and to stop at the branch instruction.

24. The digital system according to claim 23, wherein the cache control unit is further configured to:
store position information of all instructions being ahead of the branch instruction and updating base registers in corresponding base register position registers;
compare the current pointer with the position information stored in the base register position register corresponding to the branch instruction; and
when the current instruction pointer is greater than or equal to the position information stored in the base register position register, generate a signal to calculate a complete branch target address based the base register.

25. The digital system according to claim 24, wherein the cache control unit is further configured to:
fill the corresponding segment of instructions from the first memory to the second memory using the complete branch target address.

26. The digital system according to claim 17, wherein:
each track point in the track table is addressed by a first address for determining a track number, and a second address for determining an offset within the track; and
the second address is mapped through a mapping table such that a length of the track is substantially reduced.

27. The digital system according to claim 26, wherein:
the branch instruction information of a track point includes at least one of a conditional branch instruction type, an un-conditional branch instruction type, and a branch instruction without a second address associated with the track point.

28. A digital system, comprising:
a first memory containing executable instructions;
a second memory with a faster speed than the first memory and containing a plurality of memory blocks;
a processor core coupled to the first memory and the second memory and configured to execute one or more instructions of the executable instructions from the second memory;
a buffer coupled between the second memory and the processor core such that a first block of instructions from the second memory to be executed by the processor core is also in the buffer and the processor core selectively execute the first block of instructions from the second memory or from the buffer; and
a cache control unit configured to be coupled to the first memory, the second memory, the buffer, and the processor core to fill at least a second block of instructions from the first memory to the second memory before the processor core executes the second block of instructions,
wherein the cache control unit is further configured to a scanning process including:
examining the first block of instructions in the buffer to extract instruction information containing at least branch information;
determining whether the second block of instructions is already in the second memory based on the extracted instruction information; and
when the second block of instructions is not in the second memory, filling the second block of instructions from the first memory to the second memory.

29. The digital system according to claim 28, wherein:
the second block of instructions corresponds to a branch target address of a branch instruction within the first block of instructions.

30. The digital system according to claim 29, wherein:
when a branch condition of the branch instruction is not satisfied, the processor core executes an instruction following the branch instruction from the buffer.

31. The digital system according to claim 30, wherein:
when the branch condition of the branch instruction is satisfied, the processor core executes the second block of instruction from the second memory; and
the cache control unit fills the second block of instructions in the buffer and continues the scanning process.

32. The digital system according to claim 31, wherein:
the buffer includes an associate buffer for storing the block of instructions replaced by the second block of instructions.

33. A method for facilitating operation of a digital system having a processor core coupled to a first memory containing data and a second memory with a faster speed than the first memory, and configured to execute a segment of instructions having at least one instruction accessing the data from the second memory using a base register, the method comprising:
examining the segment of instructions to extract instruction information containing at least data access instruction information and last register updating instruction information;
creating a track corresponding to the segment of instructions based on the extracted instruction information; and filling the data from the first memory to the second memory based on the track corresponding to the segment of instructions after execution of an instruction last updating the base register used by the at least one instruction accessing the data and before the processor core executes the instruction accessing the data.

34. The method according to claim 33, wherein:
the track is contained in a first track table and includes a plurality of track point, each corresponding to an instruction of the segment of instructions; and
the data is addressed in a base register plus offset format.

35. The method according to claim 34, wherein:
the data access instruction information includes a data access instruction identifier, a base register number, and an offset; and
the register updating instruction information includes a register updating instruction identifier and a base register number.

36. The method according to claim 33, further including:
using a data pointer to move through the segment of instruction to extract the instruction information faster than a current instruction pointer pointing to an instruction currently being executed by the processor core, and to stop at the at least one instruction accessing the data.

37. The method according to claim 36, further including:
storing position information of all instructions updating base registers in corresponding base register position registers;
comparing the current instruction pointer with the position information stored in the base register position register corresponding to the at least one instruction accessing the data; and
when the current instruction pointer is greater than or equal to the position information stored in the base register position register, generating a signal to derive a complete data address based the base register.

38. The method according to claim 37, further including:
filling the data from the first memory to the second memory using the complete data address.

39. The method according to claim 37, further including:
matching the complete address against entries in an active list to determine whether the data is already in the second memory;
when no entry is matched with the complete address, creating a new entry in the active list containing a data block number for the data, and filling the data into the second memory using the data block number; and
when an entry is matched with the complete address, obtaining the data block number for the data from the entry.

40. The method according to claim 33, wherein:
the track is also used as a track for the segment of instructions for filling the segment of instructions in a portion of the second memory different from a portion of the second memory containing the data.

41. The method according to claim 40, wherein:
the instruction information includes direct addressing branch instruction information, indirect addressing branch instruction information, read/write instruction information, and last register-updating instruction information.

42. The digital system according to claim 33, wherein:
a second track table is used to include a track for the segment of instructions for filling the segment of instruction in a portion of the second memory different from a portion of the second memory containing the data.

43. The digital system according to claim 42, wherein:
a synchronization mechanism is provided between the first track table and the second track table to synchronize the first track table and the second track table based on a branch taken decision signal.

44. The digital system according to claim 33, wherein:
the track is maintained in a track table;
each track point is addressed by a first address for determining a track number, and a second address for determining an offset within the track; and
the second address is mapped through a mapping table such that a length of the track is substantially reduced.

45. A method for facilitating operation of a digital system having a processor core coupled to a first memory containing executable instructions and a second memory with a faster speed than the first memory, and configured to execute one or more instructions of the executable instructions from the second memory, comprising:
examining a segment of instructions to extract instruction information containing at least branch instruction information and last register updating instruction information;
creating a track corresponding to a branch instruction within the segment of instructions based on the extracted branch instruction information in a track table, the track including a plurality of track points each of which corresponds to an instruction of the segment of instructions; and
filling a corresponding segment of instructions from the first memory to the second memory based on the track corresponding to the segment of instructions after a branch target of the branch instruction is determined and before the corresponding segment of instructions is executed by the processor core.

46. The method according to claim 45, wherein:
the branch instruction corresponds to a branch condition register; and
the register updating instruction information includes a register updating instruction identifier and a branch condition judgment carry identifier.

47. The method according to claim 46, further including:
moving an advance pointer moving through the segment of instructions to extract the instruction information faster than a current instruction pointer pointing to an instruction currently being executed by the processor core; and
stopping at the branch instruction.

48. The method according to claim 47, further including:
storing position information of all instructions being ahead of the branch instruction and updating one or more branch condition judgment carriers in corresponding position registers;
comparing the current instruction pointer with the position information stored in the position registers; and
when the current instruction pointer is greater than or equal to the position information stored in the position registers, generating a signal to indicate that the branch target of the branch instruction can be correctly calculated.

49. The method according to claim 45 wherein:
the branch target is addressed in a base register plus offset format.

50. The method according to claim 49, wherein:
the instruction information includes an instruction type, a base register number, and an offset; and
the register updating instruction information includes base register updating instruction information and a base register number.

51. The method according to claim 50, further including:
moving an instruction pointer through the segment of instructions to extract the instruction information faster than a current pointer pointing to an instruction currently being executed by the processor core; and
stopping at the branch instruction.

52. The method according to claim 51, further including:
storing position information of all instructions being ahead of the branch instruction and updating base registers in corresponding base register position registers;
comparing the current pointer with the position information stored in the base register position register corresponding to the branch instruction; and
when the current instruction pointer is greater than or equal to the position information stored in the base register position register, generating a signal to calculate a complete branch target address based the base register.

53. The method according to claim 52, further including:
filling the corresponding segment of instructions from the first memory to the second memory using the complete branch target address.

54. The method according to claim 45, wherein:
each track point in the track table is addressed by a first address for determining a track number, and a second address for determining an offset within the track; and
the second address is mapped through a mapping table such that a length of the track is substantially reduced.

55. The method according to claim 54, wherein:
the branch instruction information of a track point includes at least one of a conditional branch instruction type, an un-conditional branch instruction type, and a branch instruction without a second address associated with the track point.

56. A method for facilitating operation of a digital system having a processor core coupled to a first memory containing executable instructions and a second memory with a faster speed than the first memory, and configured to execute one or more instructions of the executable instructions from the second memory, the method comprising:
providing a buffer coupled between the second memory and the processor core such that a first block of instructions from the second memory to be executed by the processor core is also in the buffer and the processor core selectively execute the first block of instructions from the second memory or from the buffer; and
performing a scanning process to fill at least a second block of instructions from the first memory to the second memory before the processor core executes the second block of instructions, the scanning process including:
examining the first block of instructions in the buffer to extract instruction information containing at least branch information;
determining whether the second block of instructions is already in the second memory based on the extracted instruction information; and
when the second block of instructions is not in the second memory, filling the second block of instructions from the first memory to the second memory.

57. The method according to claim 56, wherein:
the second block of instructions corresponds to a branch target address of a branch instruction within the first block of instructions.

58. The method according to claim 57, wherein:
when a branch condition of the branch instruction is not satisfied, the processor core executes an instruction following the branch instruction from the buffer.

59. The method according to claim 58, wherein:
when the branch condition of the branch instruction is satisfied, the processor core executes the second block of instruction from the second memory; and
the second block of instructions is filled in the buffer and the scanning process continues.

60. The method according to claim 59, wherein:
the buffer includes an associate buffer for storing the block of instructions replaced by the second block of instructions.

\* \* \* \* \*